United States Patent
Lindheimer et al.

(10) Patent No.: US 12,432,650 B2
(45) Date of Patent: Sep. 30, 2025

(54) METHOD FOR BROADCAST AND INDEX GENERATION IN UE

(71) Applicant: Telefonaktiebolaget LM Ericsson (PUBL), Stockholm (SE)

(72) Inventors: Christofer Lindheimer, Vadstena (SE); Oscar Ohlsson, Bromma (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 391 days.

(21) Appl. No.: 17/796,071

(22) PCT Filed: Feb. 12, 2021

(86) PCT No.: PCT/IB2021/051207
§ 371 (c)(1),
(2) Date: Jul. 28, 2022

(87) PCT Pub. No.: WO2021/161265
PCT Pub. Date: Aug. 19, 2021

(65) Prior Publication Data
US 2023/0345351 A1    Oct. 26, 2023

Related U.S. Application Data

(60) Provisional application No. 62/976,306, filed on Feb. 13, 2020.

(51) Int. Cl.
*H04W 48/18* (2009.01)
*H04W 84/04* (2009.01)

(52) U.S. Cl.
CPC .......... *H04W 48/18* (2013.01); *H04W 84/042* (2013.01)

(58) Field of Classification Search
CPC .............. H04W 48/18; H04W 84/042; H04W 84/045; H04W 12/76; H04W 48/12; G06F 11/3086; H04L 63/104
See application file for complete search history.

(56) References Cited

U.S. PATENT DOCUMENTS

2023/0247525 A1* 8/2023 Lindheimer .......... H04W 48/02
370/230

OTHER PUBLICATIONS

Ericsson, "Remaining RRC aspects of NPN", 3GPP TSG-RAN WG2 Meeting #109 electronic, Elbonia, Feb. 24-Mar. 6, 2020, pp. 1-10, Tdoc R2-2000130, 3GPP.

(Continued)

*Primary Examiner* — Diane D Mizrahi

(57) ABSTRACT

According to certain embodiments, a method in a wireless device comprises detecting system information broadcast from a network node. The system information comprises a list of Non-Public Network (NPN) identifiers identifying a plurality of NPNs. The method comprises selecting a network from the plurality of NPNs and determining an index value associated with the selected network. When the NPN identifier associated with the selected network comprises a Closed Access Group (CAG) identifier, determining the index value is based at least partially on Public Land Mobile Network (PLMN) elements included in combination with at least one CAG identifier in the list of NPN identifiers. When the NPN identifier associated with the selected network comprises a Network Identifier (NID), determining the index value is based at least partially on a number of NIDs included in the list of NPN identifiers.

20 Claims, 23 Drawing Sheets

(56) References Cited

OTHER PUBLICATIONS

Ericsson, "Remaining RRC aspects of NPN", 3GPP TSG-RAN WG2 Meeting #109 electronic, Elbonia, Feb. 24-Mar. 6, 2020, pp. 1-15, Draft Change Request, R2-2000131, 3GPP.
CATT, "Cell Selection and Reselection of NPN cell", 3GPP TSG-RAN WG2 Meeting #107bis, Chongqing, P.R. China, Oct. 14-18, 2019, pp. 1-3, R2-1912153, 3GPP.
China Telecom et al., "Discussion on human-readable network name", 3GPP TSG-RAN WG2 #108, Reno, America, Nov. 18-22, 2019, pp. 1-5, R2-1916048, 3GPP.
PCT Notification of Transmittal of the International Search Report and the Written Opinion of the International Searching Authority, or the Declaration issued for International application No. PCT/IB2021/051207—Jun. 10, 2021.
3GPP TSG-RAN WG2 #108; Reno, USA; Title: Connected mode aspects; Source: Ericsson (Tdoc R2-1914627)—Nov. 18-22, 2019.
3GPP TSG-RAN WG2 #108; Reno, USA; Title: SIB1 design for NPN; Source: Ericsson (Tdoc R2-1914628)—Nov. 18-22, 2019.
Ericsson, "RAN2-aspects of Non-Public Networks (NPN)", 3GPP TSG-RAN WG2 #105, Athens, Greece, Feb. 25-Mar. 1, 2019, pp. 1-7, Tdoc R2-1900408, 3GPP.
Qualcomm Incorporated et al., "TS 23.501: Introducing Non-public network", 3GPP TSG-SA2 Meeting #130, Kochi, India, Jan. 21-25, 2019, pp. 1-10, S2-1901109, Change Request, 3GPP.

\* cited by examiner

2202: sending a wireless device a first element of a PLMN list, the first element of the PLMN list indicating that no normal service is available, thereby indicating that the wireless device is to select a network identity from an NPN list and use the network identity to validate system information that has been stored by the wireless device

Figure 22

METHOD FOR BROADCAST AND INDEX GENERATION IN UE

PRIORITY

This nonprovisional application is a U.S. National Stage Filing under 35 U.S.C. § 371 of International Patent Application Serial No. PCT/IB2021/051207 filed Feb. 12, 2021 and entitled "METHOD FOR BROADCAST AND INDEX GENERATION IN UE" which claims priority to U.S. Provisional Patent Application No. 62/976,306 filed Feb. 13, 2020 both of which are hereby incorporated by reference in their entirety.

BACKGROUND

The Third Generation Partnership Project (3GPP) is currently working on specifications commonly referred to as "5G" or "Fifth Generation." In these efforts, various requirements are listed and various solutions are brought forward. For example, solutions exist for connecting a new radio access to a new core network. The new radio access is commonly referred to as "NR" (New Radio). The new core network is commonly referred to as "5G Core network," or "5GC" for short. The term "5G System," or "5GS" for short, is also sometimes referred to as constituting a complete system.

The 5G system defined by 3GPP in Release 15 (Rel-15) thus includes both a new radio access (NR) and a new core network (5GC). The 5GC offers several new features, such as support for network slicing, improved Quality of Service (QoS), and latency and battery optimizations in the form of a new user equipment (UE) state called "inactive mode."

The 5G System is commonly known as a "public system," i.e., a Public Land Mobile Network (PLMN). This means that anyone can get a subscription and access to the network. This is, for example, in contrast to some other networks that can only be accessed by specific UEs and for which it is not possible to simply get a subscription/credential to access. One such example of a "private" network is a Wi-Fi Router deployed as an extension to a private broadband connection, e.g., a broadband subscription over fiber, xDSL (a "digital subscriber line" where "x" is a wildcard that can refer to a type of DSL, such as asynchronous DSL or synchronous DSL), or similar connection. For this, not anyone can get access. This is a type of private network. A private network may also be referred to as a "non-public network," or "NPN" for short.

While Wide Local Area Network (WLAN) is a different access than 5G, there have recently been activities related to providing the possibility for deploying these NPNs also using 5G access and 5G core networks. What is targeted then is perhaps not exactly corresponding to a home Wi-Fi access point, but rather, e.g., deployments of NPNs in factories, possibly to connect both factory equipment, vehicles, and employees. These types of deployments may put completely different requirements. As an example, these types of networks may have different security requirements. As another example, these types of networks may have different roaming requirements—in some cases, it may be important that roaming works (i.e., in order to seamlessly transfer a connection from within the private network to a network that is "public"). In other cases, roaming should definitely not be supported. One example may be that machinery that is connected should preferably only work in the private network and not be able to connect, e.g., through any other access point/cell or gNB (a "gNB" refers to a base station in NR).

3GPP has set forth requirements for how the NPNs should work, and studies have been performed on how to meet the requirements. The requirements are described in a 3GPP document 22.261 (v 16.6.0) and are copied below:

\*~\*~\*~\*~\*~\*~\*~\*~\*~\*~\*~\*~\*~\*~\*~\*~\*~\*~\*~\*~\*~\*~\*~\*~\*~\*~\*~\*~

Non-public networks are intended for the sole use of a private entity such as an enterprise, and may be deployed in a variety of configurations, utilising both virtual and physical elements. Specifically, they may be deployed as completely standalone networks, they may be hosted by a PLMN, or they may be offered as a slice of a PLMN.

In any of these deployment options, it is expected that unauthorised UEs, those that are not associated with the enterprise, will not attempt to access the non-public network, which could result in resources being used to reject that UE and thereby not be available for the UEs of the enterprise. It is also expected that UEs of the enterprise will not attempt to access a network they are not authorised to access. For example, some enterprise UEs may be restricted to only access the non-public network of the enterprise, even if PLMN coverage is available in the same geographic area. Other enterprise UEs may be able to access both a non-public network and a PLMN where specifically allowed.

6.25.2 Requirements

The 5G system shall support non-public networks.

The 5G system shall support non-public networks that provide coverage within a specific geographic area.

The 5G system shall support both physical and virtual non-public networks.

The 5G system shall support standalone operation of a non-public network, i.e., a non-public network may be able to operate without dependency on a PLMN.

Subject to an agreement between the operators and service providers, operator policies and the regional or national regulatory requirements, the 5G system shall support for non-public network subscribers:

access to subscribed PLMN services via the non-public network;

seamless service continuity for subscribed PLMN services between a non-public network and a PLMN;

access to selected non-public network services via a PLMN;

seamless service continuity for non-public network services between a non-public network and a PLMN;

A non-public network subscriber to access a PLMN service shall have a service subscription using 3GPP identifiers and credentials provided or accepted by a PLMN.

The 5G system shall support a mechanism for a UE to identify and select a non-public network.

NOTE: Different network selection mechanisms may be used for physical vs virtual non-public networks.

The 5G system shall support identifiers for a large number of non-public networks to minimize collision likelihood between assigned identifiers.

The 5G system shall support a mechanism to prevent a UE with a subscription to a non-public network from automatically selecting and attaching to a PLMN or non-public network it is not authorised to select.

The 5G system shall support a mechanism to prevent a UE with a subscription to a PLMN from automatically selecting and attaching to a non-public network it is not authorised to select.

The 5G system shall support a change of host of a non-public network from one PLMN to another PLMN without changing the network selection information stored in the UEs of the non-public network.

\*~\*~\*~\*~\*~\*~\*~\*~\*~\*~\*~\*~\*~\*~\*~\*~\*~\*~\*~\*~\*~\*~\*~\*~\*~\*~\*~\*

The requirements have been studied and there are two different solutions being standardized.

Public Network Integrated Non-Public Network (PNI-NPN) Via PLMN

A PNI-NPN is made available via a PLMN by allocating one or more network slices or data networks to the non-public network. As network slicing does not enable the possibility to avoid UEs trying to access the network in areas in which the UE is not allowed to use the network slice, the usage of Closed Access Groups (CAGs) can be used in addition to network slicing to apply additional access control. In this case the PNI-NPN is identified by the combination of PLMN ID and CAG ID where the CAG ID is unique within the scope of the PLMN, or at least the cells to be used for the PNI-NPN are identified by the PLMN ID and CAG ID (i e, the actual NPN may be identified by other means in dedicated signaling. e.g., Network Slice ID). Optionally, a human readable network name (HRNN) can also be provided to assist the user in case of manual CAG selection. The human readable network name should support manual network selection procedure. It is not necessary to associate a CAG with a specific data network or slice, it would be perfectly possibly to use a CAG also in connection to the same slices that are being used without a CAG.

Standalone NPN (SNPN)

An SNPN operates without dependency of a PLMN and is identified by the combination of PLMN ID and a Network ID (NID). Unlike the PLMN ID used by a PLMN the PLMN ID used by an SNPN is not required to be unique, i.e., it is possible for two SNPNs to share the same PLMN ID. PLMN IDs reserved for use by private networks can be used for non-public networks, e.g., based on mobile country code (MCC) 999 assigned by the International Telecommunication Union (ITU). The NID can be seen as an extension of the PLMN ID and support different assignment models. For example, Locally managed NIDs are assumed to be chosen individually by the SNPN at deployment time (and may therefore not be unique in all scenarios);

Universally managed NIDs are managed by a central entity per region and are assumed to be globally unique.

Similarly to PNI-NPNs, an HRNN can optionally be provided to assist the user in identifying an SNPN during manual network selection.

As can be seen from the above the identities used by PNI-NPN and SNPN are similar. An SNPN uses PLMN ID+NID, while a PNI-NPN use PLMN ID+CAG ID. The other difference is that an SNPN may use a PLMN ID reserved for private use, while a PNI-NPN uses the PLMN ID of its hosting PLMN, i.e., a public PLMN ID.

Thus, the SNPN/NID solution principles are:

Combination of a PLMN ID and NID identities an SNPN;

NID may be globally unique or locally managed;

NG-RAN node supports broadcasting a total of twelve NIDs;

Optionally a human-readable network name per NID for manual selection;

Optionally cell broadcast information to prevent UEs not supporting SNPNs from accessing the cell;

When the UE is set to operate in SNPN access mode the UE only selects and registers with SNPNs;

UE provides PLMN ID and NID as selected PLMN and NG-RAN provides PLMN ID and NID as selected PLM N to 5GC;

Access and Mobility Management Function (AMF) performs access control and rejects a UE if the UE has no subscription for an SNPN;

Unified Access Control (UAC) information is configured per non-public network.

The NID is used together with a PLMN ID during network selection and is therefore seen as an extension to the network identity, i.e., PLMN ID. This is understood from the statement: "UEs operating in SNPN access mode only select cells and networks broadcasting both PLMN ID and NID of the selected SNPN."

The PNI-NPN/CAG solution principles are that existing functionalities (e.g., network slicing) are used to deploy NPN within a public network and that, in addition, for the purpose of access control. Closed Access Groups may be used as follows:

CAG cell broadcasts one or multiple CAG Identifiers per PLMN (assume the Next Generation Radio Access Network (NG-RAN) node supports broadcasting a total of twelve CAG Identifiers) and optionally a human-readable network name per CAG Identifier;

PLMN/Network selection is done using the PLMN ID and within the selected PLMN the allowed cells are derived using the Allowed CAG list and optional an indication whether the UE only is allowed to access CAG cells. The cell selection/reselection is then performed using the CAG information and the know ledge of whether the UE is provisioned with the CAG access only indication, then cell selection can also perform cell (re)selection to a non-CAG non-SNPN cell of the selected PLMN-ID.

As there may be multiple CAG Identifiers per PLMN ID, the UE provides the selected CAG Identifier to the NG-RAN, and NG-RAN provides the CAG Identifier to AMF over N2;

The Mobility Restrictions (for UE in NAS and NG-RAN over N2) is extended with the Allowed CAG list and the indication whether the UE only is allowed to access CAG cells; and CAG cell shall broadcast information such that only UEs supporting CAG are accessing the cell (i.e., cells are either CAG cells or normal PLMN cells).

Some characteristics of the solution include allowing a PLMN operator to manage its network and used identities without the need for external registration because CAG is defined within the scope of the PLMN ID.

In defining new network types as described above, there is a need to support some kind of broadcast such that a UE can get information about what networks are supported in a cell. This is usually done such that the RAN sends broadcast information. In systems pursuant to the 3GPP NR and 5G System standards, the networks are usually listed in a message referred to as System Information Block 1 (SIB1).

SIB 1 includes information such as whether a cell is accessible or whether it is barred, whether a cell is supporting emergency services and whether there are any restrictions in what the UEs can access. Another information element included is a list of PLMNs that are supported. This list also provide the opportunity to assign specific cell identities (CellIdentity), tracking area codes (TAC) and ran area codes (RANAC) to the different PLMNs or different networks. In the 3GPP Technical Specification (TS) 38.331 standard, the information element (IE) that includes such network lists or PLMN lists is referred to as cellAccessRelatedInfo. and it is included in SIB1 The following excerpt from the specification describes the cellAccessRelatedInfo information element:

CellAccessRelatedInfo
The IE CellAccessRelatedInfo indicates cell access related information for this cell.
CellAccessRelatedInfo information element

```
-- ASN1START
-- TAG-CELLACCESSRELATEDINFO-START
CellAccessRelatedInfo ::=     SEQUENCE {
    plmn-IdentityList         PLMN-IdentityInfoList,
    cellReservedForOtherUse   ENUMERATED {true} OPTIONAL,     -- Need R
    ...
}
-- TAG-CELLACCESSRELATEDINFO-STOP
-- ASN1STOP
```

| CellAccessRelatedInfo field descriptions |
|---|
| cellReservedForOtherUse<br>Indicates whether the cell is reserved, as defined in 38.304 [20]. The field is applicable to all PLMNs.<br>plmn-IdentityList<br>The plmn-IdentityList is used to configure 1 set of PLMN-IdentityInfoList elements. Each of those elements contains a list of one or more PLMN Identities and additional information associated with those PLMNs. The total number of PLMNs in the PLMN-IdentityInfoList does not exceed 12. The PLMN index is defined as b1 + b2 + . . . + b(n − 1) + i for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively. |

Proposals now exist that the NPNs should be listed in a separate information element. According to below:
CellAcccessRelatedInfo
The IE CellAccessRelatedInfo indicates cell access related information for this cell.
CellAccessRelatedInfo Information Element

```
-- ASN1START
-- TAG-CELLACCESSRELATEDINFO-START
CellAccessRelatedInfo          SEQUENCE {
    plmn-IdentityList          PLMN-IdentityInfoList,
    cellReservedForOtherUse    ENUMERATED {true} OPTIONAL,    -- Need R
    ...,
    [[
    cellReservedForFutureUse-r16    ENUMERATED {true} OPTIONAL,     -- Need R
    NPN-IdentityInfoList-r16        NPN-IdentityInfoList-r16 OPTIONAL     -- Need R
    ]]
}
-- TAG-CELLACCESSRELATEDINFO-STOP
-- ASN1STOP
```

| CellAccessRelatedInfo field descriptions |
|---|
| cellReservedForFutureUse<br>Indicates whether the cell is reserved, as defined in 38.304 [20] for future use. The field is applicable to all PLMNs and NPNs.<br>cellReservedForOtherUse<br>Indicates whether the cell is reserved, as defined in 38.304 [20]. The field is applicable to all PLMNs.<br>NPN-IdentityInfoList<br>The NPN-IdentityInfoList is used to configure 1 set of NPN-IdentityInfoList elements. Each of those elements contains a list of one or more NPN Identities and additional information associated with those NPNs. The total number of PLMNs (identified by a PLMN identity in plmn-IdentityList), PNI-NPNs (identified by a PLMN identity and a CAG-ID), and SNPNs (identified by a PLMN identity and a NID) together |

| -continued |
|---|
| CellAccessRelatedInfo field descriptions |
| in the PLMN-IdentityInfoList and NPN-IdentityInfoList does not exceed 12, except for the NPN-only cells. In case of NPN-only cells the PLMN-IdentityList contains a single element that does not count to the limit of 12.<br>plmn-IdentityList<br>The plmn-IdentityList is used to configure 1 set of PLMN-IdentityInfoList elements. Each of those elements contains a list of one or more PLMN Identities and additional information associated with those PLMNs. The PLMN index is defined as b1 + b2 + . . . + b(n − 1) + i for the PLMN included at the n-th entry of PLMN-IdentityInfoList and the i-th entry of its corresponding PLMN- |

| CellAccessRelatedInfo field descriptions |
|---|
| IdentityInfo, where b(j) is the number of PLMN-Identity entries in each PLMN-IdentityInfo, respectively. |

Editor's Note: A definition of network indexing for NPNs is for further study (FFS).

Next Modified Subclause (New Information Elements in 6.3.2)

NPN-Identity

The IE NPN-Identity includes either a list of CAG-IDs or a list of NIDs per PLMN Identity. Further information regarding how to set the IE is specified in TS 23.003 [21].

NPN-Identity Information Element

```
-- ASN1START
-- TAG-NPN-IDENTITY-START
NPN-Identity-r16 ::=        CHOICE {
    pni-npn-r16             SEQUENCE {
        plmn-Identity-r16       PLMN-Identity,
        cag-IdentityList-r16        SEQUENCE (SIZE (1..maxNPN-r16)) OF CAG-Identity-r16
    },
    snpn-r16                SEQUENCE {
        plmn-Identity           PLMN-Identity,
        nid-List-r16            SEQUENCE (SIZE (1..maxNPN-r16) OF NID-16
    }
}
CAG-Identity-r16 ::=        BIT STRING (SIZE (32))
NID-r16 ::=                 BIT STRING (SIZE (52))
-- TAG-NPN-IDENTITY-STOP
-- ASN1STOP
```

| NPN-Identity field descriptions |
|---|
| CAG-Identity<br>A CAG-ID as specified in TS 23.003 [21]. The PLMN ID and a CAG ID in the NPN-Identity identifies a PNI-NPN.<br>cag-IdentityList<br>The cag-IdentityList contains one or more CAG-Identity.<br>NID<br>A NID as specified in TS 23.003 [21]. The PLMN ID and a NID in the NPN-Identity identifies a SNPN.<br>nid-List<br>The nid-List contains one or more NID. |

Editor's Notes: (1) the size of NID is to be checked based on CT4 agreements, (2) the need for list of NIDs depends on the RAN sharing scenarios to be supported, and (3) it is FFS whether all CAG identities associated to the same PLMN identity shall be listed in the same cag-IdentityList.

Next Modification (New in Formation Elements in 6.3.2)

NPN-IdentityInfoList

The IE NPN-Identity/InfoList includes a list of NPN identity information.

NPN-IdentityInfoList Information Element

```
-- ASN1START
-- TAG-NPN-IDENTITYINFOLIST-START
NPN-Identity InfoList-r16 ::=           SEQUENCE (SIZE (1..maxNPN-r16)) OF NPN-IdentityInfo-r16
    NPN-IdentityInfo-r16 ::=            SEQUENCE {
        NPN-IdentityList-r16                SEQUENCE (SIZE (1..maxNPN-r16)) OF NPN-Identity-r16,
        trackingAreaCode-r16                TrackingAreaCode,
        ranac-r16                           RAN-AreaCode       OPTIONAL,
-- Need R
        CellIdentity-r16                    CellIdentity,
        cellReserved ForOperatorUse-r16         ENUMERATED {reserved, notReserved},
        . . .
    }
- TAG-NPN-IDENTITYINFOLIST-STOP
-- ASN1STOP
```

| NPN-IdentityInfoList field descriptions |
| --- |
| NPN-IdentityInfo |
| The NPN-IdentityInfo contains one or more NPN identities and additional information associated with those NPNs. Only the same type of NPNs (either SNPNs or PNI-NPNs) can be listed in a NPN-IdentityInfo element. |
| NPN-IdentityList |
| The NPN-IdentityList contains one or more NPN Identity elements. |
| trackingAreaCode |
| Indicates the Tracking Area Code to which the cell indicated by CellIdentity field belongs. |
| ranac |
| Indicates the RAN Area Code to which the cell indicated by CellIdentity field belongs. |
| trackingAreaCode |
| Indicates Tracking Area Code to which the cell indicated by CellIdentity field belongs. |
| cellReservedForOperatorUse |
| Indicates whether the cell is reserved for operator use (for the NPN(s) identified in the npn-IdentyList) as defined in TS 38.304 [20]. |

As can be seen above, the NPN identities are introduced in a separate network list, i.e., an NPN-IdentityInfoList in the cellAccessRelatedInfo. In this way, the broadcast information (SIB1) will be able to indicate to a UE listening, if a cell represented by the SIB1 support access of various NPN network identities.

SUMMARY

There currently exist certain challenge(s). For example, when a UE signals what network, what PLMN or NPN it wants to access, it does so in a procedure referred to as a radio resource control (RRC) Setup Procedure. This procedure is detailed in TS 38.331, and it consists of a three RRC message exchange between the UE and the network. The three messages are shown in FIG. 1. Note, there are actually more messages hidden in this diagram, but they have been omitted for the purposes of focusing on the RRC layer. The reason this is mentioned is that RRCSetupRequest is sometimes referred to as msg3 (as in message 3) and the RRCSetupComplete is referred to as msg5 (or message 5). These msg3 and msg5 references need to be read in context though, in other procedures msg5 may be other messages, e.g., Resume Complete messages.

An RRC Setup Request message is a very short message, including a UE identity or reference and an establishment cause value, i.e., a reason for access. The RRC Setup message includes information from the network on radio bearer configuration, and the RRC setup complete message includes further details on what network the UE wants to access. In particular, this message includes a reference to the network the UE wants to access. This indication is not explicit though, it is not a full PLMN ID, but rather an index that refers to the list of PLMNs that were included in the SIB1 message.

In the standard for PLMN, the PLMN-IdentityInfoList that includes the PLMNs that the UE can access is the input for generating the PLMN-Index, such as:

The PLMN index is defined as $b1+b2+ \ldots +b(n-1)+i$ for the PLAIN included at the n-th entry of PLMN-IdentityInfoList and the i-th entry of its corresponding PLMN-IdentityInfo, where b(i) is the number of PLMN-Identity entries in each PLMN-IdentityInfo, respectively.

Where

PLMN-Identity

The IE PLMN-Identity identifies a Public Land Mobile Network. Further information regarding how to set the IE is specified in TS 23.003 [21].

PLMN-Identity Information Element

```
-- ASN1START
-- TAG-PLMN-IDENTITY-START
PLMN-Identity ::=       SEQUENCE {
  mcc             MCC      OPTIONAL,    -- Cond MCC
  mnc             MNC
}
MCC ::=            SEQUENCE (SIZE (3)) OF MCC-MNC-Digit
MNC ::=            SEQUENCE (SIZE (2..3)) OF MCC-MNC-Digit
MCC-MNC-Digit ::=  INTEGER (0..9)
-- TAG-PLMN-IDENTITY-STOP
-- ASN1STOP
```

| PLMN-Identity field descriptions |
| --- |
| mcc (mobile country code) |
| The first element contains the first MCC digit, the second element the second MCC digit and so on. If the field is absent, it takes the same value as the mcc of the immediately preceding IE PLMN-Identity, See TS 23.003 [21]. |
| mnc (mobile network code) |
| The first element contains the first MNC digit, the second element the second MNC digit and so on. See TS 23.003 [21]. |

| Conditional Presence | Explanation |
| --- | --- |
| MCC | This field is mandatory present when PLMN-Identity is not used in a list or if it is the first entry of PLMN-Identity in a list. Otherwise it is optionally present, Need S. |

PLMN-IdentityInfoList

The IE PLMN-IdentityInfoList includes a list of PLMN identity information.

PLMN-IdentityInfoList Information Element

```
-- ASN1START
-- TAG-PLMN-IDENTITYINFOLIST-START
PLMN-Identity InfoList ::=            SEQUENCE (SIZE (1..maxPLMN) OF PLMN-
Identity Info
  PLMN-Identity Info ::=              SEQUENCE {
    plmn-IdentityList                 SEQUENCE (SIZE (1..maxPLMN)) OF PLMN-Identity,
    tracking AreaCode                 TrackingAreaCode                       OPTIONAL,
-- Need R
    ranac                             RAN-AreaCode                           OPTIONAL,
-- Need R
    CellIdentity                      CellIdentity,
    cellReservedForOperatorUse        ENUMERATED {reserved, notReserved},
```

```
    ...
}
-- TAG-PLMN-IDENTITYINFOLIST-STOP
-- ASN1STOP
```

| PLMN-IdentityInfo field descriptions |
| --- |
| cellReservedForOperatorUse<br>Indicates whether the cell is reserved for operator use (per PLMN), as defined in TS 38.304 [20].<br>trackingAreaCode<br>Indicates Tracking Area Code to which the cell indicated by CellIdentity field belongs. The presence of the field indicates that the cell supports at least standalone operation (per PLMN); the absence of the field indicates that the cell only supports EN-DC functionality (per PLMN). |

The rules simply apply to one list for obvious reasons, as the principles for a UE to generate the index only extended to the PLMNs.

There is currently no solution for how index generation with respect to NPN should be conducted.

Certain aspects of the present disclosure and their embodiments may provide solutions to these or other challenges. In general, certain embodiments of the present disclosure provide solutions for deploying non-public networks and for broadcast and network index generation by network and UE in such networks.

In one aspect of the present disclosure, a method for a UE is provided to generate a network identity index from information provided in broadcast. The network identity index is valid for signaling an intent to access a non-public network.

In another aspect of the present disclosure a method in a network is provided for broadcast of human readable network names for NPNs that are connected to networks in such a way that there is a one-to-one map between an hrnn element in the broadcast of CAGs and NIDs from SIB1 and the new broadcast/new SIB carrying the HRNN.

There are, proposed herein, various embodiments which address one or more of the issues disclosed herein.

According to certain embodiments, a wireless device comprises power supply circuitry configured to supply power to the wireless device and processing circuitry. The processing circuitry is configured detect system information broadcast from a network node. The system information comprises a list of Non-Public Network (NPN) identifiers identifying a plurality of NPNs. The processing circuitry is configured to select a network from the plurality of NPNs and to determine an index value associated with the selected network. When the NPN identifier associated with the selected network comprises a Closed Access Group (CAG) identifier, determining the index value is based at least partially on Public Land Mobile Network (PLMN) identities included in combination with at least one CAG identifier in the list of NPN identifiers. When the NPN identifier associated with the selected network comprises a Network Identifier (NID), determining the index value is based at least partially on a number of NIDs included in the list of NPN identifiers.

According to certain embodiments, a method in a wireless device comprises detecting system information broadcast from a network node. The system information comprises a list of Non-Public Network (NPN) identifiers identifying a plurality of NPNs. The method comprises selecting a network from the plurality of NPNs and determining an index value associated with the selected network. When the NPN identifier associated with the selected network comprises a Closed Access Group (CAG) identifier, determining the index value is based at least partially on Public Land Mobile Network (PLMN) identities included in combination with at least one CAG identifier in the list of NPN identifiers. When the NPN identifier associated with the selected network comprises a Network Identifier (NID), determining the index value is based at least partially on a number of NIDs included in the list of NPN identifiers.

According to certain embodiments, a network node comprises power supply circuitry configured to supply power to the network node. The network node further comprises processing circuitry configured to broadcast system information comprising a list of Non-Public Network (NPN) identifiers identifying a plurality of NPNs and to determine an index value associated with a network of the plurality of NPNs. When the NPN identifier associated with said network comprises a Closed Access Group (CAG) identifier, determining the index value is based at least partially on Public Land Mobile Network (PLMN) identities included in combination with at least one CAG identifier in the list of NPN identifiers. When the NPN identifier associated with said network comprises a Network Identifier (NID), determining the index value is based at least partially on a number of NIDs included in the list of NPN identifiers.

According to certain embodiments, a method in a network node comprises broadcasting system information comprising a list of Non-Public Network (NPN) identifiers identifying a plurality of NPNs and determining an index value associated with a network of the plurality of NPNs. When the NPN identifier associated with said network comprises a Closed Access Group (CAG) identifier, determining the index value is based at least partially on Public Land Mobile Network (PLMN) identities included in combination with at least one CAG identifier in the list of NPN identifiers. When the NPN identifier associated with said network comprises a Network Identifier (NID), determining the index value is based at least partially on a number of NIDs included in the list of NPN identifiers.

According to certain embodiments, a wireless device comprises power supply circuitry configured to supply power to the wireless device and processing circuitry. The processing circuitry is configured to detect first system information broadcast from a network node. The first system information comprises a plurality of Non-Public Network (NPN) elements identifying a plurality of NPNs. The processing circuitry is also configured to detect second system information broadcast from the network node. The second system information comprises a plurality of human readable network name (HRNN) elements. Each HRNN element corresponds to a respective NPN element of the first system information and each HRNN element indicates name information. The name information comprises an HRNN associated with the respective NPN or a "no name" indicator if the second system information does not include any HRNN associated with the respective NPN The processing circuitry is further configured to associate the name information of the second system information with the corresponding NPN element of the first system information. The associating is based on an i:th NPN element corresponding to an i:th HRNN element. The processing circuitry is configured to use the HRNN corresponding to one of the NPN elements to identify the respective NPN associated with said one of the NPN elements.

According to certain embodiments, method in a wireless device comprises detecting first system information broadcast from a network node. The first system information comprises a plurality of Non-Public Network (NPN) elements identifying a plurality of NPNs. The method further comprises detecting second system information broadcast from the network node. The second system information comprises a plurality of human readable network name (HRNN) elements. Each HRNN element corresponds to a respective NPN element of the first system information and each HRNN element indicates name information. The name information comprises an HRNN associated with the respective NPN or a "no name" indicator if the second system information does not include any HRNN associated with the respective NPN. The method further comprises associating the name information of the second system information with the corresponding NPN element of the first system information. The associating is based on an i:th NPN element corresponding to an i:th HRNN element. The method further comprises using the HRNN corresponding to one of the NPN elements to identify the respective NPN associated with said one of the NPN elements.

According to certain embodiments a network node comprises power supply circuitry and processing circuitry. The power supply circuitry is configured to supply power to the network node. The processing circuitry the processing circuitry configured to transmit first system information and to transmit second system information. The first system information comprises a plurality of Non-Public Network (NPN) elements identifying a plurality of NPNs. The second system information comprising a plurality of human readable network name (HRNN) elements, each HRNN element corresponding to a respective NPN element of the first system information such that an i:th NPN element corresponds to an i:th HRNN element. Each HRNN element indicates name information. The name information comprises an HRNN associated with the respective NPN or a "no name" indicator if the second system information does not include any HRNN associated with the respective NPN. The processing circuitry is further configured to use the HRNN corresponding to one of the NPN elements to identify the respective NPN associated with said one of the NPN elements.

According to certain embodiments method in a network node comprises transmitting first system information and transmitting second system information. The first system information comprises a plurality of Non-Public Network (NPN) elements identifying a plurality of NPNs. The second system information comprising a plurality of human readable network name (HRNN) elements, each HRNN element corresponding to a respective NPN element of the first system information such that an i:th NPN element corresponds to an i:th HRNN element. Each HRNN element indicates name information. The name information comprises an HRNN associated with the respective NPN or a "no name" indicator if the second system information does not include any HRNN associated with the respective NPN The method further comprises using the HRNN corresponding to one of the NPN elements to identify the respective NPN associated with said one of the NPN elements.

According to certain embodiments, a wireless device comprises power supply circuitry configured to supply power to the wireless device and processing circuitry configured to detect system information broadcast from a network node. The system information comprises a list of Non-Public Network (NPN) identifiers. The processing circuitry is further configured to generate a network index based on the system information. The network index comprises at least an NPN index. To generate the network index, the processing circuitry is further configured to identify whether the list of NPN identifiers comprises at least one element that includes at least one Closed Access Group (CAG) identifier and, when the list of NPN identifiers comprises the at least one element that includes at least one CAG identifier, generate a CAG index to include as at least part of the NPN index. The CAG index is based at least partially on a number of Public Land Mobile Network (PLMN) elements that are included in combination with at least one of the CAG identifier(s) on the list of NPN identifiers. To generate the network index, the processing circuitry is also configured to identify whether the list of NPN identifiers comprises at least one element that includes at least one Network Identifier (NID) and, when the list of NPN identifiers comprises the at least one element that includes at least one NID, generate a NID index to include as at least part of the NPN index. The NID index based at least partially on a number of NIDs that are included in a list of NIDs.

According to certain embodiments, a wireless device comprises power supply circuitry configured to supply power to the wireless device and processing circuitry configured to detect a first system information broadcast. The first system information broadcast comprises a non-public network (NPN) list. The NPN list indicates a plurality of NPN identifiers, each NPN identifier associated with a respective network of a plurality of networks. The processing circuitry is further configured to detect a second system information broadcast. The second system information broadcast comprises a human readable network name (HRNN) list. The HRNN list indicates a plurality of HRNNs. The processing circuitry is further configured to associate each HRNN of the second system information broadcast with a corresponding NPN identifier of the first system information broadcast, and to use the HRNN corresponding to one of the NPN identifiers to identify the respective network associated with said one of the NPN identifiers.

According to certain embodiments, a wireless device comprises power supply circuitry configured to supply power to the wireless device and processing circuitry configured to determine whether a parameter received from a network node indicates that a cell is a Non-Public Network (NPN)-only cell, and to select a network identity. The network identity is selected from an NPN list when the parameter indicates that the cell is NPN-only, and the network identity is selected from a Public Land Mobile Network (PLMN) list when the parameter indicates that the cell is not NPN-only.

According to certain embodiments, a wireless device comprises power supply circuitry configured to supply power to the wireless device and processing circuitry configured to read a first element from a Public Land Mobile Network list and, in response to detecting said first element as indicating that no normal service is available, select a network identity from a Non-Public Network (NPN) list.

The method further comprises using the network identity to validate system information that has been stored by the wireless device.

According to certain embodiments, a network node comprises processing circuitry configured to generate a network index associated with system information broadcast by the network node. The system information comprises a list of Non-Public Network (NPN) identifiers. The network index comprises at least an NPN index. Generating the network index comprises identifying whether the list of NPN identifiers comprises at least one element that includes at least one Closed Access Group (CAG) identifier and, when the list of NPN identifiers comprises the at least one element that includes at least one CAG identifier, generating a CAG index to include as at least part of the NPN index. The CAG index is based at least partially on a number of Public Land Mobile Network (PLMN) elements that are included in combination with at least one of the CAG identifier(s) on the list of NPN identifiers. Generating the network index also comprises identifying whether the list of NPN identifiers comprises at least one element that includes at least one Network Identifier (NID) and, when the list of NPN identifiers comprises the at least one element that includes at least one NID, generating a NID index to include as at least part of the NPN index. The NID index based at least partially on a number of NIDs that are included in a list of NIDs. According to certain embodiments, the network node further comprises power supply circuitry configured to supply power to the network node.

According to certain embodiments, network node comprises processing circuitry configured to transmit a first system information broadcast. The first system information broadcast comprises a non-public network (NPN) list. The NPN list indicates a plurality of NPN identifiers. Each NPN identifier is associated with a respective network of a plurality of networks. The processing circuitry is further configured to prepare a second system information broadcast. The second system information broadcast comprises a human readable network name (HRNN) list. The HRNN list indicates a plurality of HRNNs. The second system information broadcast is configured to enable a wireless device to associate each HRNN of the second system information broadcast with a corresponding NPN identifier of the first system information broadcast. The processing circuitry is further configured to transmit the second system information broadcast. In some embodiments, the processing circuitry is further configured to use the HRNN corresponding to one of the NPN identifiers to identify the respective network associated with said one of the NPN identifiers. According to certain embodiments, the network node further comprises power supply circuitry configured to supply power to the network node.

According to certain embodiments, a network node comprises processing circuitry configured to transmit a parameter to a wireless device. The parameter indicates that a cell is a Non-Public Network (NPN)-only cell. The processing circuitry is further configured to receive a selection of a network identity from the wireless device, wherein the network identity is selected from an NPN list when the parameter indicates that the cell is NPN-only, and the network identity is selected from a Public Land Mobile Network (PLMN) list when the parameter indicates that the cell is not NPN-only. According to certain embodiments, the network node further comprises power supply circuitry configured to supply power to the network node.

According to certain embodiments, a network node comprises processing circuitry configured to send a wireless device a first element of a Public Land Mobile Network (PLMN) list, the first element of the PLMN list indicating that no normal service is available, thereby indicating that the wireless device is to select a network identity from a Non-Public Network (NPN) list and use the network identity to validate system information that has been stored by the wireless device. According to certain embodiments, the network node further comprises power supply circuitry configured to supply power to the network node.

According to certain embodiments, a method in a wireless device comprises detecting system information broadcast from a network node. The system information comprises a list of Non-Public Network (NPN) identifiers. The method further comprises generating a network index based on the system information. The network index comprises at least an NPN index. Generating the network index comprises identifying whether the list of NPN identifiers comprises at least one element that includes at least one Closed Access Group (CAG) identifier and, when the list of NPN identifiers comprises the at least one element that includes at least one CAG identifier, generating a CAG index to include as at least part of the NPN index. The CAG index is based at least partially on a number of Public Land Mobile Network (PLMN) elements that are included in combination with at least one of the CAG identifier(s) on the list of NPN identifiers. Generating the network index also comprises identifying whether the list of NPN identifiers comprises at least one element that includes at least one Network Identifier (NID) and, when the list of NPN identifiers comprises the at least one element that includes at least one NID, generating a NID index to include as at least part of the NPN index. The NID index based at least partially on a number of NIDs that are included in a list of NIDs.

According to certain embodiments, a method in a wireless network comprises detecting a first system information broadcast. The first system information broadcast comprises a non-public network (NPN) list. The NPN list indicates a plurality of NPN identifiers, each NPN identifier associated with a respective network of a plurality of networks. The method further comprises detecting a second system information broadcast. The second system information broadcast comprises a human readable network name (HRNN) list. The HRNN list indicates a plurality of HRNNs. The method further comprises associating each HRNN of the second system information broadcast with a corresponding NPN identifier of the first system information broadcast and using the HRNN corresponding to one of the NPN identifiers to identify the respective network associated with said one of the NPN identifiers.

According to certain embodiments, a method in a wireless device comprises determining whether a parameter received from a network node indicates that a cell is a Non-Public Network (NPN)-only cell and selecting a network identity. The network identity is selected from an NPN list when the parameter indicates that the cell is NPN-only, and the network identity is selected from a Public Land Mobile Network (PLMN) list when the parameter indicates that the cell is not NPN-only.

According to certain embodiments, a method in a wireless device comprises reading a first element from a Public Land Mobile Network list and, in response to detecting said first element as indicating that no normal service is available, selecting a network identity from a Non-Public Network (NPN) list. The method further comprises using the network identity to validate system information that has been stored by the wireless device.

According to certain embodiments, a method in a network node comprises generating a network index associated with system information broadcast by the network node. The system information comprises a list of Non-Public Network (NPN) identifiers. The network index comprises at least an NPN index. Generating the network index comprises identifying whether the list of NPN identifiers comprises at least one element that includes at least one Closed Access Group (CAG) identifier and, when the list of NPN identifiers comprises the at least one element that includes at least one CAG identifier, generating a CAG index to include as at least part of the NPN index. The CAG index is based at least partially on a number of Public Land Mobile Network (PLMN) elements that are included in combination with at least one of the CAG identifier(s) on the list of NPN identifiers. Generating the network index also comprises identifying whether the list of NPN identifiers comprises at least one element that includes at least one Network Identifier (NID) and, when the list of NPN identifiers comprises the at least one element that includes at least one NID, generating a NID index to include as at least part of the NPN index. The NID index based at least partially on a number of NIDs that are included in a list of NIDs.

According to certain embodiments, a method in a network node comprises transmitting a first system information broadcast. The first system information broadcast comprises a non-public network (NPN) list. The NPN list indicates a plurality of NPN identifiers. Each NPN identifier is associated with a respective network of a plurality of networks. The method further comprises preparing a second system information broadcast. The second system information broadcast comprises a human readable network name (HRNN) list. The HRNN list indicates a plurality of HRNNs. The second system information broadcast is configured to enable a wireless device to associate each HRNN of the second system information broadcast with a corresponding NPN identifier of the first system information broadcast. The method further comprises transmitting the second system information broadcast. In some embodiments, the method further comprises using the HRNN corresponding to one of the NPN identifiers to identify the respective network associated with said one of the NPN identifiers.

According to certain embodiments, a method in a network node comprises transmitting a parameter to a wireless device. The parameter indicates that a cell is a Non-Public Network (NPN)-only cell. The method further comprise receiving a selection of a network identity from the wireless device, wherein the network identity is selected from an NPN list when the parameter indicates that the cell is NPN-only, and the network identity is selected from a Public Land Mobile Network (PLMN) list when the parameter indicates that the cell is not NPN-only.

According to certain embodiments, a method in a network node comprises sending a wireless device a first element of a Public Land Mobile Network (PLMN) list, the first element of the PLMN list indicating that no normal service is available, thereby indicating that the wireless device is to select a network identity from a Non-Public Network (NPN) list and use the network identity to validate system information that has been stored by the wireless device.

According to certain embodiments, a computer program comprises instructions which when executed on a computer perform any of the steps of any of the above-described methods.

According to certain embodiments, a computer program product comprises a computer program. The computer program comprises instructions which when executed on a computer perform any of the steps of any of the above-described methods.

According to certain embodiments, a non-transitory computer-readable storage medium or carrier comprises a computer program. The computer program comprises instructions which when executed on a computer perform any of the steps of any of the above-described methods.

Certain embodiments may provide one or more of the following technical advantage(s). For example, the present disclosure provides a simple way of generating a network Identity Index that extends over both the NPN and the PLMN identity lists. One of the main advantages with this is that it is a solution that is compatible with other parts of the standard and does not force new implementation of common messages such as, e.g., setupcomplete message. Another advantage with the present disclosure is that it provides a simple solution for how HRNN shall be broadcast and how it shall connect to the NPN list as broadcast in SIB1.

BRIEF DESCRIPTION OF THE DRAWINGS

For a more complete understanding of the disclosed embodiments and their features and advantages, reference is now made to the following description, taken in conjunction with the accompanying drawings, in which:

FIG. 22 illustrates an example of a method in accordance with some embodiments;

DETAILED DESCRIPTION

Figure 1:
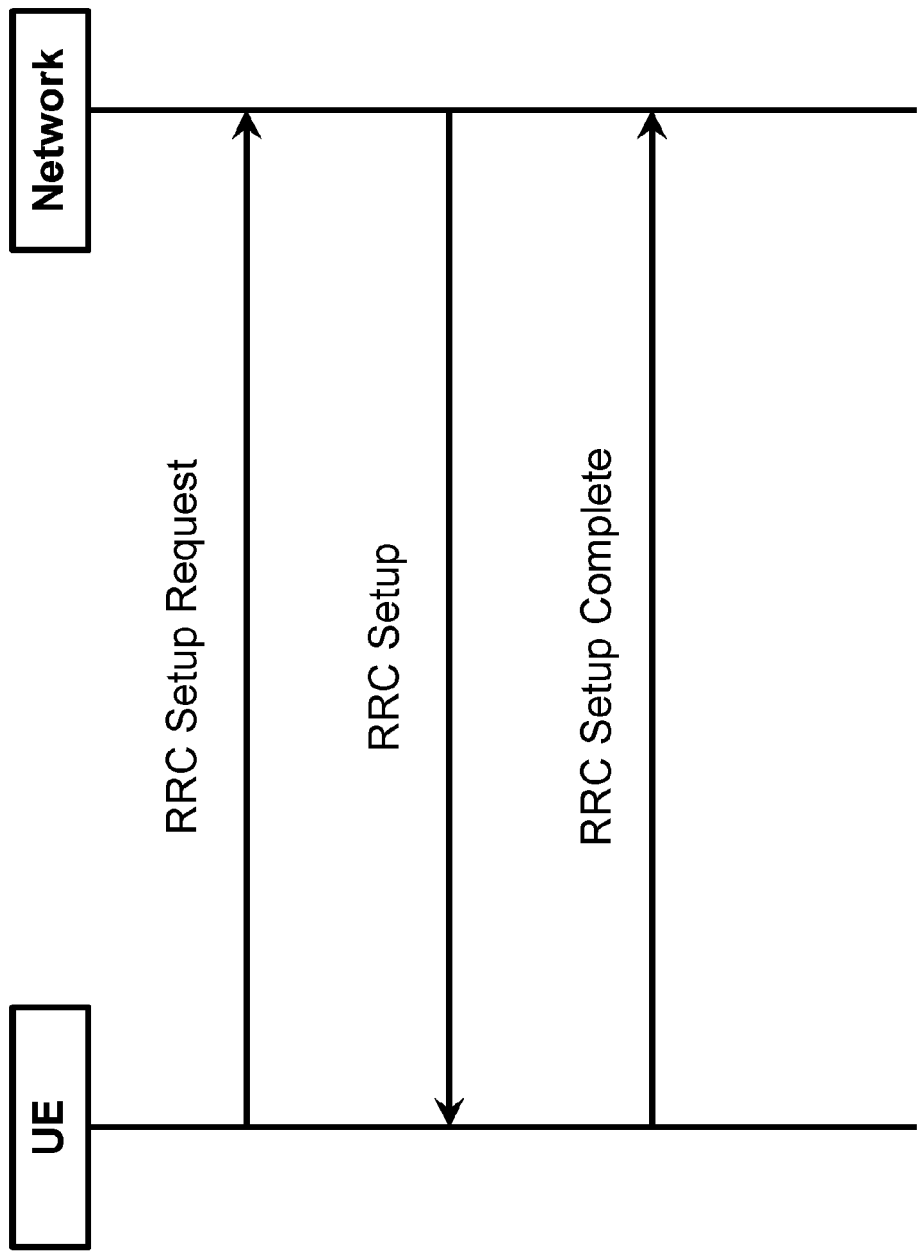
FIG. 1 illustrates an example of a message flow for a radio resource control (RRC) setup.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

CAG Identifiers Related to Same PLMN

In one aspect of the present disclosure, a solution for how to generate a network index over more than one network list is provided. The network lists are in one embodiment, a list of PLMNs and a list of NPNs.

The list of NPNs may be further split into a list of:
PLMN+CAG IDs; and
PLMN+Network IDs (also referred to as "NTDs" for short).

Depending on the context, the denotation "PLMN" sometimes refers to the identifier PLMN ID consisting of a Mobile Country Code (MCC) and a Mobile Network Code (MNC), and sometimes the denotation "PLMN" refers to a public network identified with a PLMN ID. To make it clear when the ID portion is being referred to, the PLMN ID may sometimes be referred to by a "MCC, MNC" denotation. It should be understood that the "MCC, MNC" denotation refers to the same thing as PLMN ID.

When generating a network index for various network types, some rules for what information to indicate with an index and how to indicate that information are needed. For example, in the case where an operator operates a PLMN represented by a PLMN ID, one such rule should clarify whether a CAG ID broadcast together with that PLMN ID can have the same network index as another CAG ID that is broadcast together with the same PLMN ID.

The proposed structure for the element containing the CAG ID suggests that several CAG IDs can be gathered if they are served using the same PLMN ID. This is illustrated below:

NPN-Identity Information Element

```
-- ASN1START
-- TAG-NPN-IDENTITY-START
NPN-Identity-r16 ::=         CHOICE {
    pni-npn-r16              SEQUENCE {
        plmn-Identity-r16        PLMN-Identity,
        cag-IdentityList-r16       SEQUENCE (SIZE (1..maxNPN-r16)) OF CAG-Identity-r16
    },
    snpn-r16                 SEQUENCE {
        plmn-Identity            PLMN-Identity,
        nid-List-r16             SEQUENCE (SIZE (1..maxNPN-r16) OF NID-r16
    }
}
CAG-Identity-r16 ::=     BIT STRING (SIZE (32))
NID-r16 ::=              BIT STRING (SIZE (52))
-- TAG-NPN-IDENTITY-STOP
-- ASN1STOP
```

Thus, it is both possible to gather CAG IDs in one NPN-Identity element, or it is possible to create several NPN-Identity elements and assign different CAG IDs to each element, but repeat the same plmn-Identity to the elements. Both are possible. In the case where CAG IDs of the same PLMN ID are broadcast in different NPN-Identity elements, it would be possible to assign different cellIdentities to them by listing them in different NPN-IdentityInfo elements, see below.

NPN-IdentityInfoList Information Element

```
-- ASN1START
-- TAG-NPN-IDENTITYINFOLIST-START
    NPN-Identity InfoList-r16 ::=        SEQUENCE (SIZE (1..maxNPN-r16)) OF NPN-
IdentityInfo-r16
    NPN-IdentityInfo-r16 ::=             SEQUENCE {
        NPN-IdentityList-r16                 SEQUENCE (SIZE (1..maxNPN-r16) OF NPN-
Identity-r16,
        trackingAreaCode-r16                 TrackingAreaCode,
        ranac-r16                        RAN-AreaCode                            OPTIONAL,
-- Need R
        CellIdentity-r16                 CellIdentity,
        cellReservedForOperatorUse-r16       ENUMERATED {reserved, notReserved},
        ...
    }
-- TAG-NPN-IDENTITYINFOLIST-STOP
-- ASN1STOP
```

In situations when an operator wants to treat a CAG ID different from other CAG IDs being broadcast by the operator, certain embodiments create an NPN-Identity element with that specific CAG only. This element can then, if listed as a single element in the NPN-IdentityList, be provided both unique tracking area codes, unique RANACs and unique CellIdentity values and, since it is getting a unique network index, even separate unified access control parameters, UACs.

With this being recognized, a challenge associated with defining an index comes from the fact that index definition needs to be treated differently depending on whether an NPN-Identity element (defined above) contains CAGs or whether the NPN-Identity element contains NIDs. Similarly, a challenge associated with generating an index (e.g., in the case of a UE) comes from the fact that index generation needs to be treated differently depending on whether an NPN-Identity element contains CAGs or NIDs.

One of the main reasons for this is that there can be a wish to not create index values for different CAGs within the same NPN-Identity element, i.e., within the same list. According to one aspect of the present disclosure, all CAGs that are listed within one and the same NPN-Identity will be defined as having the same network index value, and rules are provided for how the UE should generate the index value of a certain network type.

Definitions of NPN-IdentityInfoList and Plmn-Identity List.

NPN-IdentityInfoList
The NPN-IdentityInfoList is used to configure 1 set of NPN-IdentityInfoList elements. Each of those elements contains a list of one or more NPN Identities and additional information associated with those NPNs. The total number of PLMNs (identified by a PLMN identity in plmn -IdentityList), PNI-NPNs (identified by a PLMN identity and a CAG-ID), and SNPNs (identified by a PLMN identity and a NID) together in the PLMN-IdentityInfoList and NPN-IdentityInfoList does not exceed 12, except for the NPN-only cells. In case of NPN-only cells the PLMN-IdentityList contains a single element that does not count to the limit of 12.
plmn-IdentityList
The plmn-IdentityList is used to configure 1 set of PLMN-IdentityInfoList elements. Each of those elements contains a list of one or more PLMN Identities and additional information associated with those PLMNs. The PLMN index is defined as $b1 + b2 + \ldots + b(n-1) + i$ for the PLMN included at the n-th entry of PLMN-IdentityInfoList and the i-th entry of its corresponding PLMN-IdentityInfo, where $b(j)$ is the number of PLMN-Identity entries in each PLMN-IdentityInfo, respectively.

The network index is mainly to be used for telling the network side (the access node, e.g., gNB) what network a user/UE is aiming to access. The network index is also used by the network to refer to unified access control parameters (e.g., barring factor and barring time) on a per network level (indicated as UAC-BarringPerPLMN as indicated below).

For PLMNs, the UE needs to signal the selected network to the RAN at connection setup (setup complete) so that the RAN can select the correct AMF. This is done by indicating the index, see below:

```
    RRCSetupComplete-IEs ::=         SEQUENCE {
        selectedPLMN-Identity            INTEGER (1..maxPLMN),
        registeredAMF                    RegisteredAMF              OPTIONAL,
        guami-Type                       ENUMERATED {native, mapped}    OPTIONAL,
        s-NSSAI-List                     SEQUENCE (SIZE (1..maxNrofS-NSSAI) OF S-NSSAI
OPTIONAL,
        dedicatedNAS-Message             DedicatedNAS-Message,
        ng-5G-S-TMSI-Value               CHOICE {
            ng-5G-S-TMSI                     NG-5G-S-TMSI,
            ng-5G-S-TMSI-Part2                   BIT STRING (SIZE (9))
        }                                            OPTIONAL,
        lateNonCriticalExtension         OCTET STRING               OPTIONAL,
        nonCriticalExtension             SEQUENCE{ }                OPTIONAL
    }
    Similarly, for unified access control (UAC), the PLMN index is used to signal UAC-
specific barring parameters.
    UAC-BarringPerPLMN-List ::=             SEQUENCE (SIZE (1..maxPLMN) OF UAC-
BarringPerPLMN
    UAC-BarringPerPLMN ::=           SEQUENCE {
        plmn-IdentityIndex               INTEGER (1..maxPLMN),
        uac-ACBarringListType            CHOICE{
```

-continued

```
      uac-ImplicitACBarringList         SEQUENCE (SIZE(maxAccessCat-1) OF UAC-
BarringInfoSetIndex,
      uac-ExplicitACBarringList         UAC-BarringPerCatList
    } OPTIONAL    -- Need S
}
```

The index is not explicitly included in SIB1, but is generated by the UE from the SIB1 broadcast using the rule stated in TS 38.331 as included above, i.e.:

The PLMN index is defined as b1+b2+ . . . +b(n−1)+1 for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively As the framework and functionality related to the plmn-IdentityIndex and the selectedPLMN-Identity is all in place, it would be preferable if it can be re-used as much as possible. This embodiment proposes to build on the plmn-IdentityIndex also for the NPNs in order to avoid changes outside of the broadcast information in SIB1. Thus, to index NPNs, according to the present disclosure, the NPN indexes should be possible to use exactly the same way as in the way the PLMN index is used.

An important aspect of an index is that it should point to a specific PLMN or network (PNI NPN represented by CAG or SNPN). Thus, the indexing must be done such that when the PLMN can be varied, the index needs to be stepped. The PLMN is currently proposed to be included in the NPN Identity element and therefore, the NPN-Identity needs to be a basis for stepping the index. Thus, indexing needs to be based on the element that can vary PLMN, such as NPN-identity.

With the proposed NPN-list and structure of NPN-IdentityInfoList, one way of describing and generating the index is to separate it in three parts:

PLMN-index (as already defined)
CAG-index—PNI-NPN w CAG index (see below)
NID-index—SNPN/NID index Certain embodiments use this separation to control when to step the index. For example, a list of CAG indexes in one-and-the-same cag-IdentityList should not step the index, whereas the NIDs in the nid-List should step the index.

In this context, for sharing scenarios, it is necessary to not mix lists of cag-IdentityList and nid-IdentityList. A feasible way forward is to always broadcast such that PLMNs have lowest index, then CAGs, then NIDs. The order of low to high index shall be PLMN-CAG/PNI-NPN-NID/SNPN.

According to one aspect of the present disclosure, the CAG-index is defined as:

PLMN-index+x, for a CAG ID in the xth cag-IdentityList (in order) Thus, all CAG IDs within one and the same cag-IdentityList should have the same CAG-index.

The NID-index is defined as:

PLMN-index+CAG index+$N1-N2+ \ldots +N(n-1)+p$ for the NID in position p in the nth nid-List where N(s) is the number of NIDs in each nid-List respectively.

Using the index definition above, all NIDs will have a separate index and all CAGs that are gathered in the same cag-IdentityList will have the same index. Thus, the CAG-index and NID index are generated in the UE and in the Network such that:

CAG index=PLMN−index+x in the xth cag-IdentityList

NID index=PLMN-index+CAG-index+N1−N2+ . . . +N(n−1)+p, for the NID in position p in the nth nid-List where N(s) is the number of NIDs in each nid-List respectively.

The above can be expressed in other ways, such as making reference to the structure of the signaling, where, references can be made to:

```
NPN-IdentityInfoList
  NPN-IdentityInfo
    NPN-IdentityList
      NPN Identity
        PLMN-Identity and cag or NID list
```

For simplicity, the above description has left out the steps between NPN-IdentityInfoList and CAG/NID elements in the cag-Identity list or NID lists as they would make for more complex expressions.

It is of course also possible to make reference to in what identityLists and Identity Info elements that a certain CAG ID is included, but as long as there is a well-defined order, this doesn't change the index value.

Another aspect in connection to index definition is when the parameter cellReservedForOtherUse is set to true. This means that there is no element in the PLMN list that can be accessed (networks in the PLMN list w, ill be barred).

This means in effect that the complete PLMN-list is disabled (barred for all UEs), and then it makes sense that there is no plmn-IdentityIndex count at all, i.e., the PLMN index value when signaling an NPN shall be zero. Thus, when generating an index for CAG or for NID, certain embodiments include an additional condition that when cellReservedForOtherUse is set to true, generating an NPN-index (CAG index, NID index) shall count the PLMN-index part as zero.

Figure 2:
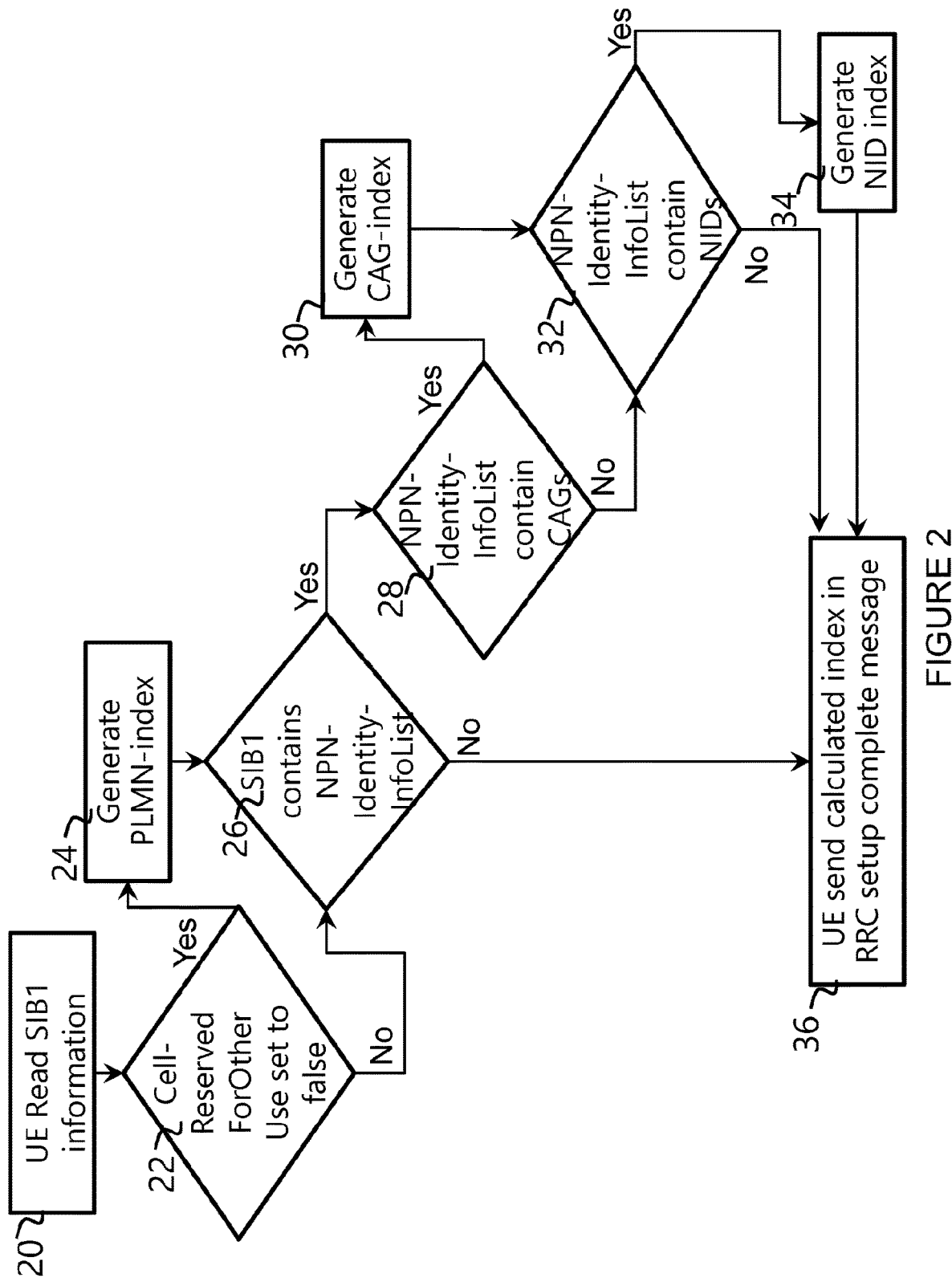
FIG. 2 illustrates an example of a method in accordance with some embodiments.

An illustration of the different steps of generating index values in a UE is illustrated in FIG. 2.

In a first step 20, UE reads SIB1 and first detects if the parameter cellReservedForOtherUse is set to True or False. If it is set to True, the UE should skip to step 26. If it is set to False, the UE should generate index (PLMN-index shown in step 24), according to definition, of the PLMNs listed in the PLMN Identity list, and should then proceed to step 26. In a next step 26, it should be checked if an NPN-Identity list is present in the broadcast. If the NPN-Identity list is not present, the UE should skip to step 36. If the NPN-Identity list is present, it should be checked whether the list includes CAG IDs (step 28). If the list does not include any CAG IDs, the UE skips to step 32. If the list includes one or more CAG IDs, the UE performs step 30 to generate an index set for the CAG IDs, according to the rules listed above, and then proceeds to step 32. As a next step 32, there is a check to see whether there are NIDs in the NPN-IdentityList. If there are not any NIDs in the NPN-IdentityList, the procedure skips to step 36. If there are one or more NIDs in the NPN-IdentityList, the UE performs step 34 (generating NID index according to the rules discussed above) and then proceeds to step 36. At step 36, the method ends by UE transmitting the calculated index indicating the network identity of the network to which the UE aims to access and setup an RRC connection.

Even though the illustration above is for UE, it is actually a network task to also generate an index according to the same procedure, as it is needed in connection with determining if or when the network should be configured to broadcast PLMN or network specific UAC parameters.

After the procedure illustrated above, the next step for a UE, e.g., in a situation when an attempt to access a network is being in progress, UE should format an RRCSetupComplete message including an index indication corresponding to the network the UE/user aims to access.

In another aspect of the present disclosure, there is a need to support broadcast of human readable network names (HRNNs) for all CAGs broadcast and SNPNs (MCC, MNC, NID combinations). Thus, readable names can be broadcast for HRNN for CAG cells and SNPN cells.

According to one aspect of the present disclosure, instead of using the index created in the previous steps, the HRNN broadcast is done using anew SIB, a SIBx, including as many elements as the number of CAGs and NIDs that are included in the SIB1 broadcast. If there are networks that should not have an HRNN, then an element is any way included, but the content of this element is set to "empty" or "no name" or some other indication that indicates that some networks don't actually broadcast a human readable network name. This parameter could also be just a "false" indication.

According to one aspect of the present disclosure, advantages are recognized in including as many elements as there are CAG IDs and NIDs. An alternative approach. e.g., to use the index as generated by the UE or the network and as described above, would not allow for the possibility to list HRNNs for CAGs that are part of the same CAG list, since these CAGs may then have the same network index. Thus, a solution that would use an index would need to account for the index being stepped for all CAGs and all NIDs. However, the challenge was that CAGs in the same list should not step the index and then it cannot be used directly to associate with an HRNN. It would have been advantageous if it would have been possible to reuse the index used for UAC and for msg5 (as described above). However, because this would not allow different HRNNs for CAGs that are gathered under one-and-the-same Cag-IdentityList element, another index would be needed. An alternative solution, and perhaps the most straightforward, would be to create a separate index stepped over all CAGs and NIDS, and to associate this with the HRNN list. An alternative approach, according to another embodiment of the present disclosure, would thus be to create a second index, a CAG-NID-index, and associate this with the HRNN in an HRNN broadcast. This is considered an alternative to the case where the new SIB for HRNN would have the same amount of HRNN elements as the number of CAGs and NIDs in SIB1 where the elements can also be empty.

The following provides an example of an HRNN according to one embodiment of the present disclosure:
SIBx The IE SIBx contains Human-Readable Network Names (HRNN)
SIBx Information Element

```
-- ASN1START
-- TAG-SIBx-START
SIBx ::=            SEQUENCE {
   hrnn-List        SEQUENCE (SIZE (1..maxNPN-r16) OF HRNN
   ...
}
HRNN ::=            CHOICE {
   hrnn             OCTET STRING (size (1..48)),
   noHRNN           ENUMERATED {true}
}
-- TAG-SIBx-STOP
-- ASN1STOP
```

| SIBx field descriptions |
|---|
| hrnnList |
| List of HRNNs. The i:th entry corresponds to the i:th NPN (either PNI-NPI identified by PLMN identity and CAG-ID or SNPN identified by a PLMN identity and a NID) in the NPN-IdentityInfoList. |
| hrnn |
| Carries the name of the NPN, coded in UTF-8 with variable number of bytes per character |

In connection to when UE, is reading system information and, in particular, when it is acquiring SIB1 information to enable the UE to re-use stored system information, SIBs in NR (except SIB1, SIB6, SIB7 or SIB8) are associated with a value tag. A stored SIB is considered valid if it was acquired less than 3 hours ago and the value tag matches the value tag provided for that SIB in SIB1. A SIB can additionally be associated with a validity area tag to allow the same SIB to be re-used in more than one cell—in this case the area id must also match the area id in SIB1 for the stored SIB to be considered valid.

When validating the value tag the UE must also check that the PLMN ID and, optionally (depending on if the SIB is cell specific), Cell ID of the stored SIB matches the PLMN ID and Cell ID broadcasted in SIB1. Comparing the PLMN ID is slightly problematic though since there may be multiple PLMN IDs associated with the cell due to RAN sharing. In Rel-15, this was solved by using the first PLMN ID broadcasted in SIB11 for the comparison.

The UE shall:
1> delete any stored version of a SIB after 3 hours from the moment it was successfully confirmed as valid;
1> for each stored version of a SIB:
  2> if the areaScope is associated and its value for the stored version of the SIB is the same as the value received in the si-SchedulingInfo for that SIB from the serving cell:
    3> if the first PLMN-Identity included in the PLMN-IdentityInfoList, the systemInformationAreaID and the valueTag that are included in the si-SchedulingInfo for the SIB received from the serving cell are identical to the PLMN-Identity, the systemInformationAreaID and the valueTag associated with the stored version of that SIB:
      4> consider the stored SIB as valid for the cell;

```
2>   if the areaScope is not present for the stored version of the SIB and the areaScope value
is not included in the si-SchedulingInfo for that SIB from the serving cell:
        3>         if the first PLMN-Identity in the PLMN-IdentityInfoList, the CellIdentity and
        valueTag that are included in the si-SchedulingInfo for the SIB received from the serving
        cell are identical to the PLMN-Identity, the CellIdentity and the valueTag associated with
        the stored version of that SIB:
            4>      consider the stored SIB as valid for the cell;
```

The fact that the first PLMN ID is used in the SI validation could potentially cause problems for NPN-only cells. Since it has been agreed that NPNs are provided in a separate network list, in case of "npn-only-cells" the PLMN list value may simply be a "dummy value" and nothing to rely on for purposes of SI validity. Further, and in particular for SNPN, it may not be enough to just have the PLMN-part since that may not be unique, in particular not as MCC=999 is used whenever an operator PLMN is not used. For SNPN, the NID is really needed too.

For the above purposes and according to another aspect of the present disclosure, it is proposed that the UE should validate according to above, if the cellReservedForOperatorUse is set to "false." If the cellReservedForOperatorUse is set to "true" (npn-only), the first network element in the NPN-IdentityInfoList shall be used. If this element is an SNPN element, it should also include the NID portion.

In another aspect of the present disclosure, if a "PLMN Dummy value" is a standardized value that is used to basically have a non-empty PLMN list, then a UE may very well recognize that it should take the first element of the NPN list instead by detecting the dummy value. Then it wouldn't have to detect or read the cellReservedForOtherUse value. Thus, according to one aspect of the present disclosure, when cellReservedForOtherUse is set to true, UE shall use first network identity (PLMN, SNPN) in the NPN-IdentityInfoList instead of in the PLMN-IdentityInfoList. If the first network identity is an SNPN identity, both PLMN and NID shall be used when validating stored SI.

The following illustrates the changes made to the 3GPP TS 38.331 specification.

5.2.2.2.1 SIB Validity

The UE shall apply the system information (SI) acquisition procedure as defined in clause 5.2.2.3 upon cell selection (e.g., upon power on), cell-reselection, return from out of coverage, after reconfiguration with sync completion, after entering the network from another RAT, upon receiving an indication that the system information has changed, upon receiving a PWS notification; and whenever the UE does not have a valid version of a stored SIB.

When the UE acquires a MIB (Master Information Block) or a SIB1 or an SI message in a serving cell as described in clause 5.2.2.3, and if the UE stores the acquired SIB, then the UE shall store the associated areaScope, if present, the network identity (PLMN-Identity or PLMN-Identity+NID), the CellIdentity, the systemInformationAreaID, if present, and the valueTag, if present, as indicated in the si-SchedulingInfo for the SIB. The UE may use a valid stored version of the SI except MIB, SIB1, SIB6, SIB7 or SIB8, e.g., after cell re-selection, upon return from out of coverage or after the reception of SI change indication.

NOTE: The storage and management of the stored SIBs in addition to the SIBs valid for the current serving cell is left to UE implementation.

The UE shall:
```
1>  if cellReservedForOtherUse is set to false:
    2>  use the first first PLMN-Identity in the PLMN-IdentityInfoList as network identity and the associated CellIdentity for the SIB validity check;
    2>  else:
    2>  if the first NPN-Identity in the NPN-IdentityInfoList is a pni-npn:
        3>  use the PLMN-Identity in the NPN-Identity as network identity and the associated CellIdentity for the SIB validity check;
    2>  if the first NAM-Identity in the NPN-IdentityInfoList is a snpn:
        3>  use the PLMN-Identity and the first NID in the NPN-Identity as network identity and the associated CellIdentity for the SIB validity check;
1>  delete any stored version of a SIB after 3 hours from the moment it was successfully confirmed as valid;
1>  for each stored version of a SIB:
    2>  if the areaScope is associated and its value for the stored version of the SIB is the same as the value received in the si-SchedulingInfo for that SIB from the serving cell:
        3>  if the network identity, the systemInformationAreaID and the valueTag that are included in the si-SchedulingInfo for the SIB received from the serving cell are identical to the network identity, the systemInformationAreaID and the valueTag associated with the stored version of that SIB:
            4>  consider the stored SIB as valid for the cell;
    2>  if the areaScope is not present for the stored version of the SIB and the areaScope value is not included in the si-SchedulingInfo for that SIB from the serving cell:
        3>  if the network identity, the CellIdentity and valueTag that are included in the si-SchedulingInfo for the SIB received from the serving cell are identical to the network identity, the CellIdentity and the valueTag associated with the stored version of that SIB:
            4>  consider the stored SIB as valid for the cell;
```

Next Modified Subclause

The following paragraphs describe additional changes to the 3GPP TS 38.331 specification, beginning with Section 5.5.5.1 ("General"). This section of TS 38.331 includes "FIG. 5.5.5.1-1: Measurement reporting," which illustrates a UE that sends a MeasurementReport message to a Network. The purpose of this procedure is to transfer measurement results from the UE to the network. The UE shall initiate this procedure only after successful access stratum (AS) security activation.

For the measId for which the measurement reporting procedure was triggered, the UE shall set the measResults within the MeasurementReport message as follows:

1> set the measId to the measurement identity that triggered the measurement reporting;
1> for each serving cell configured with servingCellMO:
   2> if the reportConfig associated with the measId that triggered the measurement reporting includes rsType:
      3> if the serving cell measurements based on the rsType included in the reportConfig that triggered the measurement report are available:
         4> set the measResultServingCell within measResultServingMOList to include Reference Signal Received Power (RSRP), Reference Signal Received Quality (RSRQ) and the available signal-to-interference-plus-noise ratio (SINR) of the serving cell, derived based on the rsType included in the reportConfig that triggered the measurement report;
   2> else:
      3> if synchronization signal block (SSB) based serving cell measurements are available:
         4> set the measResultServingCell within measResultServingMOList to include RSRP, RSRQ and the available SINR of the serving cell, derived based on SSB;
      3> else if Channel State Information Reference Signal (CSI-RS) based serving cell measurements are available:
         4> set the measResultServingCell within measResultServingMOList to include RSRP, RSRQ and the available SINR of the serving cell, derived based on CSI-RS;
1> set the servCellId within measResultServingMOList to include each NR serving cell that is configured with servingCellMO, if any;
1> if the reportConfig associated with the measId that triggered the measurement reporting includes reportQuantityRS-Indexes and maxNrofRS-IndexesToReport:
   2> for each serving cell configured with servingCellMO, include beam measurement information according to the associated reportContfig as described in 5.5.5.2;
1> if the reportConfig associated with the measId that triggered the measurement reporting includes reportAddNeighMeas:
   2> for each measObjectId referenced in the measIdList which is also referenced with servingCellMO, other than the measObjectId corresponding with the measId that triggered the measurement reporting
      3> if the measObjectNR indicated by the servingCellMO includes the RS resource configuration corresponding to the rsType indicated in the reportConfig:
         4> set the measResultBestNeighCell within measResultServingMOList to include the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR;
         4> if the reportConfig associated with the measId that triggered the measurement reporting includes reportQuantityRS-Indexes and maxNrofRS-IndexesToReport:
            5> for each best non-serving cell included in the measurement report:
               6> include beam measurement information according to the associated reportConfig as described in 5.5.5.2;
1> if the reportConfig associated with the measId that triggered the measurement reporting is set to eventTriggered and eventID is set to eventA3, or eventA4, or eventA5 or eventB1, or eventB2:
   2> if the UE is in NE-DC and the measurement configuration that triggered this measurement report is associated with the MCG:
      3> set the measResultServFreqListEUTRA-SCG to include an entry for each E-UTRA SCG serving frequency with the following:
         4> include carrierFreq of the E-UTRA serving frequency;
         4> set the measResultServingCell to include the available measurement quantities that the UE is configured to measure by the measurement configuration associated with the SCG;
         4> if reportConfig associated with the measId that triggered the measurement reporting includes reportAddNeighMeas:
            5> set the measResultServFreqListEUTRA-SCG to include within measResultBestNeighCell the quantities of the best non-serving cell, based on RSRP, on the concerned serving frequency;
1> if reportConfig associated with the measId that triggered the measurement reporting is set to eventTriggered and eventID is set to eventA3, or eventA4, or eventA3:
   2> if the UE is in NR-DC and the measurement configuration that triggered this measurement report is associated with the MCG:
      3> set the measResultServFreqListNR-SCG to include for each NR SCG serving cell that is configured with servingCellMO, if any, the following:
         4> if the reportConfig associated with the measId that triggered the measurement reporting includes rsType:
            5> if the serving cell measurements based on the rsType included in the reportConfig that triggered the measurement report are available according to the measurement configuration associated with the SCG:
               6> set the measResultServingCell within measResultServFreqListNR-SCG to include RSRP, RSRQ and the available SINR of the serving cell, derived based on the rsType included in the reportConfig that triggered the measurement report;
         4> else:
            5> if SSB based serving cell measurements are available according to the measurement configuration associated with the SCG:
               6> set the measResultServingCell within measResultServFreqListNR-SCG to include RSRP, RSRQ and the available SINR of the serving cell, derived based on SSB;

5> else if CSI-RS based serving cell measurements are available according to the measurement configuration associated with the SCG:
6> set the measResultServingCell within measResultServFreqListNR-SCG to include RSRP, RSRQ and the available SINR of the serving cell, derived based on CSI-RS;
4> if results for the serving cell derived based on SSB are included:
5> include the ssbFrequency to the value indicated by ssbFrequency as included in the MeasObjectNR of the serving cell;
4> if results for the serving cell derived based on CSI-RS are included:
5> include the refFreqCSI-RS to the value indicated by refFreqCSI-RS as included in the MeasObjectNR of the serving cell;
4> if the reportConfig associated with the measId that triggered the measurement reporting includes reportQuantityRS-Indexes and maxNrofRS-IndexesToReport:
5> for each serving cell configured with servingCellMO, include beam measurement information according to the associated reportConfig as described in 5.5.5.2, where availability is considered according to the measurement configuration associated with the SCG;
4> if reportConfig associated with the measId that triggered the measurement reporting includes reportAddNeighMeas:
5> if the measObjectNR indicated by the servingCellMO includes the RS resource configuration corresponding to the rsType indicated in the reportConfig:
6> set the measResultBestNeighCellListNR within measResultServFreqListNR-SCG to include one entry with the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR, where availability is considered according to the measurement configuration associated with the SCG;
7> if the reportConfig associated with the measId that triggered the measurement reporting includes reportQuantityRS-Indexes and maxNrofRS-IndexesToReport:
8> for each best non-serving cell included in the measurement report:
9> include beam measurement information according to the associated reportConfig as described in 5.5.5.2, where availability is considered according to the measurement configuration associated with the SCG;

1> if there is at least one applicable neighbouring cell to report:
2> if the reportType is set to eventTriggered or periodical:
3> set the measResultNeighCells to include the best neighbouring cells up to maxReportCells in accordance with the following:
4> if the reportType is set to event Triggered;
5> include the cells included in the cellsTriggeredList as defined within the VarMeasReportList for this measId;
4> else:
5> include the applicable cells for which the new measurement results became available since the last periodical reporting or since the measurement was initiated or reset;
4> for each cell that is included in the measResultNeighCells, include the physCellId;
4> if the reportType is set to eventTriggered or periodical;
5> for each included cell, include the layer 3 filtered measured results in accordance with the reportConfig for this measId, ordered as follows:
6> if the measObject associated with this measId concerns NR:
7> if rsType in the associated reportConfig is set to ssb:
8> set resultsSSB-Cell within the measResult to include the synchronization signal (SS)/physical broadcast channel (PBCH) block based quantity(ies) indicated in the reportQuantityCell within the concerned reportConfig, in decreasing order of the sorting quantity, determined as specified in 5.5.5.3, i.e., the best cell is included first;
8> if reportQuantityRS-Indexes and maxNrofRS-IndexesToReport are configured, include beam measurement information as described in 5.5.5.2;
7> else if rsType in the associated reportConfig is set to csi-rs;
8> set resultsCSI-RS-Cell within the measResult to include the CSI-RS based quantity(ies) indicated in the reportQuantityCell within the concerned reportConfig, in decreasing order of the sorting quantity, determined as specified in 5.5.5.3, i.e., the best cell is included first;
8> if reportQuantityRS-Indexes and maxNrofRS-IndexesToReport are configured, include beam measurement information as described in 5.5.5.2;
6> if the measObject associated with this measId concerns E-UTRA:
7> set the measResult to include the quantity(ies) indicated in the reportQuantity within the concerned reportConfigInterRAT in decreasing order of the sorting quantity, determined as specified in 5.5.5.3, i.e., the best cell is included first;
2> else:
3> if the cell indicated by cellForWhichToReportCGI (note: CGI refers to Cell Global Identifier) is an NR cell:
4> if plmn-IdentityInfoList of the cgi-Info for the concerned cell has been obtained;

5> include the plmn-IdentityInfoList including plmn-IdentityList, trackingAreaCode (if available), ranac (if available), CellIdentity and cell-ReservedForOperatorUse for each entry of the plmn-IdentityInfoList;
5> include frequencyBandList if available;
4> if the UE is NPN capable and NPN-IdentityInfoList of the cgi-Info for the concerned cell has been obtained:
5> include the NPN-IdentityInfoList including NPN-IdentityList, trackingAreaCode (if available), ranac (if available), CellIdentity and cell-ReservedForOperatorUse for each entry of the NPN-IdentityInfoList;
4> else if MIB indicates the SIB1 is not broadcast:
5> include the noSIB1 including the ssb-SubcarrierOffset and pdcch-ConfigSIB1 obtained from MIB1 of the concerned cell (where "pdcch" refers to a Physical Downlink Control Channel);
3> if the cell indicated by cellForWhichToReportCGI is an E-UTRA cell;
4> if all mandatory fields of the cgi-Info-EPC for the concerned cell have been obtained:
5> include in the cgi-Info-EPC the fields broadcasted in E-UTRA SystemInformationBlockType1 associated to EPC;
4> if the UE is E-UTRA/5GC capable and all mandatory fields of the cgi-Info-5GC for the concerned cell have been obtained:
5> include in the cgi-Info-5GC the fields broadcasted in E-UTRA SystemInformationBlockType1 associated to 5GC;
4> if the mandatory present fields of the cgi-Info for the cell indicated by the cellForWhichToReportCGI in the associated measObject have been obtained:
5> include the freqBandIndicator;
5> if the cell broadcasts the multiBandInfoList, include the multiBandInfoList;
5> if the cell broadcasts the freqBandIndicatorPriority, include the freqBandIndicatorPriority;
1> if the corresponding measObject concerns NR:
2> if the reportSFTD-Meas is set to true within the corresponding reportConfigNR for this measId:
3> set the measResultSFTD-NR in accordance with the following:
4> set sfn-OffsetResult (where SFN refers to system frame number) and frameBoundaryOffsetResult to the measurement results provided by lower layers;
4> if the reportRSRP is set to true;
5> set rsrp-Result to the RSRP of the NR PSCell (the primary cell of the secondary cell group) derived based on SSB;
2> else if the reportSFTD-NeighMeas is included within the corresponding reportConfigNR for this measId:
3> for each applicable cell which measurement results are available, include an entry in the measResultCellListSFTD-NR and set the contents as follows:
4> set physCellId to the physical cell identity of the concerned NR neighbour cell.
4> set sfn-OffsetResult and frameBoundariOffsetResult to the measurement results provided by lower layers;
4> if the reportRSRP is set to true:
5> set rsrp-Result to the RSRP of the concerned cell derived based on SSB;
1> else if the corresponding measObject concerns E-UTRA;
2> if the reportSFTD-Meas is set to true within the corresponding reportConfigInterRAT for this measId;
3> set the measResultSFTD-EUTRA in accordance with the following:
4> set sfn-QffsetResult and frameBoundaryOffsetResult to the measurement results provided by lower layers;
4> if the reportRSRP is set to true;
5> set rsrpResult-EUTRA to the RSRP of the EUTRA PSCell;
1> increment the numberOfReportSent as defined within the VarMeasReportList for this measId by 1;
1> stop the periodical reporting timer, if running;
1> if the numberOfReportsSent as defined within the VarMeasReportList for this measId is less than the reportAmount as defined within the corresponding reportConfig for this measId:
2> start the periodical reporting timer with the value of reportInterval as defined within the corresponding reportConfig for this measId;
1> else:
2> if the reportType is set to periodical:
3> remove the entry within the VarMeasReportList for this measId;
3> remove this measId from the measIdList within VarMeasConfig;
1> if the UE is in (NG)EN-DC:
2> if SRB3 is configured:
3> submit the MeasurementReport message via SRB3 to lower layers for transmission, upon which the procedure ends;
2> else:
3> submit the MeasurementReport message via the E-UTRA MCG embedded in E-UTRA RRC message ULInformationTransferMRDC as specified in TS 36.331 [10] (where UL refers to uplink and MRDC refers to Multi-RAT Dual Connectivity).
1> else if the UE is in NR-DC:
2> if the measurement configuration that triggered this measurement report is associated with the SCG:
3> if SRB3 is configured:
4> submit the MeasurementReport message via SRB3 to lower layers for transmission, upon which the procedure ends;
3> else:
4> submit the MeasurementReport message via the NR MCG embedded in NR RRC message ULInformationTransferMRDC as specified in 5.7.2a.3;
2> else:
3> submit the MeasurementReport message via SRB1 to lower layers for transmission, upon which the procedure ends;
1> else:
2> submit the MeasurementReport message to lower layers for transmission, upon which the procedure ends.

Next Modified Subclause

6.2.2 Message Definitions

[ . . . ]
. . . RRCResumeComplete
The RRCResumeComplete message is used to confirm the successful completion of an RRC connection resumption.
    Signalling radio bearer: SRB1
    RLC-SAP: AM
    Logical channel: Dedicated Control Channel (DCCH)
    Direction: UE to Network
RRCResumeComplete message

```
-- ASN1START
-- TAG-RRCRESUMECOMPLETE-START
RRCResumeComplete ::=            SEQUENCE {
    rrc-TransactionIdentifier        RRC-TransactionIdentifier,
    criticalExtensions               CHOICE {
        rrcResumeComplete                RRCResumeComplete-IEs,
        criticalExtensionsFuture         SEQUENCE { }
```

-continued

```
    }
}
RRCResumeComplete-IEs ::=        SEQUENCE {
    dedicatedNAS-Message             DedicatedNAS-Message        OPTIONAL,
    selectedPLMN-Identity            INTEGER (1..maxPLMN)        OPTIONAL,
    uplinkTxDirectCurrentList        Uplink TxDirectCurrentList  OPTIONAL,
    lateNonCriticalExtension         OCTET STRING                OPTIONAL,
    non CriticalExtension            SEQUENCE { }                OPTIONAL
}
-- TAG-RRCRESUMECOMPLETE-STOP
-- ASN1STOP
```

| RRCResumeComplete-IEs field descriptions |
|---|
| selectedPLMN-Identity<br>Index of the PLMN or NPN selected by the UE from the plmn-IdentityList or NPN-IdentityList fields included in SIB1.<br>uplinkTxDirectCurrentList<br>The transmission (Tx) Direct Current locations for the configured serving cells and BWPs if requested by the NW (see reportUplinkTxDirectCurrent in CellGroupConfig). |

[ . . . ]

Next Modified Subclause—Change to SIB3 and New SIBx

6.3.1 System Information Blocks

[ . . . ]
. . . SIB3
SIB3 contains neighbouring cell related information relevant only for intra-frequency cell re-selection. The IE includes cells with specific re-selection parameters as well as blacklisted cells.
SIB3 Information Element

```
-- ASN1START
-- TAG-SIB3-START
SIB3 ::=                       SEQUENCE {
    intraFreqNeighCellList         IntraFreqNeighCellList    OPTIONAL, -- Need R
    intraFreqBlackCellList         IntraFreqBlackCellList    OPTIONAL, -- Need R
    lateNonCriticalExtension       OCTET STRING              OPTIONAL,
    ...
}
IntraFreqNeighCellList ::=         SEQUENCE (SIZE (1..maxCellIntra)) OF IntraFreqNeighCellInfo
IntraFreqNeighCellInfo ::=     SEQUENCE {
    physCellId                     PhysCellId,
    q-OffsetCell                   Q-OffsetRange,
    q-RxLevMinOffsetCell           INTEGER (1..8)            OPTIONAL, -- Need R
    q-RxLevMinOffsetCellSUL        INTEGER (1..8)            OPTIONAL, -- Need R
    q-QualMinOffsetCell            INTEGER (1..8)            OPTIONAL, -- Need R
    ...
    [[  cag-PCI-Range-r16              PCI-Range    OPTIONAL    -- Need R
    ]]
}
IntraFreqBlackCellList ::=         SEQUENCE (SIZE (1..maxCellBlack)) OF PCI-Range
-- TAG-SIB3-STOP
-- ASN1STOP
```

| SIB3 field descriptions |
|---|
| Cag-PCI-Range<br>Set of physical cell identities reserved for CAG cells on the frequency on which this field was received.<br>intraFreqBlackCellList<br>List of blacklisted intra-frequency neighbouring cells.<br>intraFreqNeighCellList<br>List of intra-frequency neighbouring cells with specific cell re-selection parameters.<br>q-OffsetCell<br>Parameter "$Q_{offset_{s,n}}$" in TS 38.304 [20].<br>q-QualMinOffsetCell<br>Parameter "$Q_{qualminoffsetcell}$" in TS 38.304 [20]. Actual value $Q_{qualminoffsetcell}$ = field value [dB].<br>q-RxLevMinOffsetCell<br>Parameter "$Q_{rxlevminoffsetcell}$" in TS 38.304 [20]. Actual value $Q_{rxlevminoffsetcell}$ = field value * 2 [dB].<br>q-RxLevMinOffsetCellSUL |

-continued

| SIB3 field descriptions |
| --- |
| Parameter "$Q_{rxlevminoffsetcellSUL}$" in TS 38.304 [20]. Actual value $Q_{rxlevminoffsetcellSUL}$ = field value * 2 [dB]. |

[ . . . ]
SIBx
The IE SIBx contains Human-Readable Network Names (HRNN)
SIBx Information Element

```
-- ASN1START
-- TAG-SIBx-START
SIBx ::=        SEQUENCE {
   hrnn-List    SEQUENCE (SIZE (1..maxNPN-r16) OF HRNN
   ...
}
HRNN ::=        CHOICE {
   hrnn         OCTET STRING (size (1..48)),
   noHRNN       ENUMERATED {true}
}
-- TAG-SIBx-STOP
-- ASN1STOP
```

| SIBx field descriptions |
| --- |
| hrnnList |
| List of HRNNs. The i:th entry corresponds to the i:th NPN (either PNI-NPI identified by PLMN identity and CAG-ID or SNPN identified by a PLMN identity and a NID) in the NPN-IdentityInfoList. |
| hrnn |
| Carries the name of the NPN, coded in UTF-8 with variable number of bytes per character |

Next Modified Subclause (Based on CR from 108 #37)

6.3.2 Radio Resource Control Information Elements

[ . . . ]
. . . CellAccessRelatedInfo
The IE CellAccessRelatedInfo indicates cell access related information for this cell.
CellAccessRelatedInfo information element

| CellAccessRelatedInfo field descriptions |
| --- |
| cellReservedForFutureUse |
| Indicates whether the cell is reserved, as defined in 38.304 [20] for future use. The field is applicable to all PLMNs and NPNs. |
| cellReservedForOtherUse |
| Indicates whether the cell is reserved, as defined in 38.304 [20]. The field is applicable to all PLMNs. |
| NPN-IdentityInfoList |
| The NPN-IdentityInfoList is used to configure 1 set of NPN-IdentityInfoList elements. Each of those elements contains a list of one or more NPN Identities and additional information associated with those NPNs. The total number of PLMNs (identified by a PLMN identity in plmn -IdentityList), PNI-NPNs (identified by a PLMN identity and a CAG-ID), and SNPNs (identified by a PLMN identity and a NID) together in the PLMN-IdentityInfoList and NPN-IdentityInfoList does not exceed 12, except for the NPN-only cells. In case of NPN-only cells the PLMN-IdentityList contains a single element that does not count to the limit of 12. The Index for elements in the NPN-IdentityInfoList are defined as: CAG index = PLMN-index (see below) + x for a CAG ID in the xth cag-IdentityList NID index = PLMN-index (see below) + CAG-index + N1 – N2 + . . . + N(n – 1) + p, for the NID in position p in the nth nid-List where N(s) is the number of NIDs in each nid-List respectively. When cellReservedForOtherUse is set to true, the PLMN-index part shall be set to 0 (zero) for CAG index and NID index |
| plmn-Identity List |
| The plmn-IdentityList is used to configure 1 set of PLMN-IdentityInfoList elements. Each of those elements contains a list of one or more PLMN Identities and additional information associated with those PLMNs. The PLMN index is defined as b1 + b2 + . . . + b(n – 1) + i for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively. |

[ . . . ]
. . . CGI-InfoNR
The IE CGI-InfoNR indicates cell access related information, which is reported by the UE as part of report CGI procedure.

```
-- ASN1START
-- TAG-CELLACCESSRELATEDINFO-START
CellAccessRelatedInfo           SEQUENCE {
   plmn-IdentityList            PLMN-Identity InfoList,
   cellReservedForOtherUse      ENUMERATED {true} OPTIONAL,   -- Need R
   ...,
   [[
   cellReservedForFutureUse-r16    ENUMERATED {true} OPTIONAL,    -- Need R
   NPN-IdentityInfoList-r16        NPN-IdentityInfoList-r16 OPTIONAL    -- Need R
   ]]
-- TAG-CELLACCESSRELATEDINFO-STOP
-- ASN1STOP
```

CGI-InfoNR Information Element

```
-- ASN1START
-- TAG-CGI-INFO-NR-START
CGI-InfoNR ::=              SEQUENCE {
    plmn-IdentityInfoList       PLMN-Identity InfoList      OPTIONAL,
    frequency BandList          MultiFrequency BandListNR   OPTIONAL,
    noSIB1                      SEQUENCE {
        ssb-SubcarrierOffset        INTEGER (0..15),
        pdcch-ConfigSIB1            PDCCH-ConfigSIB1
    }                               OPTIONAL,
    ...
    [[ NPN-IdentityInfoList-r16     NPN-Identity InfoList       OPTIONAL
    ]]
}
-- TAG-CGI-INFO-NR-STOP
-- ASN1STOP
```

| CGI-InfoNR field descriptions |
| --- |
| noSIB1 |
| Contains ssb-SubcarrierOffset and pdcch-ConfigSIB1 fields acquired by the UE from MIB of the cell for which report CGI procedure was requested by the network in case SIB1 was not broadcast by the cell. |

[ . . . ]
. . . UAC-BarringPerPLMN-List

The IE UAC-BarringPerPLMN-List provides access category specific access control parameters, which are configured per PLMN.

UAC-BarringPerPLMN-List Information Element

```
-- ASN1START
-- TAG-UAC-BARRINGPERPLMN-LIST-START
UAC-BarringPerPLMN-List ::=     SEQUENCE (SIZE (1.. maxPLMN)) OF UAC-
BarringPerPLMN
    UAC-BarringPerPLMN ::=          SEQUENCE {
        plmn-IdentityIndex              INTEGER (1..maxPLMN),
        uac-ACBarringListType           CHOICE {
            uac-ImplicitACBarringList       SEQUENCE (SIZE(maxAccessCat-1)) OF UAC-
BarringInfoSetIndex,
            uac-ExplicitACBarringList       UAC-BarringPerCatList
        }                                                               OPTIONAL -- Need
S
}
-- TAG-UAC-BARRINGPERPLMN-LIST-STOP
-- ASN1STOP
```

| UAC-BarringPerPLMN-List field descriptions |
| --- |
| uac-ACBarringListType |
| Access control parameters for each access category valid only for a specific PLMN. UE behaviour upon absence of this field is specified in clause 5.3.14.2. |
| plmn-IdentityIndex |
| Index of the PLMN or NPN across the plmn-IdentityList or NPN-IdentityList fields included in SIB1. |

Figure 3:
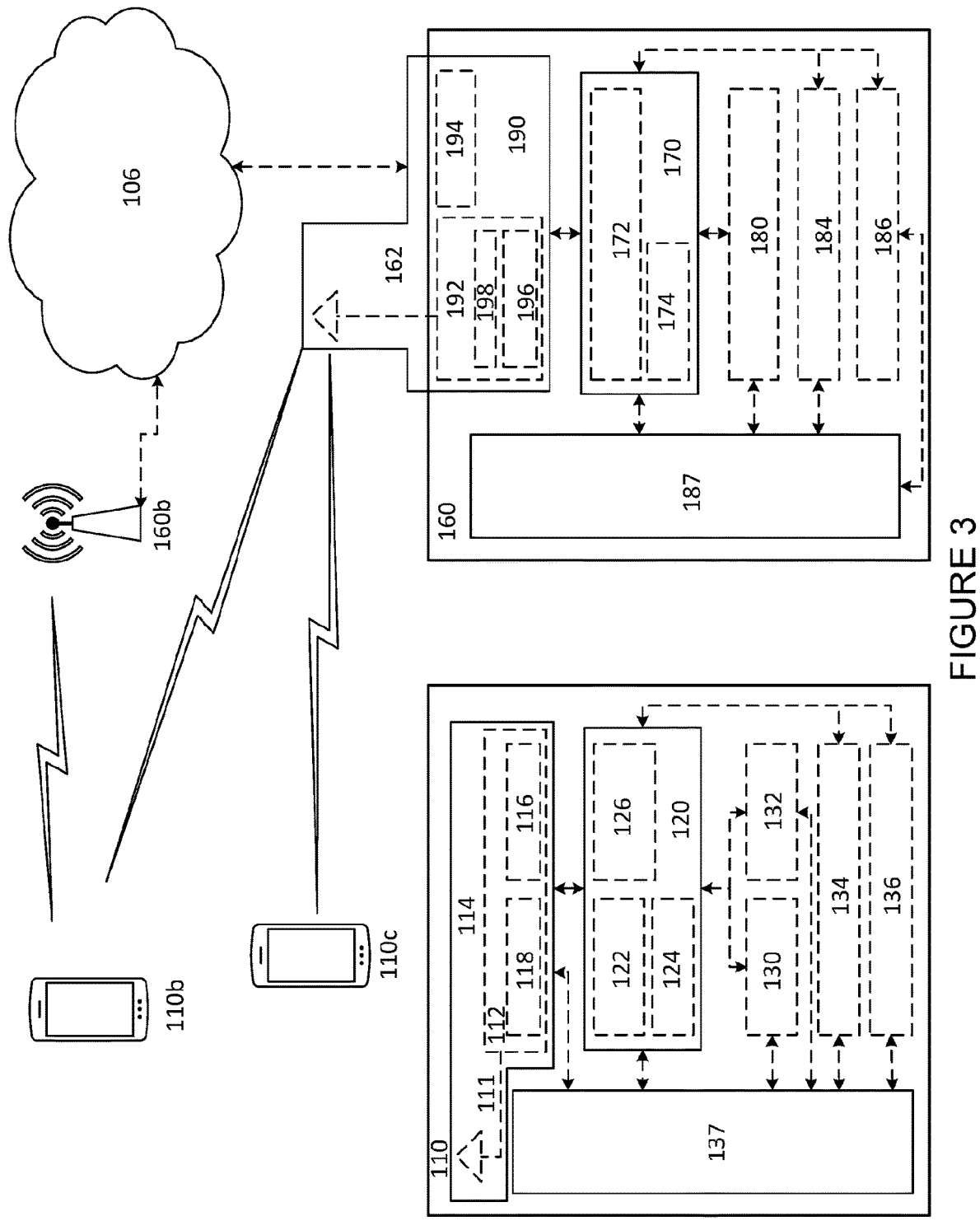
FIG. 3 illustrates an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., Mobile Switching Centers (MSCs), Mobility Management Entities (MMEs)), Operation and Maintenance (O&M) nodes, Operations Support System (OSS) nodes, Self-Optimized Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to protide, either alone or in conjunction with other network node 160 components, such as device readable medium 180, network node 160 functionality. For example, processing circuitry 170 may execute instructions stored in device readable medium 190 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz. and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fall. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaining console or device, a music storage device, a playback appliance, a wearable terminal device, a % ireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120, and is configured to condition signals communicated between antenna 111 and processing circuitry 120. Radio front end circuitry 112 may be coupled to or a part of antenna 111. In some embodiments. WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130. WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source, in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 4:
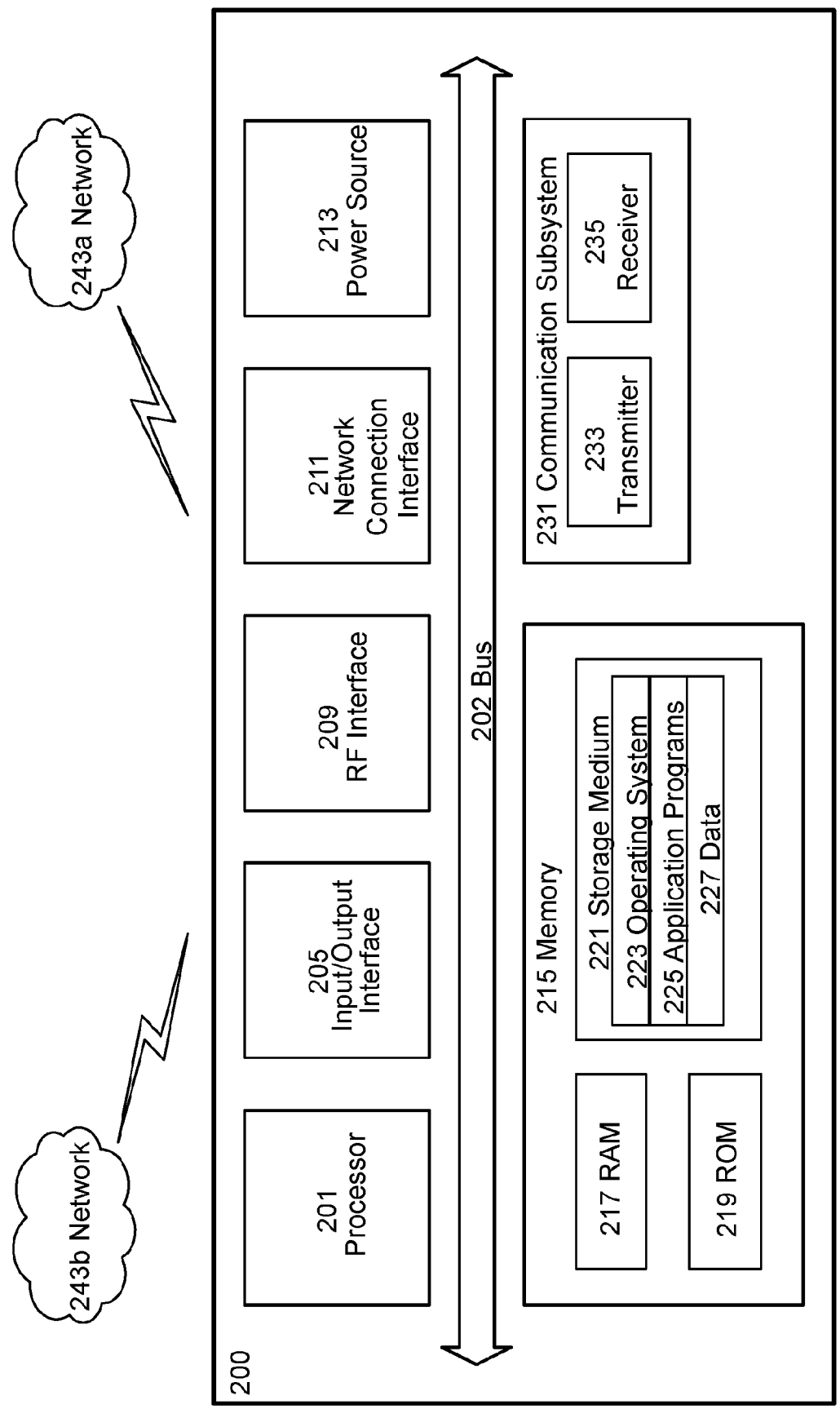
FIG. 4 illustrates an example of a User Equipment in accordance with some embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 4, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software, or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, Universal Terrestrial Radio Access (UTRA) Network (UTRAN), Evolved UTRA (E-UTRA) Network (E-UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively mat be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
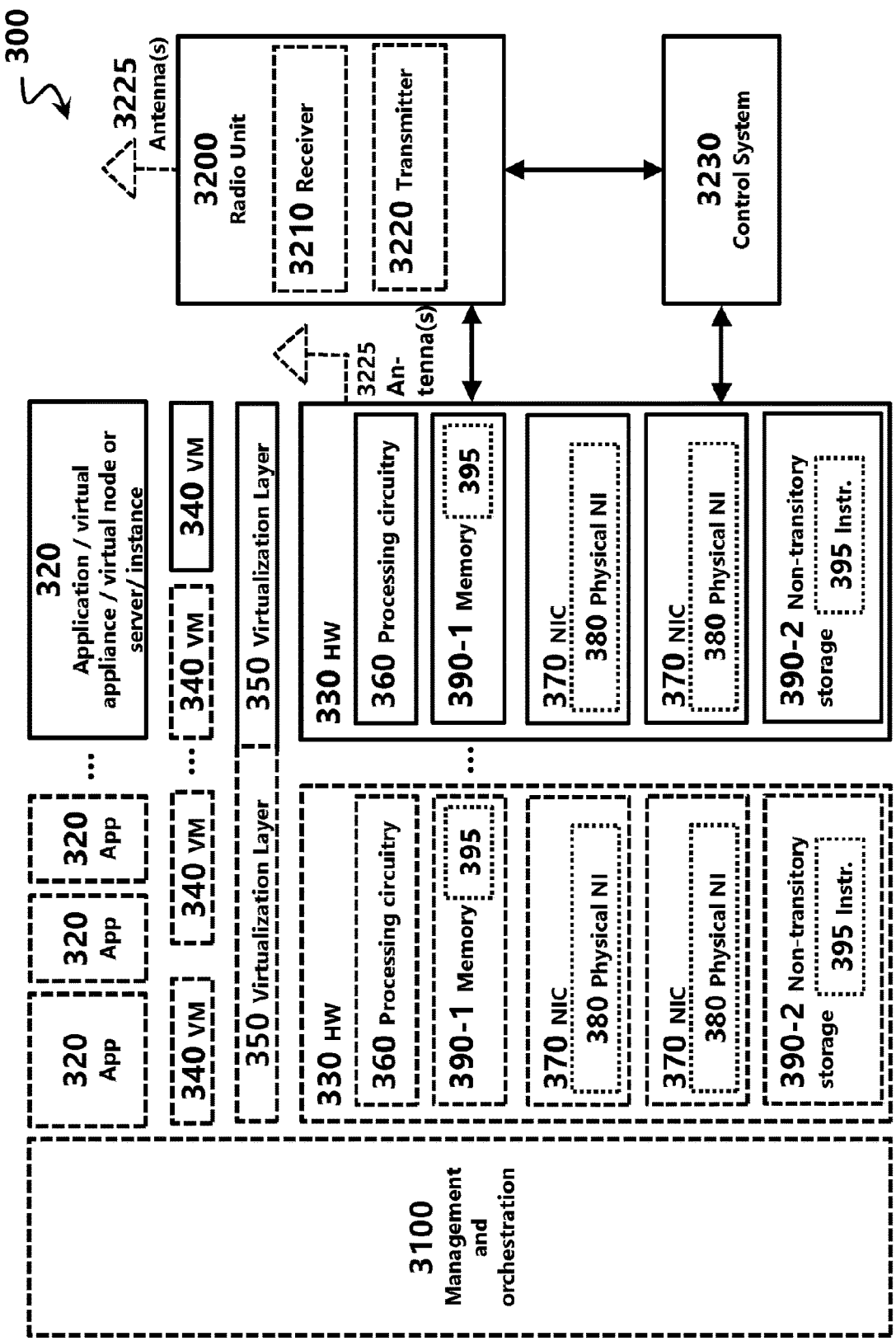
FIG. 5 illustrates an example of a virtualization environment in accordance with some embodiments.

FIG. 5 is a schematic block diagram illustrating a virtualization environment 300 in which functions implemented by some embodiments may be virtualized In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, m embodiments in which the virtual node is not a radio access node or does not require radio connectivity (e.g., a core network node), then the network node may be entirely virtualized.

The functions may be implemented by one or more applications 320 (which mat alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 5, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 5.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 6:
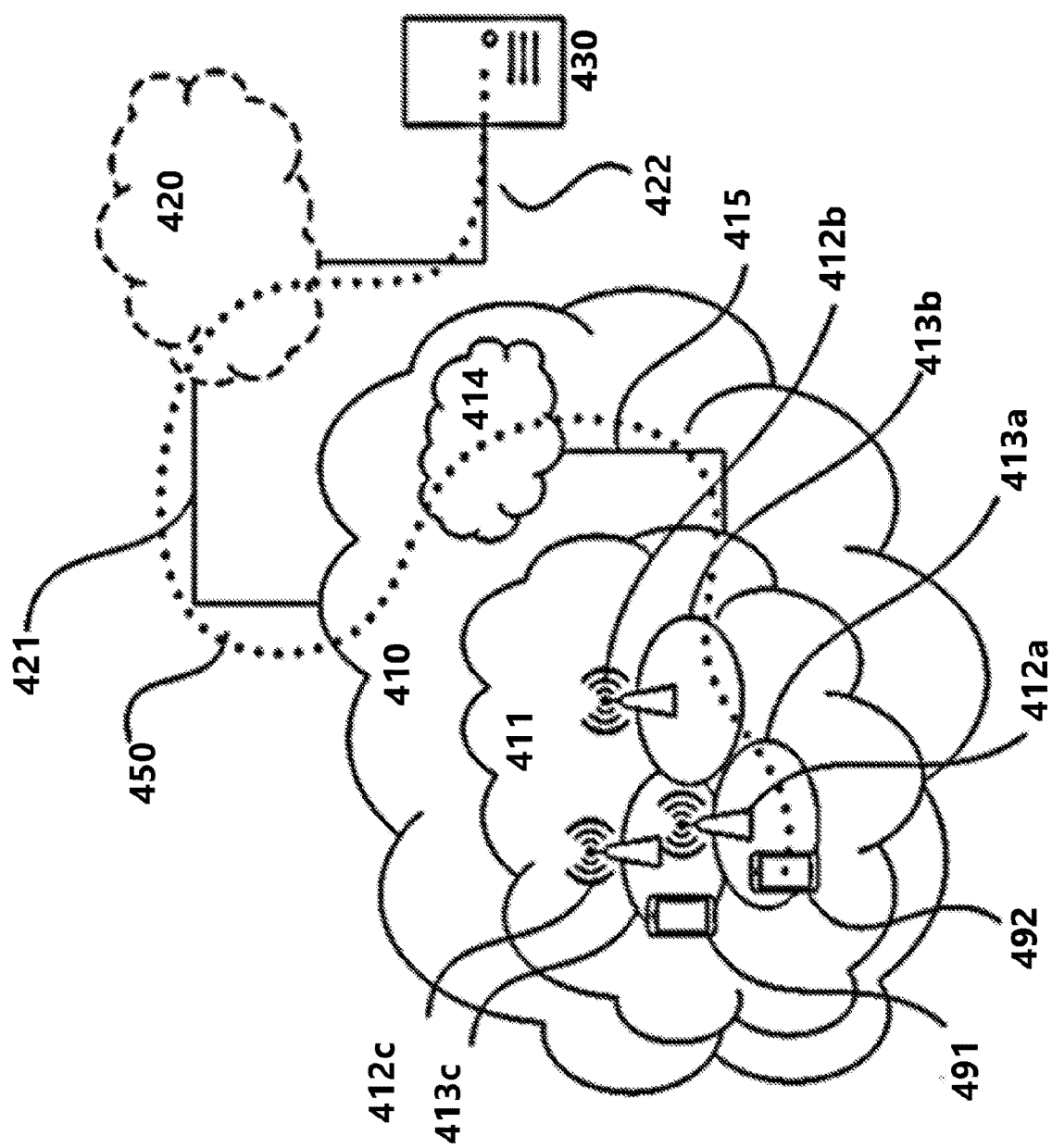
FIG. 6 illustrates an example of a telecommunication network connected via an intermediate network to a host computer in accordance with some embodiments.

With reference to FIG. 6, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a. 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 6 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 7. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 7:
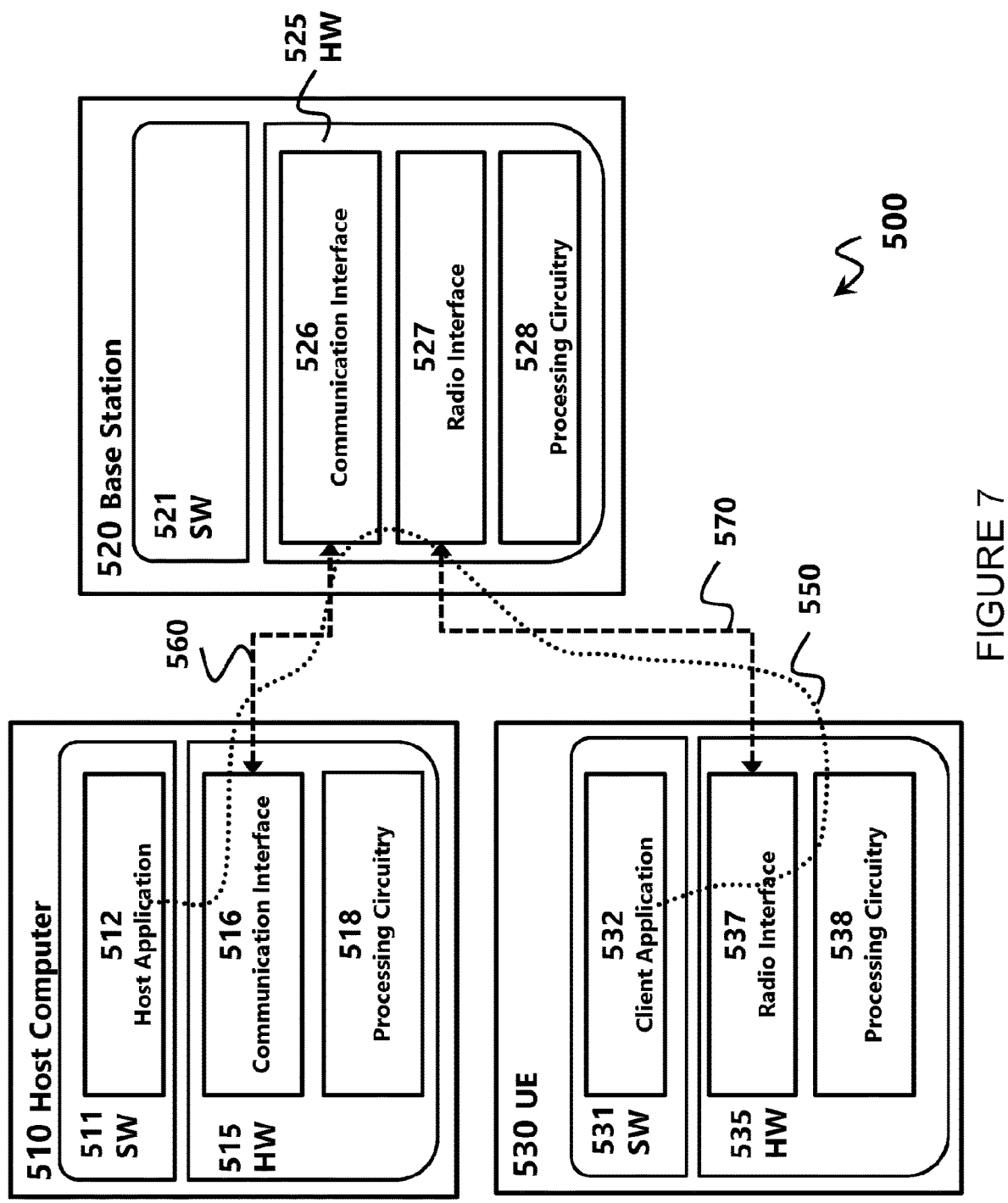
FIG. 7 illustrates an example of a host computer communicating via a base station with a user equipment over a partially wireless connection in accordance with some embodiments.

It is noted that host computer 510, base station 520 and UE 530 illustrated in FIG. 7 may be similar or identical to host computer 430, one of base stations 412*a*. 412*b*. 412*c* and one of UEs 491, 492 of FIG. 6, respectively. This is to say, the inner workings of these entities may be as shown in FIG. 7 and independently, the surrounding network topology may be that of FIG. 6.

In FIG. 7, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, or power consumption and thereby provide benefits such as reduced user waiting time, relaxed restriction on fie size, better responsiveness, or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 8:
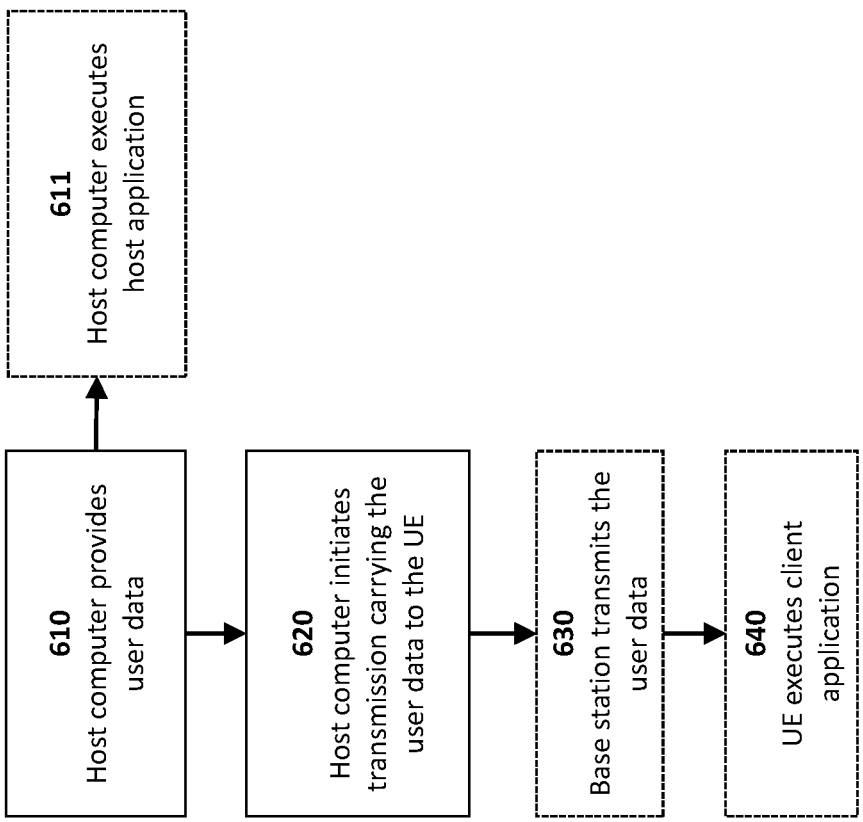
FIG. 8 illustrates an example of methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which % as carried in the transmission that the host computer initiated, in accordance with the teachings of the embodiments described throughout this disclosure. In step 640 (which may also be optional), the UE executes a client application associated with the host application executed by the host computer.

Figure 9:
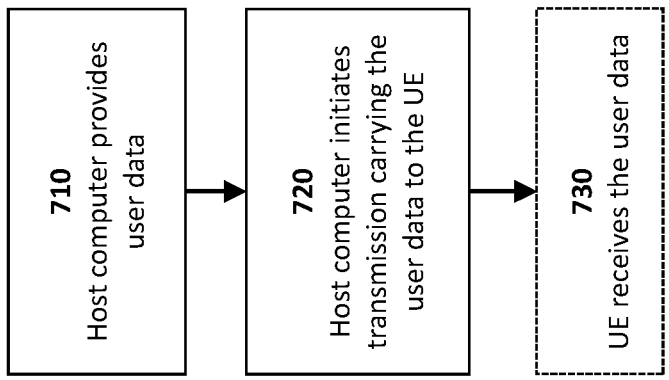
FIG. 9 illustrates an example of methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 710 of the method, the host computer provides user data. In an optional substep (not shown) the host computer provides the user data by executing a host application. In step 720, the host computer initiates a transmission carry mg the user data to the UE. The transmission may pass via the base station, in accordance with the teachings of the embodiments described throughout this disclosure. In step 730 (which may be optional), the UE receives the user data carried in the transmission.

Figure 10:
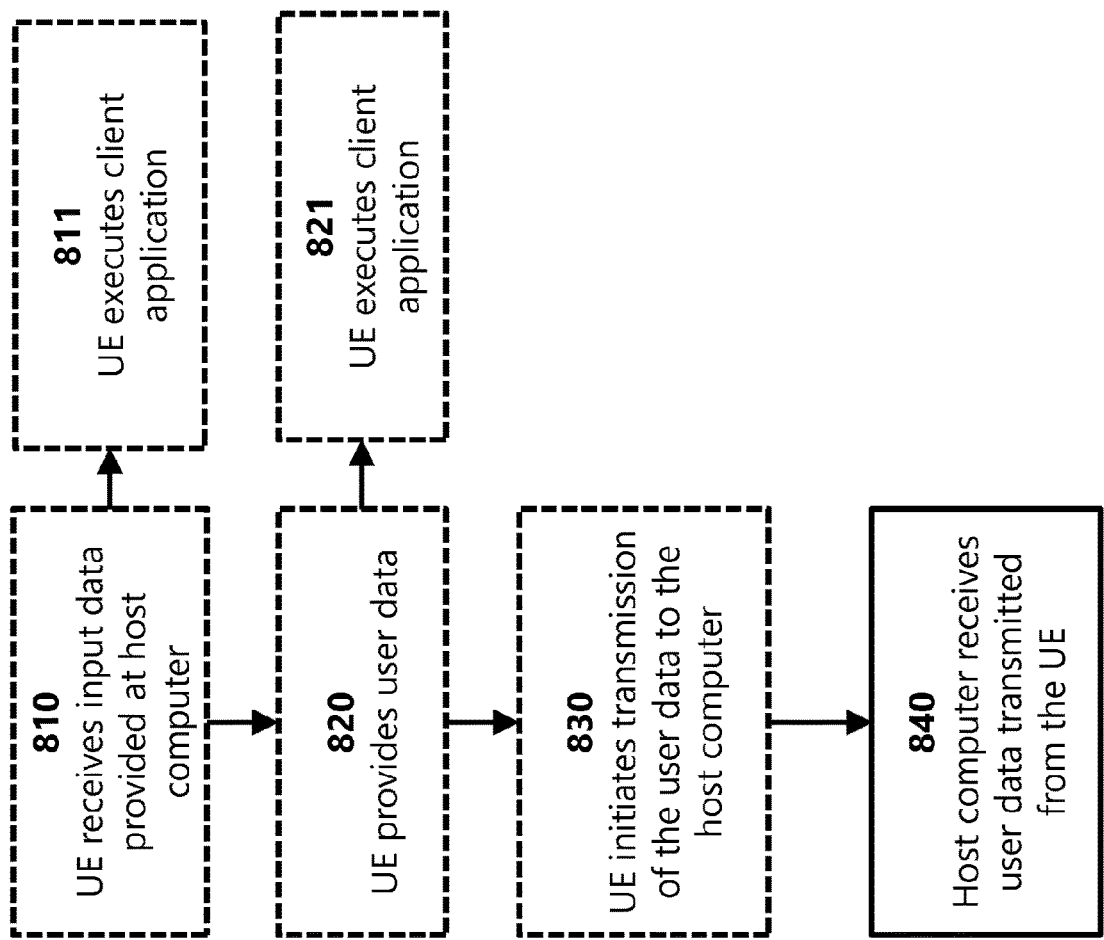
FIG. 10 illustrates an example of methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 810 (which may be optional), the UE receives input data provided by the host computer. Additionally or alternatively, in step 820, the UE provides user data In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 11:
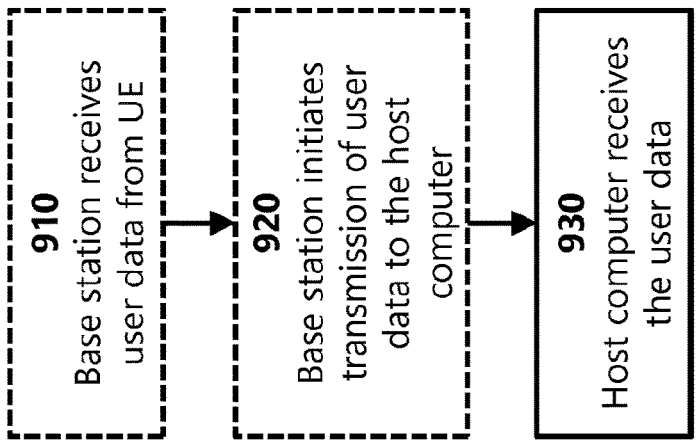
FIG. 11 illustrates an example of methods implemented in a communication system including a host computer, a base station and a user equipment in accordance with some embodiments.

FIG. 11 is a flow-chart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
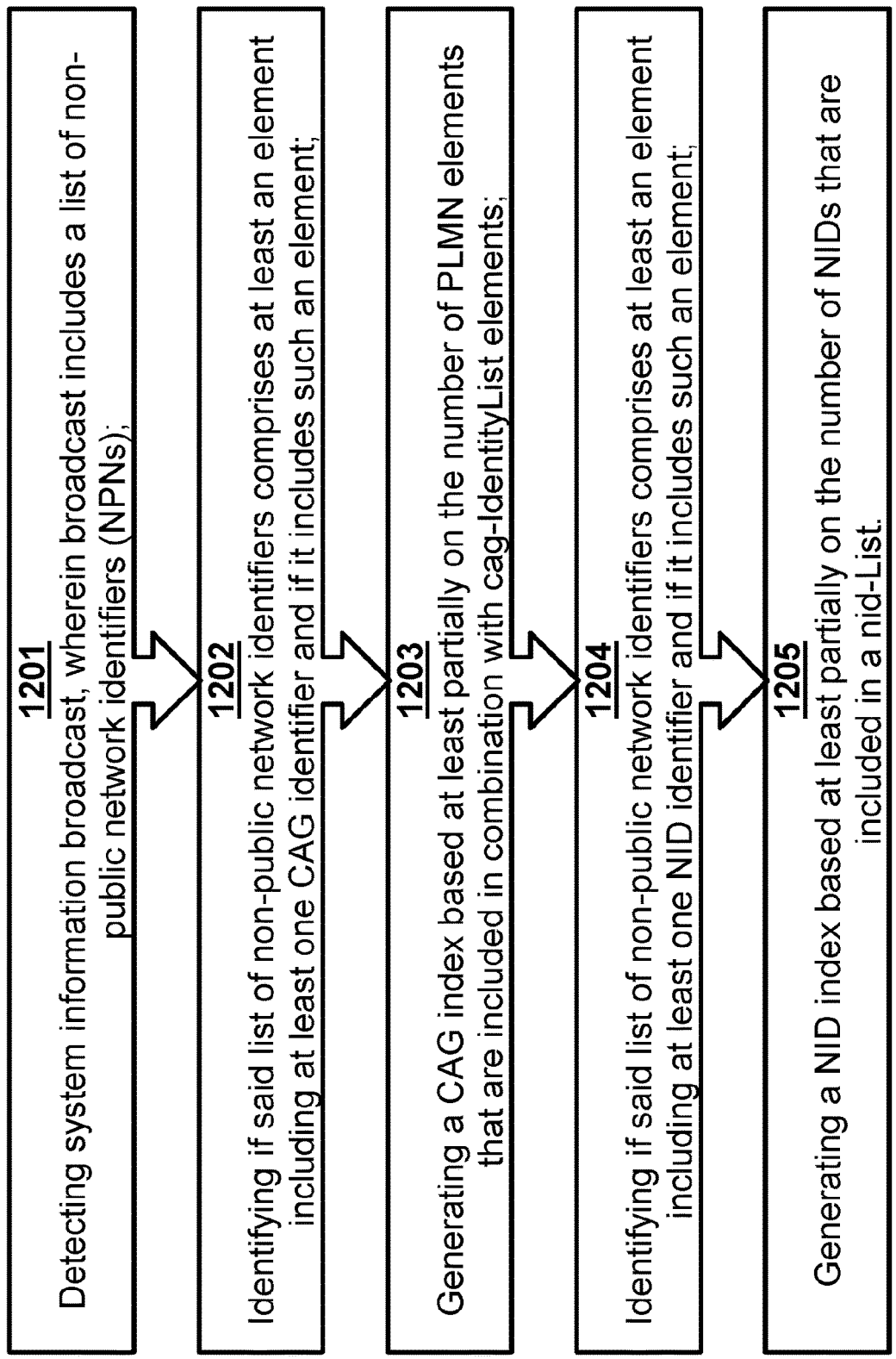
FIG. 12 illustrates an example of a method in accordance with some embodiments.

FIG. 12 depicts a method in accordance with particular embodiments. In certain embodiments, the method may be performed by a wireless device, such as wireless device 110 or UE 160 described above, in order to generate a network index corresponding to an NPN index of a combination of PLMN and CAG ID, or an index of a combination of a PLMN and Network ID(NID). At step 1201, the method detects system information broadcast, wherein broadcast includes a list of non-public network identifiers (NPNs). At step 1202, the method identifies if said list of non-public network identifiers comprises at least an element including at least one CAG identifier and if it includes such an element. At step 1203, the method generates a CAG index based at least partially on the number of PLMN elements that are included in combination with cag-IdentityList elements. At step 1204, the method identifies if said list of non-public network identifiers comprises at least an element including at least one NID identifier and if it includes such an element. At step 1205, the method generates a NID index based at least partially on the number of NIDs that are included in a nid-List. Certain steps of the method of FIG. 12 may be optional, depending on the embodiment. As one example, step 1203 may be optional in some embodiments (e.g., step 1203 may be omitted if at step 1202 said list of non-public network identifiers does not comprise at least an element including at least one CAG identifier). As another example, step 1205 may be optional in some embodiments (e.g., step 1205 may be omitted if at step 1204 said list of non-public network identifiers does not comprise at least an element including at least one NID identifier).

Figure 13:
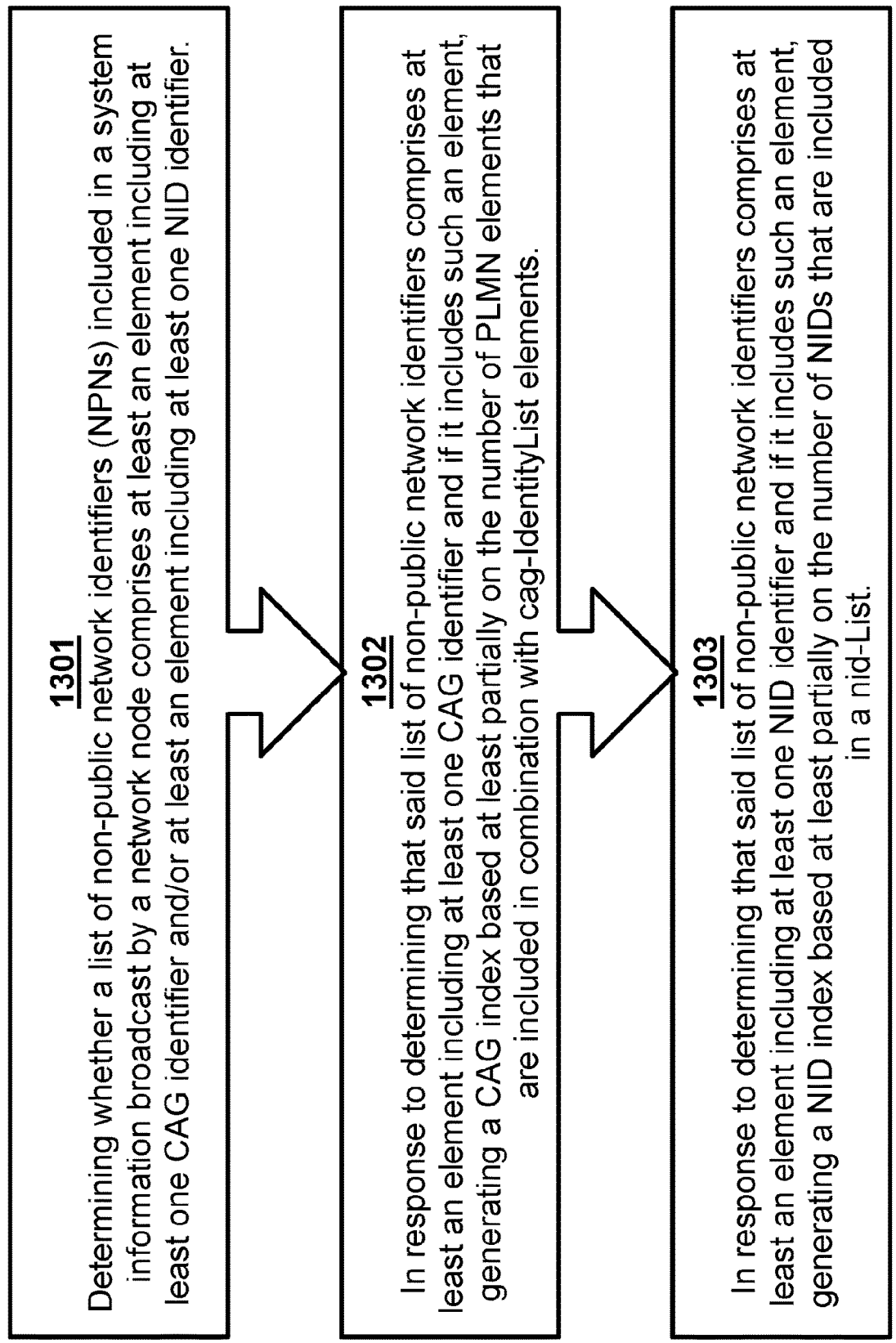
FIG. 13 illustrates an example of a method in accordance with some embodiments.

FIG. 13 depicts a method in accordance with particular embodiments. In certain embodiments, the method may be performed by a wireless device, such as wireless device 110 or UE 160 described above, or by a network node, such as network node 160 described above, in order to generate a network index corresponding to an NPN index of a combination of PLMN and CAG ID, or an index of a combination of a PLMN and Network ID(NID). At step 1301, the method determines whether a list of non-public network identifiers (NPNs) included in a system information broadcast by the network node comprises at least an element including at least one CAG identifier and/or at least an element including at least one NID identifier. At step 1302, in response to determining that said list of non-public network identifiers comprises at least an element including at least one CAG identifier and if it includes such an element, the method generates a CAG index based at least partially on the number of PLMN elements that are included in combination with cag-IdentityList elements. At step 1303, in response to determining that said list of non-public network identifiers comprises at least an element including at least one NID identifier and if it includes such an element, the method generates a NID index based at least partially on the number of NIDs that are included in a nid-List. In certain embodiments step 1302 and/or step 1303 may be optional, for example, depending on the result of the determination made in step 1301. Certain embodiments may omit step 1302 if at step 1301 it is determined that said list of non-public network identifiers does not comprise at least an element including at least one CAG identifier. Certain embodiments may omit step 1303 if at step 1301 it is determined that said list of non-public network identifiers does not comprises at least an element including at least one NID identifier.

Figure 14:
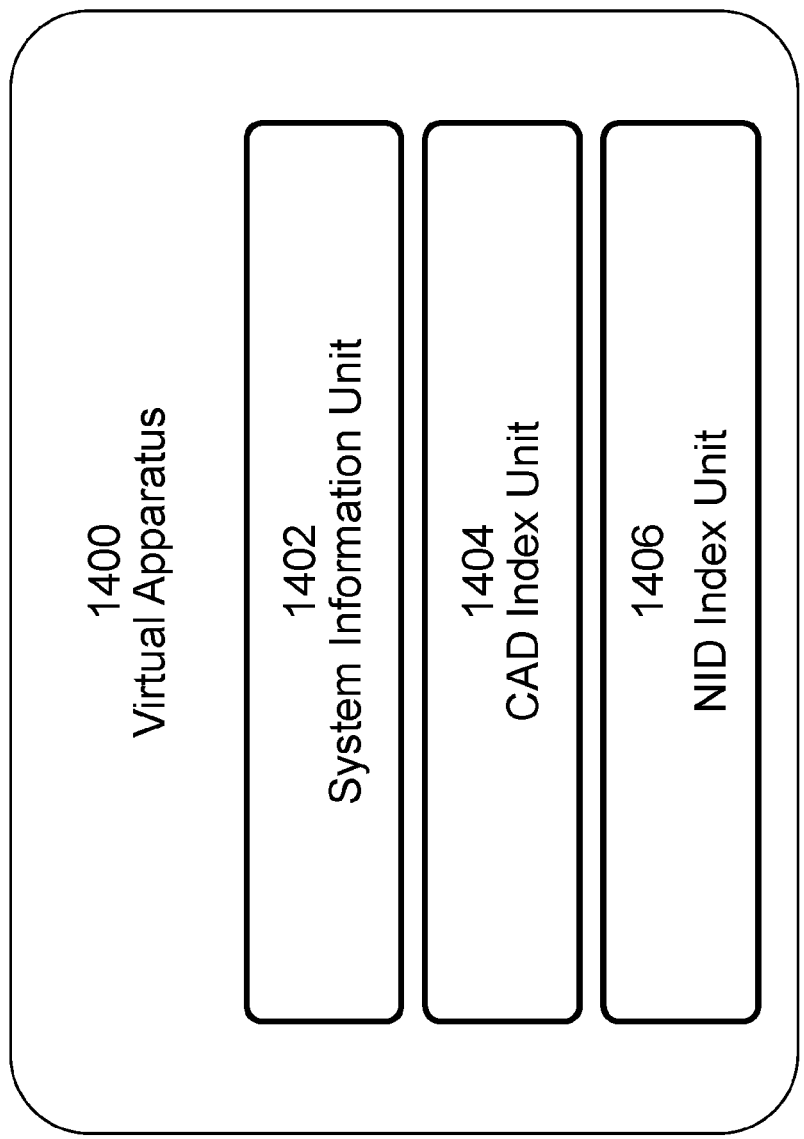
FIG. 14 illustrates an example of a virtualization apparatus in accordance with some embodiments.

FIG. 14 illustrates a schematic block diagram of an apparatus 1400 in a wireless network (for example, the wireless network shown in FIG. 3). The apparatus may be implemented in a wireless device or network node (e.g., wireless device 110 or network node 160 shown in FIG. 3). Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause system information unit 1402, CAD Index Unit 1404, NID Index Unit 1406, and any other suitable units of apparatus 1400 to perform corresponding functions according one or more embodiments of the present disclosure.

As illustrated in FIG. 14, apparatus 1400 includes system information unit 1402, CAD Index Unit 1404, NID Index Unit 1406. System information unit 1402 is configured to obtain system information broadcast by a network node and determine whether a list of non-public network identifiers (NPNs) included in the system information comprises at least an element including at least one CAG identifier and/or at least an element including at least one NID identifier. In response to determining that the list of non-public network identifiers (NPNs) included in the system information comprises at least an element including at least one CAG identifier, system information unit 1402 may provide the list of NPNs to CAD Index Unit 1404 configured to generate a CAG index based at least partially on the number of PLMN elements that are included in combination with cag-IdentityList elements. In response to determining that the list of non-public network identifiers (NPNs) included in the system information comprises at least an element including at least one NID identifier, system information unit 1402 may provide the list of NPNs to NID Index Unit 1406 configured to generate a NID index based at least partially on the number of NIDs that are included in a nid-List.

Other embodiments may allocate functionality among system information unit 1402, CAD Index Unit 1404, and NID Index Unit 1406 in any other suitable manner. As an example, in certain embodiments, system information unit 1402 may be configured to obtain system information broadcast by a network node and to provide a list of NPNs included in the system information to CAD Index Unit 1404 and NID Index Unit 1406. CAD Index Unit 1404 may be configured to determine whether the list of NPNs comprises at least an element including at least one CAG identifier and if it includes such an element. If yes, CAD Index Unit 1404 may be further configured to generate a CAG index based at least partially on the number of PLMN elements that are included in combination with cag-IdentityList elements. NID Index Unit 1406 may be configured to determine whether the list of NPNs comprises at least an element including at least one NID identifier and if it includes such an element. If yes, NID Index Unit 1406 may be further configured to generate a NID index based at least partially on the number of NIDs that are included in a nid-List.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method in a wireless device (e.g., UE) for generating a network index corresponding to an non-public network (NPN) index of a combination of Public Land Mobile Network (PLMN) and Closed Access Groups (CAG) ID, or an index of a combination of a PLMN and Network ID (NID) where said generating comprises the steps of:
  detecting system information broadcast, wherein broadcast includes a list of non-public network identifiers (NPNs);
  identifying if said list of non-public network identifiers comprises at least an element including at least one CAG identifier and if it includes such an element.
  generating a CAG index based at least partially on the number of PLMN elements that are included in combination with cag-IdentityList elements;
  identifying if said list of non-public network identifiers comprises at least an element including at least one NID identifier and if it includes such an element; and
  generating a NID index based at least partially on the number of NIDs that are included in a nid-List.
2. A method according to embodiment 1, wherein generating said CAG index also takes into consideration if there is a PLMN identity list included in said system information broadcast and if there is, arranging CAG index such that they succeed the index values generated for the PLMN identities
3. A method according to embodiment 1, wherein generating said NID index also takes into consideration if there is a PLMN identity list included in said system information broadcast and if there is, arranging NID index such that they succeed the index values generated for the CAG index
4. A method according to embodiment 1, wherein generating said CAG or NID index further including the step of:
  Detecting the value of a cellReservedForOtherUse parameter and when value of said parameter is set to true;
  Generating a CAG index assuming that there are no preceding PLMN index values; and
  Generating a NID index assuming that there are no preceding PLMN index values.
5. A method according to any of the preceding embodiments wherein said generated index is being used when transmitting an RRC Setup Complete message, said index is being included in said message as a representation of network for which access is requested.
6. A method in a wireless network for associating network types of different network identifiers in a first system information broadcast with a human readable network name of said different network identifiers in a second system information broadcast.
7. A method according to embodiment 6, wherein associating is based on that the amount of network identifiers in said first system information broadcast corresponds to the amount of human readable network name elements in said second system information broadcast.
8. A method according to embodiment 7, wherein at least one of the human readable network name elements are assigned a value corresponding to "no name" is broadcast.
9. A method in a wireless device (e.g., UE) for validating system information wherein the step of validating includes:
  Reading a cellReservedForOtherUse parameter; and
  if said cellReservedForOtherUse parameter has the value true, select a network identity from an NPN-IdentityInfoList and if said cellReservedForOtherUse parameter has the value false, select a network identity form a PLMN-IdentityInfoList.
10. A method according to embodiment 9, wherein said selecting comprises selecting a first network identity from any of the lists.
11. A method in a wireless device (e.g., UE) for validating system information, wherein the step of validating includes:

Reading a first element from a PLMN-IdentityInfo list; and

If said first element is detected as a standardized element that indicates no normal service available, select a network identity from an NPN-IdentityInfo-List to be used for validating system information.

12. The method of any of the previous embodiments, further comprising:
   providing user data; and
   forwarding the user data to a host computer via the transmission to the base station.

Group B Embodiments

13. A method in a network node for generating a network index corresponding to an NPN index of a combination of PLMN and CAG ID, or an index of a combination of a PLMN and Network ID(NID) where said generating comprises the steps of:
   for a system information broadcast by said network node, wherein broadcast includes a list of non-public network identifiers (NPNs);
      if said list of non-public network identifiers comprises at least an element including at least one CAG identifier and if it includes such an element, generating a CAG index based at least partially on the number of PLMN elements that are included in combination with cag-IdentityList elements; and
      if said list of non-public network identifiers comprises at least an element including at least one NID identifier and if it includes such an element, generating a NID index based at least partially on the number of NIDs that are included in a nid-List.

14. A method according to embodiment 13, wherein said network node associates said NID index as reference when broadcasting or transmitting Unified Access Control parameters.

15. The method of any of the previous embodiments, further comprising:
   obtaining user data; and
   forwarding the user data to a host computer or a wireless device.

Group C Embodiments

16. A wireless device, the wireless device comprising:
   processing circuitry configured to perform any of the steps of any of the Group A embodiments; and
   power supply circuitry configured to supply power to the wireless device.

17. A base station, the base station comprising:
   processing circuitry configured to perform any of the steps of any of the Group B embodiments;
   power supply circuitry configured to supply power to the base station.

18. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a batter connected to the processing circuitry and configured to supply power to the UE.

19. A computer program, the computer program comprising instructions which when executed on a computer perform any of the steps of any of the Group A embodiments.

20. A computer program product comprising a computer program, the computer program comprising instructions which when executed on a computer perform any of the steps of any of the Group A embodiments.

21. A non-transitory computer-readable storage medium or carrier comprising a computer program, the computer program comprising instructions which when executed on a computer perform any of the steps of any of the Group A embodiments.

22. A computer program, the computer program comprising instructions which when executed on a computer perform any of the steps of any of the Group B embodiments.

23. A computer program product comprising a computer program, the computer program comprising instructions which when executed on a computer perform any of the steps of any of the Group B embodiments.

24. A non-transitory computer-readable storage medium or carrier comprising a computer program, the computer program comprising instructions which when executed on a computer perform any of the steps of any of the Group B embodiments.

25. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments 26. The communication system of the pervious embodiment further including the base station.

27. The communication system of the previous 2 embodiments, further including the UE, wherein the U E is configured to communicate with the base station.

28. The communication system of the previous 3 embodiments, wherein:
   the processing circuitry of the host computer is configured to execute a host application, thereby providing the user data; and
   the UE comprises processing circuitry configured to execute a client application associated with the host application.

29. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments 30. The method of the previous embodiment, further comprising, at the base station, transmitting the user data.
31. The method of the previous 2 embodiments, wherein the user data is provided at the host computer by executing a host application, the method further comprising, at the UE, executing a client application associated with the host application.
32. A user equipment (UE) configured to communicate with a base station, the UE comprising a radio interface and processing circuitry configured to performs the of the previous 3 embodiments.
33. A communication system including a host computer comprising:
   processing circuitry configured to provide user data; and
   a communication interface configured to forward user data to a cellular network for transmission to a user equipment (UE),
   wherein the UE comprises a radio interface and processing circuit, the UE's components configured to perform any of the steps of any of the Group A embodiments.
34. The communication system of the previous embodiment, wherein the cellular network further includes a base station configured to communicate with the UE.
35. The communication system of the previous 2 embodiments, wherein:
   the processing circuitry of the host computer is configured to execute a host application, thereby providing the user data; and
   the UE's processing circuitry is configured to execute a client application associated with the host application.
36. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.
37. The method of the previous embodiment, further comprising at the UE, receiving the user data from the base station.
38. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.
39. The communication system of the previous embodiment, further including the UE
40. The communication system of the previous 2 embodiments, further including the base station, wherein the base station comprises a radio interface configured to communicate with the IE and a communication interface configured to forward to the host computer the user data carried by a transmission from the UE to the base station.
41. The communication system of the previous 3 embodiments, wherein
   the processing circuitry of the host computer is configured to execute a host application; and
   the UE's processing circuitry is configured to execute a client application associated with the host application, thereby providing the user data.
42. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.
43. A method implemented in a communication system including a host computer, a base station and a user equipment (UE), the method comprising:
   at the host computer, receiving user data transmitted to the base station from the UE, wherein the UE performs any of the steps of any of the Group A embodiments.
44. The method of the previous embodiment, further comprising, at the UE, providing the user data to the base station.
45. The method of the previous 2 embodiments, further comprising:
   at the UE, executing a client application, thereby providing the user data to be transmitted; and
   at the host computer, executing a host application associated with the client application.
46. The method of the previous 3 embodiments, further comprising
   at the UE, executing a client application; and
   at the UE, receiving input data to the client application, the input data being provided at the host computer by executing a host application associated with the client application,
   wherein the user data to be transmitted is provided by the client application in response to the input data.
47. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
48. The communication system of the previous embodiment further including the base station.
49. The communication system of the previous 2 embodiments, further including the UE, wherein the UE is configured to communicate with the base station.
50. The communication system of the previous 3 embodiments, wherein:
   the processing circuitry of the host computer is configured to execute a host application;
   the UE is configured to execute a client application associated with the host application, thereby providing the user data to be received by the host computer.
51. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

52. The method of the previous embodiment, further comprising at the base station, receiving the user data from the UE.

53. The method of the previous 2 embodiments, further comprising at the base station, initiating a transmission of the received user data to the host computer.

Figure 20:
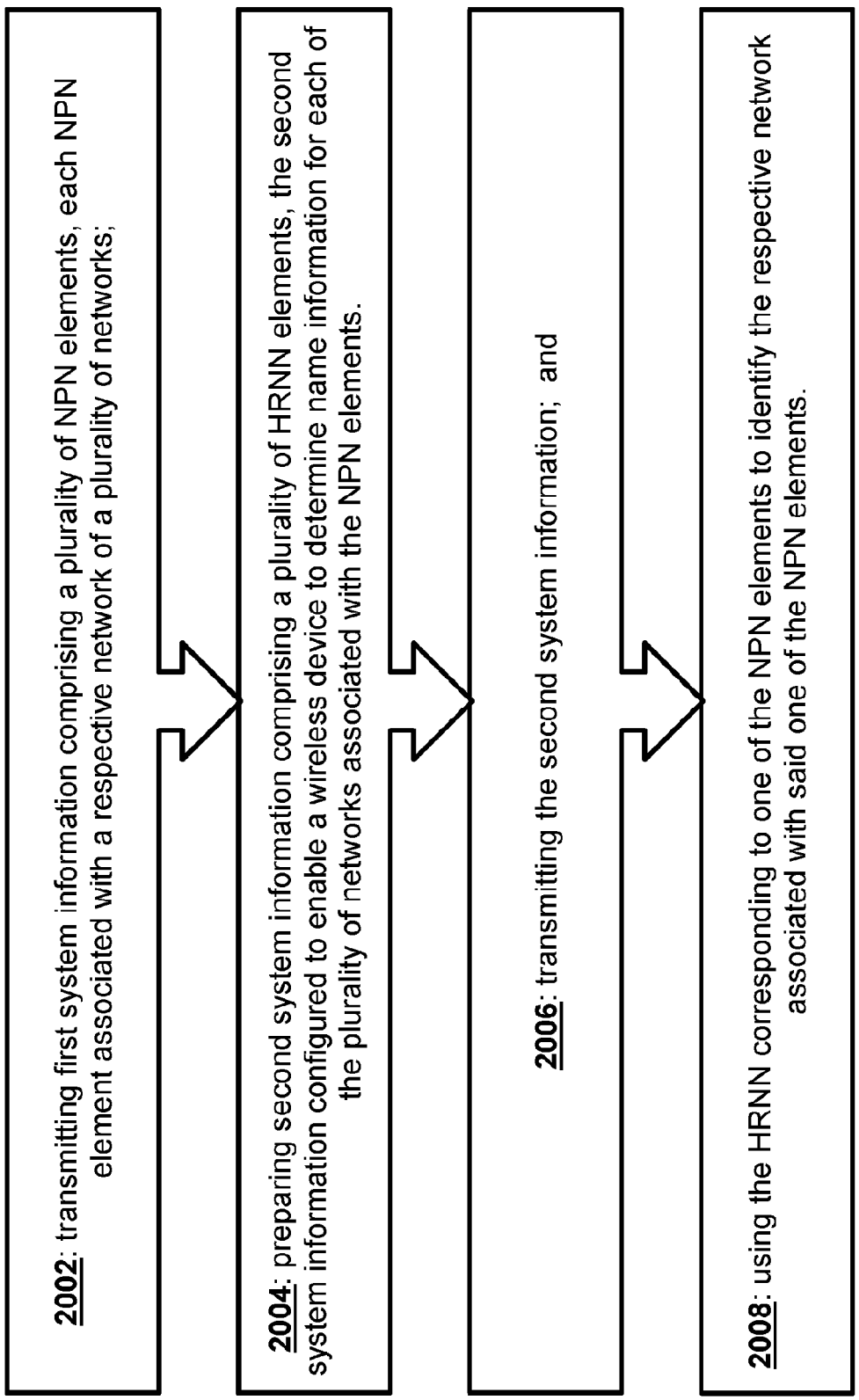
FIG. 20 illustrates an example of a method in accordance with some embodiments.
Figure 21:
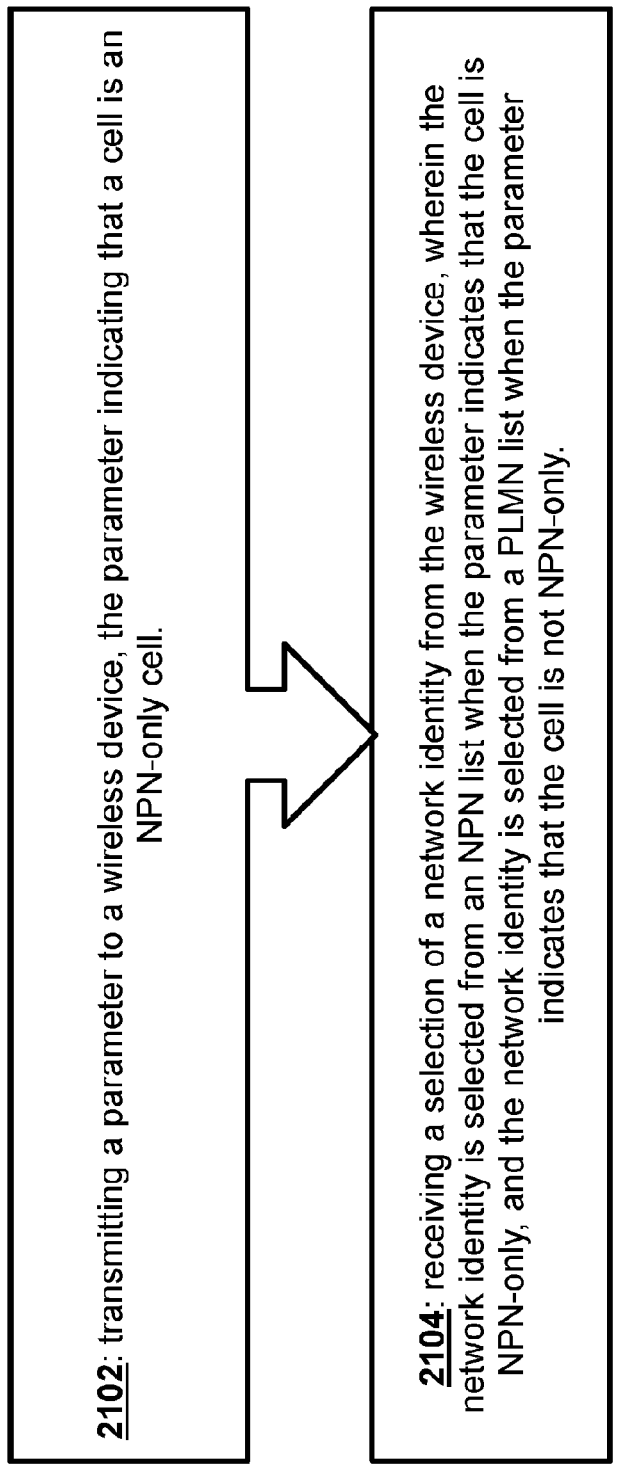
FIG. 21 illustrates an example of a method in accordance with some embodiments.

FIGS. 15A, 15B, 17, 18, and 19 each describe examples of methods that may be performed by a N ireless device, such as wireless device 110 or UE 200. For example, the wireless device may comprise processing circuitry, such as processing circuitry 120 or processor(s) 201, configured to perform one or more steps of one or more of the methods performed by the wireless device. A network node, such as network node 160, may be configured to perform analogous or reciprocal functionality. For example, certain embodiments describe a wireless device that sends certain information to a network node. In the reciprocal embodiment, the network node would receive that information from the wireless device. Similarly, certain embodiments describe a wireless device that receives certain information from a network node. In the reciprocal embodiment, the network node would send that information to the wireless device. The network node may comprise processing circuitry, such as processing circuitry 170, configured to perform one or more steps of one or more of the methods performed by the network node. FIGS. 20, 21, and 22 provide examples of methods that may be performed by a network node to support the functionality performed by the wireless device in FIGS. 17, 18, and 19, respectively.

Figure 15A:
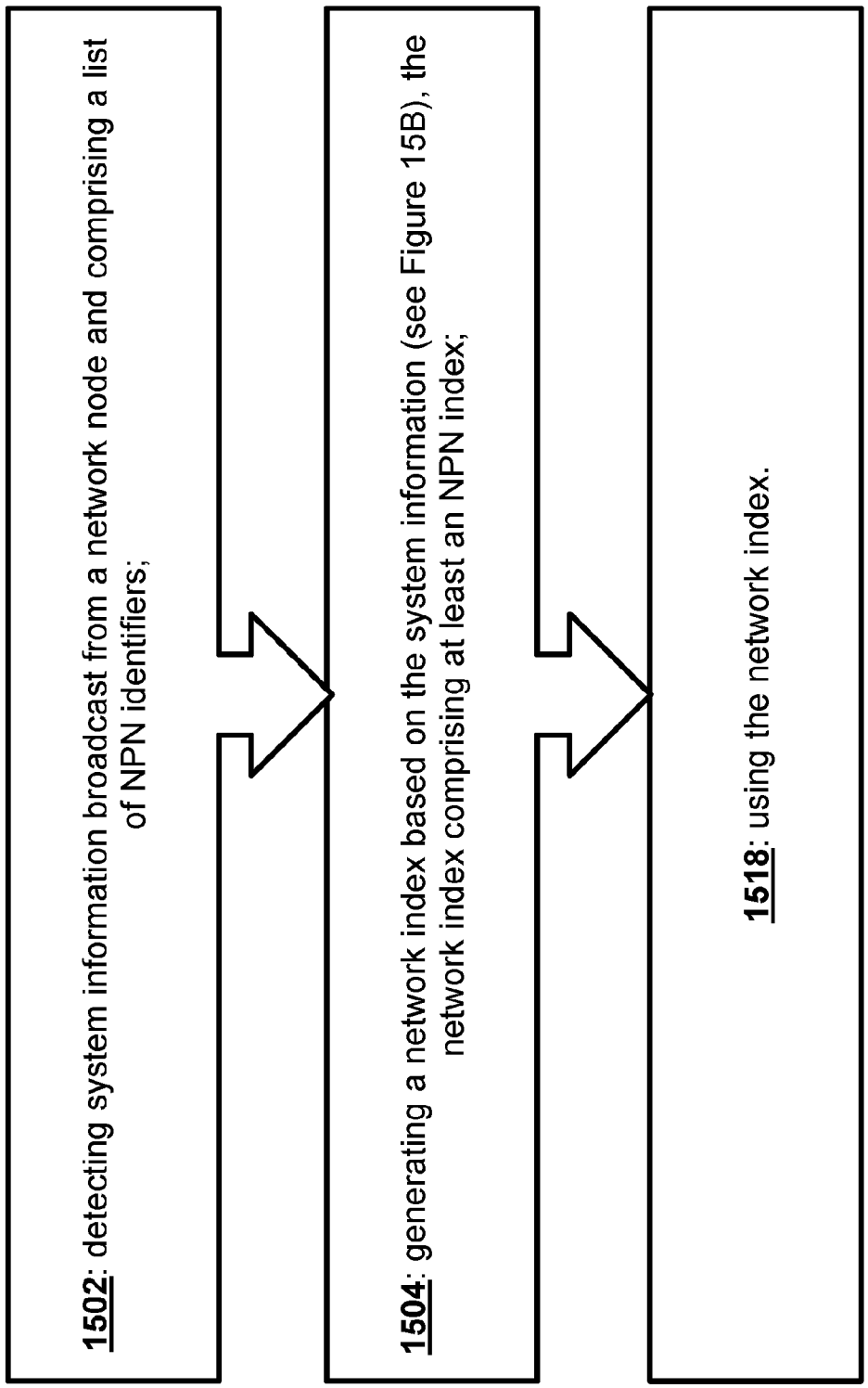
FIGS. 15A and 15B illustrate an example of a method in accordance with some embodiments.
Figure 15B:
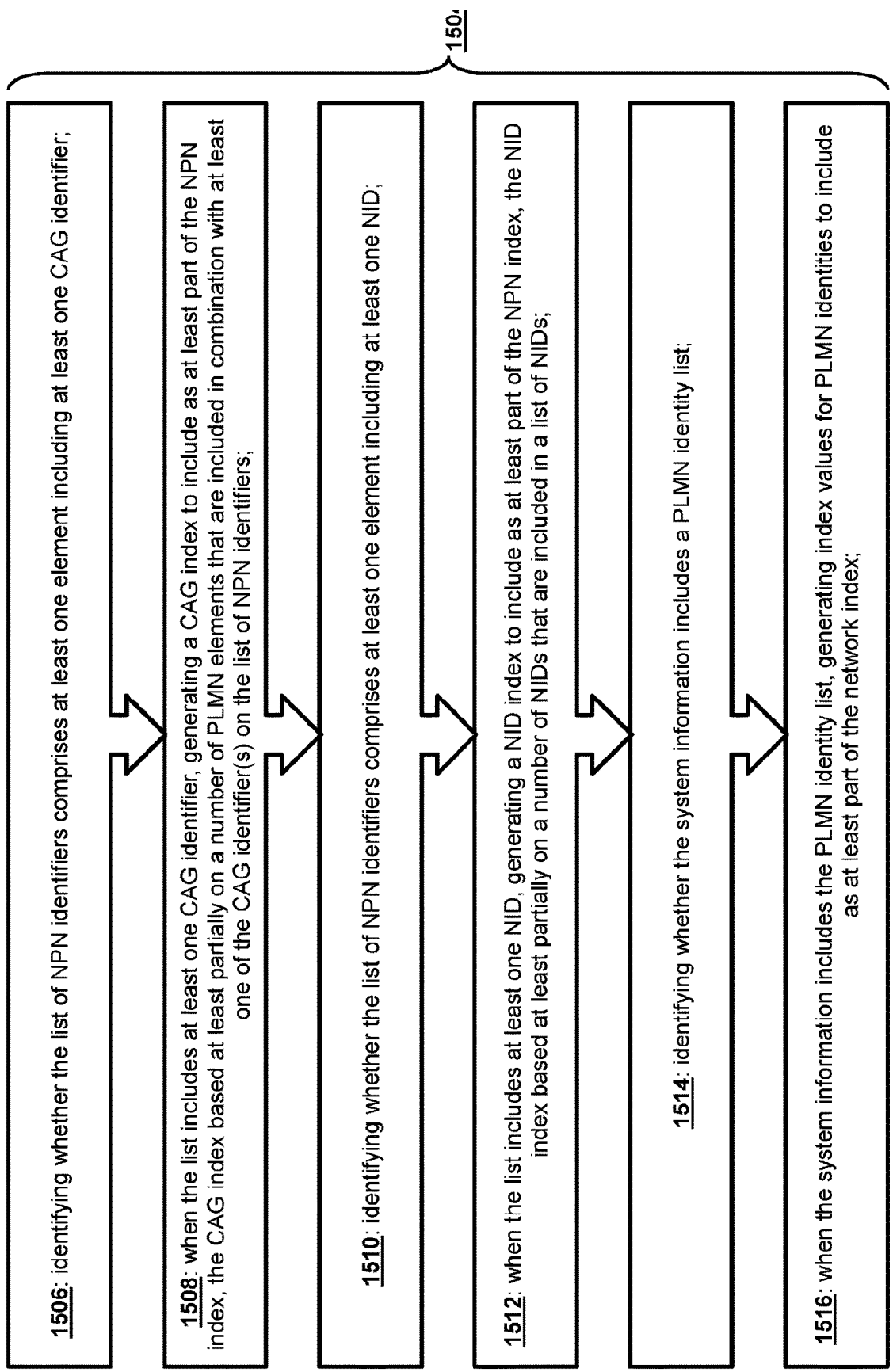

Turning now to the method of FIGS. 15A and 15B, the method begins at step 1502 of FIG. 15A with detecting system information broadcast from a network node. The system information comprises a list of NPN identifiers. The method proceeds to step 1504 with generating a network index based on the system information. Step 1504 may comprise one or more steps/sub-steps shown in FIG. 15B. Because the system information received in step 1502 comprises the list of NPN identifiers, the network index generated in step 1504 comprises at least an NPN index. The NPN index may include a CAG index (e.g., an index comprising one or more CAG index values) and/or a NID index (e.g., an index comprising one or more NID index values). Further information regarding the CAG index can be found in the discussion of steps 1506 and 1508 of FIG. 15B, and further information regarding the NID index can be found in the discussion of steps 1510 and 1512 of FIG. 15B.

At step 1506, the method identifies whether the list of NPN identifiers comprises at least one element/list entry that includes at least one CAG identifier. When the list of NPN identifiers does not include any element that includes at least one CAG identifier, the method may skip to step 1510 (without generating any CAG index). Alternatively, when the list of NPN identifiers comprises the at least one element that includes at least one CAG identifier, the method proceeds to step 1508 with generating a CAG index to include as at least part of the NPN index. The CAG index is based at least partially on a PLMN elements that are included in combination with at least one of the CAG identifier(s) on the list of NPN identifiers.

As an example, a CAG is identified by a PLMN ID and a CAG ID. In certain embodiments, CAGs that are associated with the same PLMN ID can be assigned the same CAG index value, for example.

| Example 1 | | |
|---|---|---|
| CAG | PLMN ID + CAG ID | CAG index value |
| A1 | PLMN ID A + CAG ID 1 | 1 |
| A2 | PLMN ID A + CAG ID 2 | 1 |
| B1 | PLMN ID B + CAG ID 1 | 2 |

In the above example, it is the PLMN ID portion of the PLMN ID+CAG ID pair that determines the index value. In this manner, core network selection may be based only on the PLMN ID portion. Generating index values based only on PLMN ID may increase privacy associated with the CAG ID. Further examples are described above under the heading "CAG identifiers related to same PLMN." Note that in certain embodiments, the CAG may also be described as a PNI-NPN, and in certain embodiments the CAG ID may correspond to a cag-IdentityList element.

In other embodiments, CAGS that are associated with the same PLMN ID can be assigned different CAG index values, for example.

| Example 2 | | |
|---|---|---|
| CAG | PLMN ID + CAG ID | CAG index value |
| A1 | PLMN ID A + CAG ID 1 | 1 |
| A2 | PLMN ID A + CAG ID 2 | 2 |
| B1 | PLMN ID B + CAG ID 1 | 3 |

At step 1510, the method identifies whether the list of NPN identifiers comprises at least one element that includes at least one NID. When the list of NPN identifiers does not include any element that includes at least one NID, the method need not generate any NID index (the method may skip step 1512). Alternatively, when the list of NPN identifiers comprises the at least one element that includes at least one NID, the method proceeds to step 1512 with generating a NID index to include as at least part of the NPN index. In certain embodiments, the NID index is based at least partially on a number of NIDs that are included in a list of NIDs, for example:

| Example 3 | | |
|---|---|---|
| NID | PLMN ID + CAG ID | NID index value |
| A1 | PLMN ID A + NID 1 | 1 |
| A2 | PLMN ID A + NID 2 | 2 |
| B1 | PLMN ID B + NID 1 | 3 |

Certain embodiments include a step of identifying whether the system information includes a PLMN identity list. FIG. 15B illustrates this in step 1514. The PLMN identity list contains the public networks, identified by PLMN IDs. As noted above, the NPN identity list (the list containing the non-public networks) also uses PLMN IDs because a PLMN ID is included in the SNPN and PNI-NPN identities of the non-public networks. In certain embodiments, the method may determine whether the system information includes the PLMN identity list based on a parameter indicating whether the cell is NPN-only. As an example, a cellReservedForOtherUse parameter can be set to true when the cell is NPN-only and set to false when the cell is not NPN-only. In response to detecting that the parameter indicates that the cell is an NPN-only cell, the method may skip step 1516. In response to detecting that the parameter indicates that the cell is not NPN-only, the method may proceed to step 1516.

Figure 16:
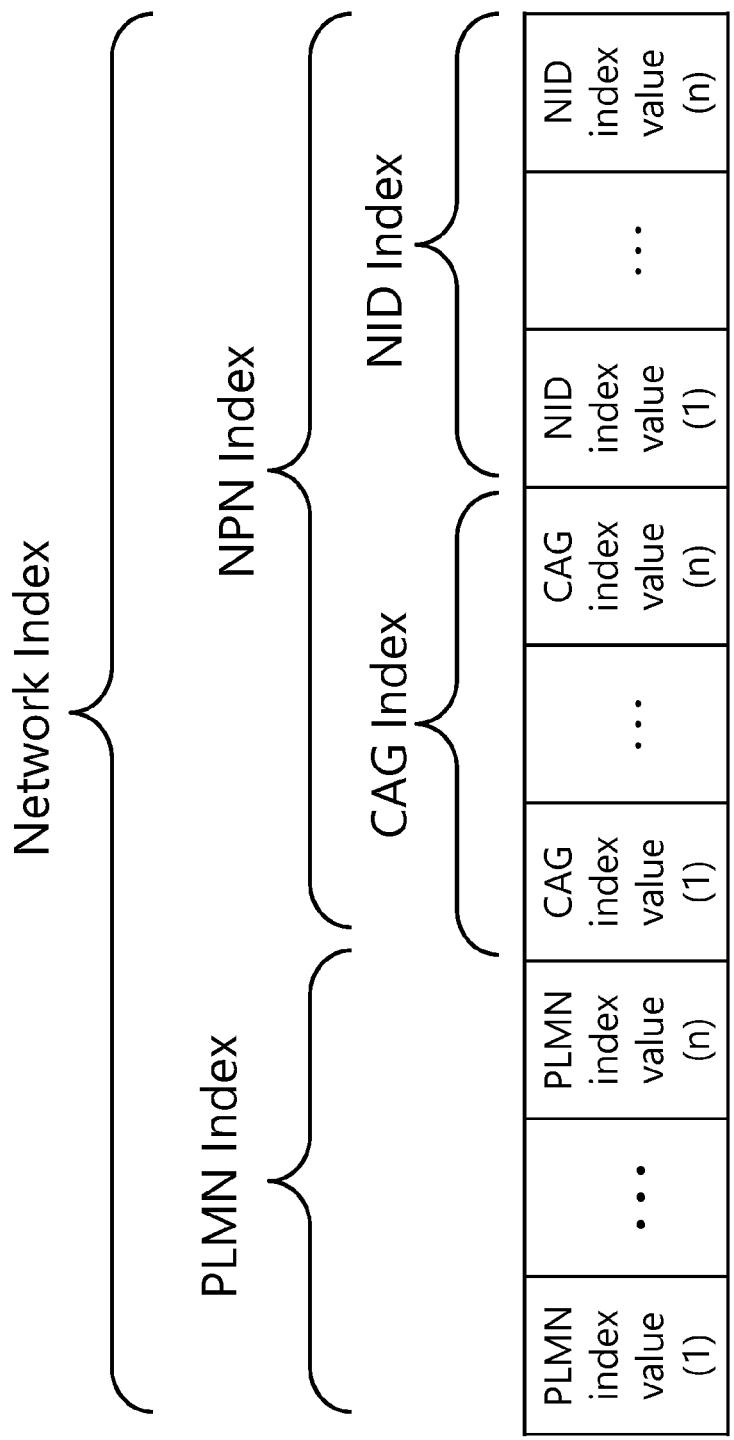
FIG. 16 illustrates an example of a network index in accordance with some embodiments.

Step 1516 illustrates that when the system information includes the PLMN identity list, the method generates index values for PLMN identities to include as at least part of the network index. Thus, in certain embodiments, the network index comprises an index value for each PLMN identity, and the network index also comprises an NPN index. As discussed above, the NPN index may include a CAG index (e.g., an index comprising one or more CAG index values) and/or a NID index (e.g., an index comprising one or more NID index values). When the network index comprises the CAG index and the index values for PLMN identities, certain embodiments arrange the CAG index to succeed the index values for the PLMN identities. When the network index comprises the NID index and the index values for PLMN identities, certain embodiments arrange the NID index to succeed the index values for the PLMN identities. When the network index comprises the NID index and the CAG index, certain embodiments arrange the NID index to succeed the CAG index. When the network index comprises all three indexes, certain embodiments arrange the NID index to succeed the CAG index and arrange the CAG index to succeed the index values for the PLMN identities. FIG. 16 illustrates an example. Alternatively, in embodiments where a parameter (e.g., cellReservedForOtherUse) indicates that the cell is NPN-only, generating the network index comprises assuming that there are no PLMN index values preceding the CAG index or the NID index.

Returning to FIG. 15A, the method proceeds to step 1518 with using the network index. Certain embodiments use the network index during connection setup to indicate a network that the wireless device requests to access. As an example, certain embodiments may indicate the index value of the network that the wireless device requests to access. Certain embodiments use the network index to determine UAC parameters associated with an NPN. As an example, certain embodiments determine the UAC parameters based on an association between an index value and the UAC parameters.

The steps of FIGS. 15A and 15B may be performed in any suitable order. As an example, certain embodiments may perform the steps according to the order illustrated by analogous steps of FIG. 2.

As discussed above, in certain embodiments, a network node may be configured to perform analogous or reciprocal functionality. For example, the network node may generate a network index associated with system information broadcast by the network node. The system information comprises a list of NPN identifiers. The network index comprises at least an NPN index. Generating the NPN index is based on steps 1506, 1508, 1510, and 1512 of FIG. 15B. In certain embodiments, generating the network index is further based on steps 1514 and 1516 of FIG. 15B. In this manner, the network node may generate the network index according to the same rules as the wireless device to ensure that the network node and the wireless device use the same network index value to identify a particular network. As an example, the network node may use the network index during connection setup to determine a network that the wireless device requests to access. As another example, the network node may use the network index to indicate to a wireless device one or more Unified Access Control (UAC) parameters associated with an NPN.

Figure 17:
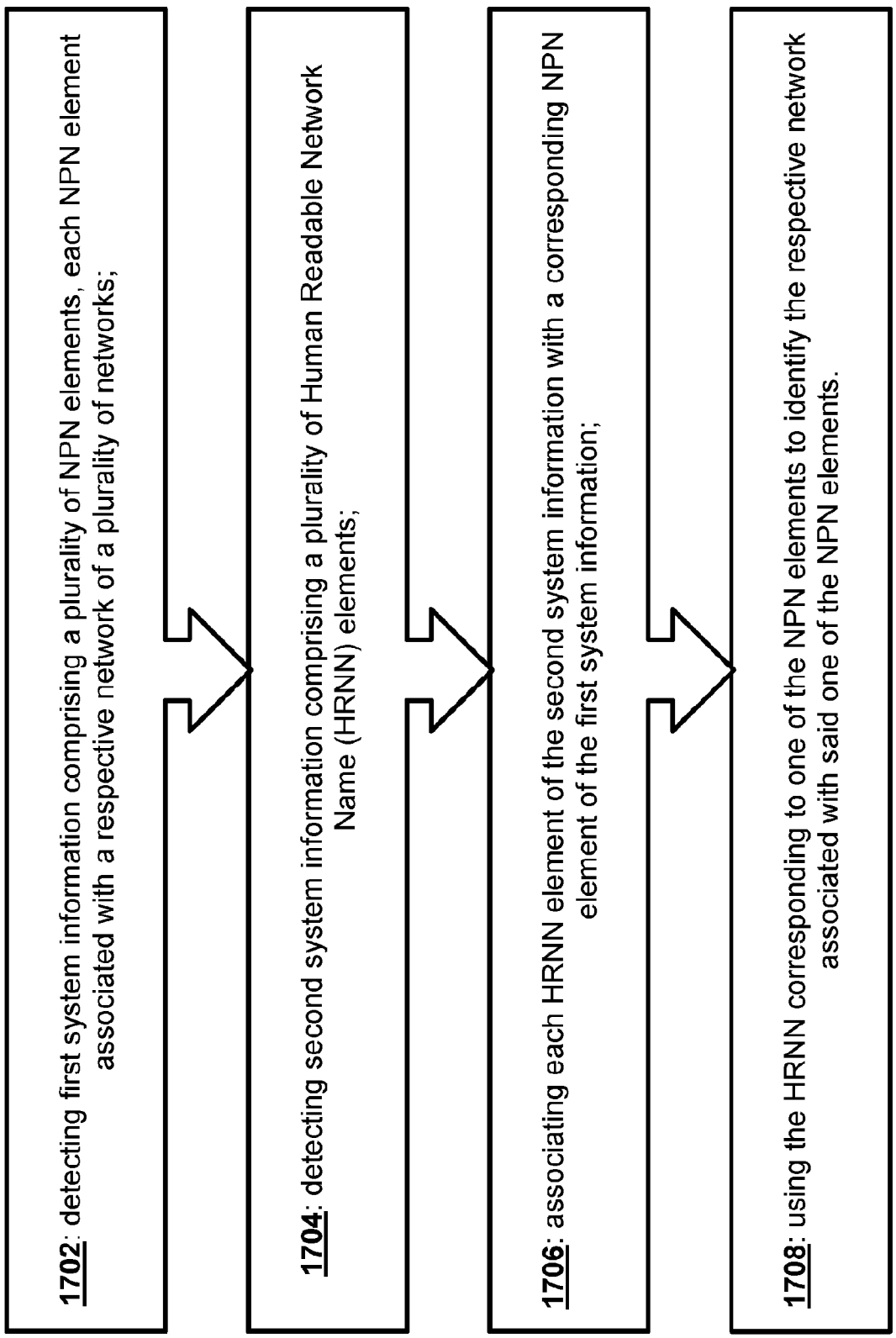
FIG. 17 illustrates an example of a method in accordance with some embodiments.

FIG. 17 illustrates an example of a method that may be performed by a wireless device, such as wireless device 110 or UE 200, in accordance with certain embodiments In certain embodiments, the method detects a first system information broadcast at step 1702. The first system information broadcast comprising an NPN list. The NPN list indicates a plurality of NPN identifiers. Each NPN identifier is associated with a respective network of a plurality of networks. An NPN identifier may identify a CAG (e.g., PNI-NPN) or a NID (e.g., SNPN), for example. The method proceeds to step 1704 with detecting a second system information broadcast. The second system information broadcast comprises an HRNN list. The HRNN list indicates a plurality of HRNNs. At step 1706, the method associates each HRNN of the second system information broadcast with a corresponding NPN identifier of the first system information broadcast In certain embodiments, the associating is based a number of elements/list entries in the NPN list corresponding to a number of elements in the HRNN list. As an example, in certain embodiments, the associating is based on an i:th element of the NPN list corresponding to an i:th element of the HRNN list. If there is no HRNN associated with a given NPN, the corresponding element in the HRNN list may be absent (e.g., a value corresponding to "no name" can be assigned to that element of the HRNN list). At step 1708, the method uses the HRNN corresponding to one of the NPN identifiers to identify the respective network associated with said one of the NPN identifiers.

Figure 18:
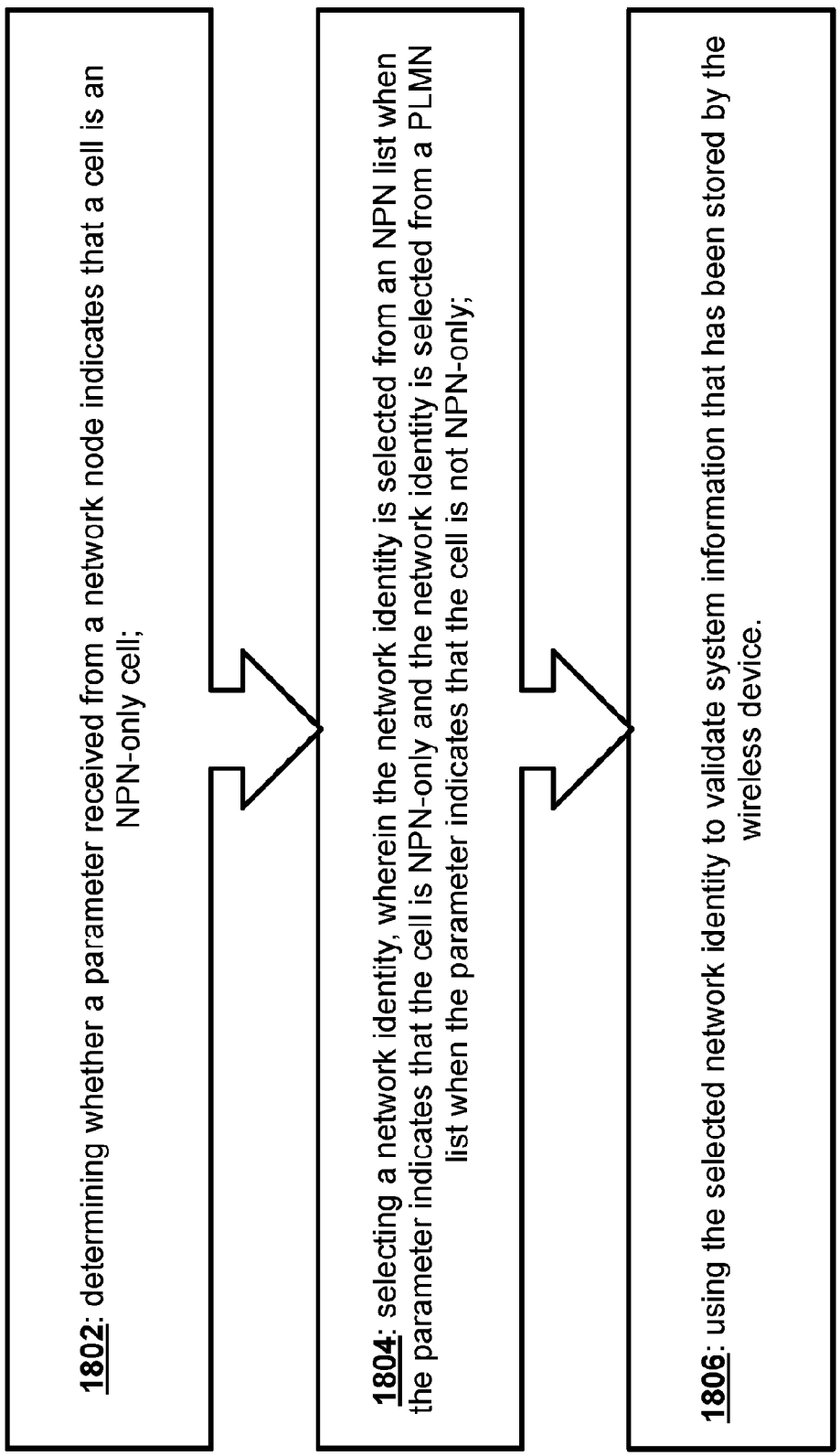
FIG. 18 illustrates an example of a method in accordance with some embodiments.

FIG. 18 illustrates an example of a method that may be performed by a wireless device, such as wireless device 110 or UE 200, in accordance with certain embodiments. In certain embodiments, the method begins at step 1802 with determining whether a parameter received from a network node indicates that a cell is an NPN-only cell. In certain embodiments, the parameter is a cellReservedForOtherUse parameter. The cellReservedForOtherUse parameter indicates that the cell is NPN-only when set to true, and the cellReservedForOtherUse parameter indicates that the cell is not NPN-only when set to false. The method proceeds to step 1804 with selecting a network identity based on whether the parameter indicates that the cell is NPN-only cell. The network identity is selected from an NPN list (e.g., NPN-IdentityInfoList) when the parameter indicates that the cell is NPN-only, and the network identity is selected from a PLMN list (e.g., PLMN-IdentityInfoList) when the parameter indicates that the cell is not NPN-only. In some embodiments, selecting the network identity from the NPN list comprises selecting the network identity listed first on the NPN list, and selecting the network identity from the PLMN list comprises selecting the network identity listed first on the PLMN list. In certain embodiments, the method further comprises using the selected network identity to validate system information that has been stored by the wireless device, as shown in step 1806.

Figure 19:
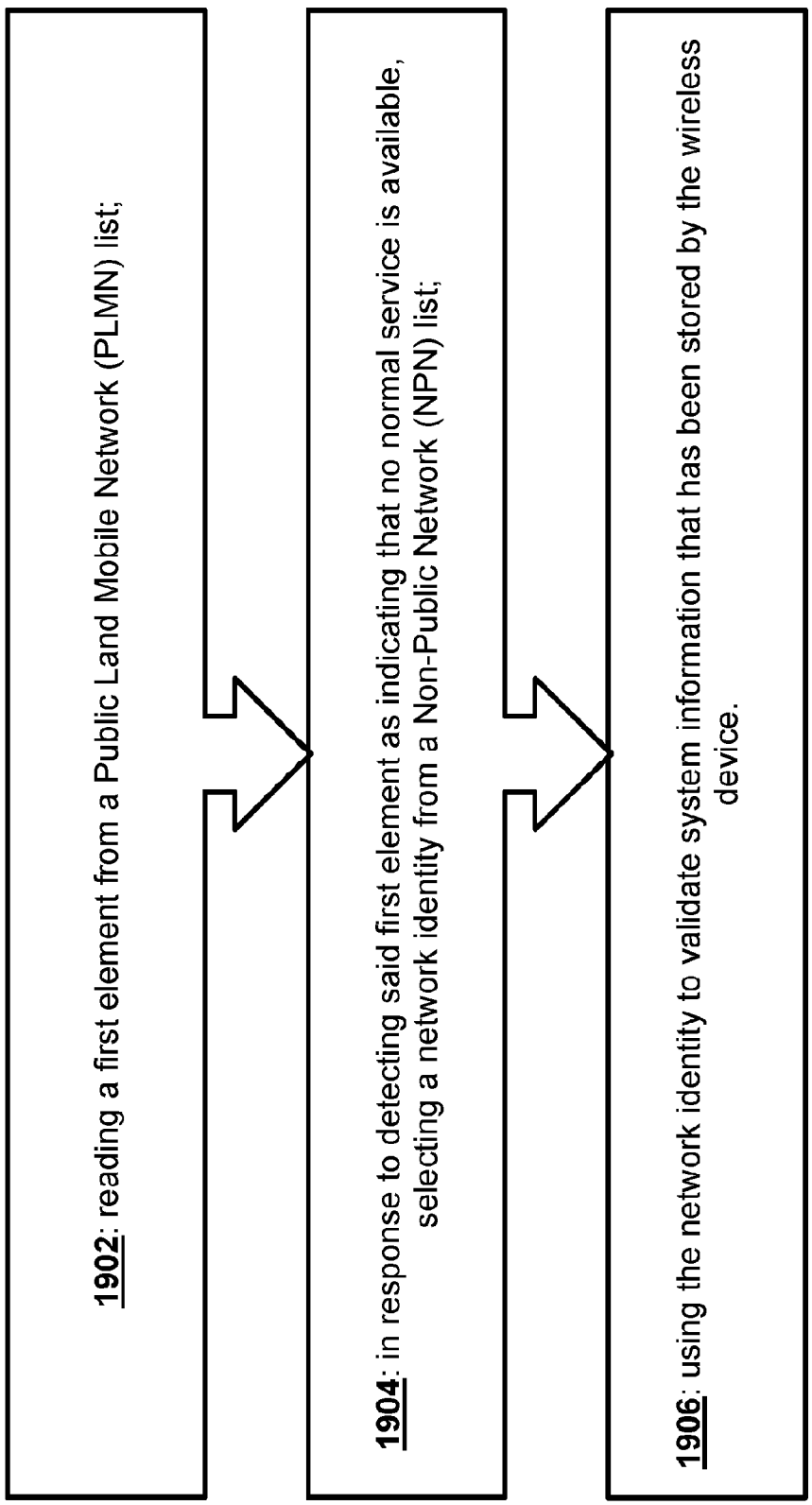
FIG. 19 illustrates an example of a method in accordance with some embodiments.

FIG. 19 illustrates an example of a method that may be performed by a wireless device, such as wireless device 110 or UE 200, in accordance with certain embodiments. At step 1902, the method comprises reading a first element/list entry from a PLMN list (e.g., PLMN-IdentityInfoList). In response to detecting said first element as indicating that no normal service is available, the method proceeds to step 1904 with selecting a network identity from an NPN list (e.g., NPN-IdentityInfoList). The method then proceeds to step 1906 with using the network identity to validate system information that has been stored by the wireless device In certain embodiments, validating the system information includes verifying that selected network identity matches the network identity associated with the stored copy of the system information.

FIG. 20 illustrates an example of a method performed by a network node, in accordance with certain embodiments. The method begins at step 2002 with transmitting a first system information broadcast. The first system information broadcast comprises an NPN list. The NPN list indicates a plurality of NPN identifiers. Each NPN identifier is associated with a respective network of a plurality of networks. The method proceeds to step 2004 with preparing a second system information broadcast. The second system information broadcast comprises an HRNN list. The HRNN list indicates a plurality of HRNNs. The second system information broadcast is configured to enable a wireless device to associate each HRNN of the second system information broadcast with a corresponding NPN identifier of the first system information broadcast. The method continues to step 2006 with transmitting the second system information broadcast. The method ends at step 2008 with using the HRNN corresponding to one of the NPN identifiers to identify the respective network associated with said one of the NPN identifiers. For example, the network node may send the wireless device a message that identifies the network by the HRNN, or the network node may receive a message from the wireless device that identifies the network by the HRNN.

FIG. 21 illustrates an example of a method performed by a network node, in accordance with certain embodiments. The method begins with at step 2102 with transmitting a parameter to a wireless device. The parameter indicates that a cell is an NPN-only cell. The method proceeds to step 2104 with receiving a selection of a network identity from the wireless device, wherein the network identity is selected from an NPN list when the parameter indicates that the cell is NPN-only, and the network identity is selected from a PLMN list when the parameter indicates that the cell is not NPN-only.

FIG. 22 illustrates an example of a method performed by a network node, in accordance with certain embodiments. The method comprises step 2202, sending a wireless device a first element of a PLMN list, the first element of the PLMN list indicating that no normal service is available, thereby indicating that the wireless device is to select a network identity from an NPN list and use the network identity to validate system information that has been stored by the wireless device.

Figure 23:
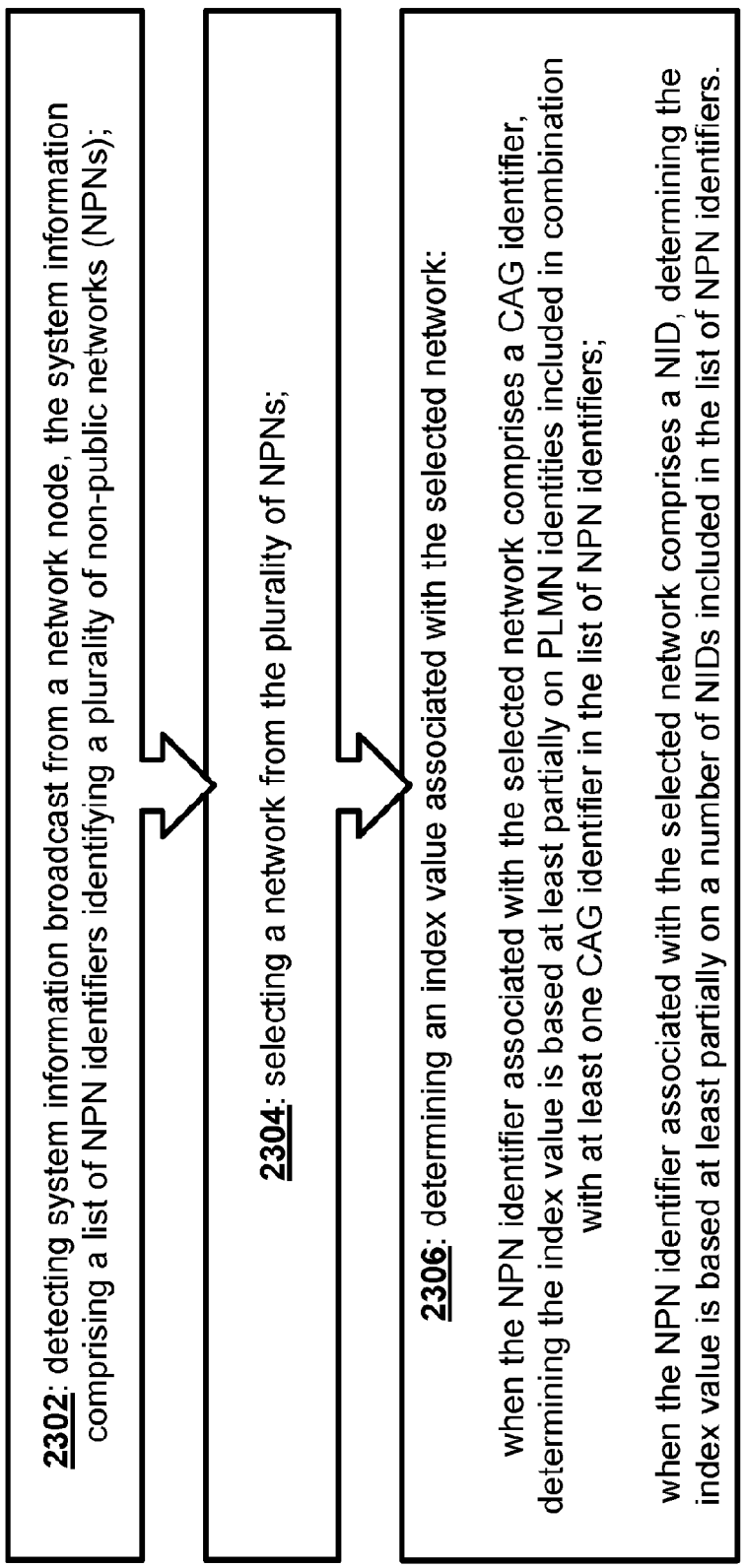
FIG. 23 illustrates an example of a method in accordance with some embodiments.

FIG. 23 illustrates an example of a method performed by a wireless device, in accordance with some embodiments. The method begins at step 2302 with detecting system information broadcast from a network node. The system information comprises a list of NPN identifiers identifying a plurality of non-public networks (NPNs). The method continues to step 2304 with selecting a network from the plurality of NPNs. The method then proceeds to step 2306 with determining an index value associated with the selected network. The method may then use the index value to perform an operation of the wireless device. As an example, certain embodiments use the index value during connection setup to indicate to a network node that the wireless device requests access to the selected network. As another example, certain embodiments use the index value to determine UAC parameters associated with the selected network. For example, the wireless device ma, receive a message comprising the UAC parameters and the index value from a network node, and may use the index value to associate the UAC parameters with the selected network.

Certain embodiments determine the index value in step 2306 based on whether the NPN identifier associated with the selected network comprises a CAG identifier or a NID. When the NPN identifier associated with the selected network comprises a CAG identifier, determining the index value is based at least partially on PLMN identities included in combination with at least one CAG identifier in the list of NPN identifiers. As an example, certain embodiments determine the index value based on using a same index value for all NPNs that are identified by a respective CAG identifier and are associated with a same PLMN in the system information. The discussion of FIG. 15 above provides a table as an example (Example 1), where CAG A1 and CAG A2 are each identified by a respective CAG identifier (CAG identifier 1 and CAG identifier 2, respectively), and CAG A1 and CAG A2 are associated with the same PLMN (PLMN ID A) such that the index value would be the same for CAG A1 and CAG A2 (index value 1).

Alternatively, determining the index value can be based on using a different index value for each PLMN identity-CAG identifier pair (NPNs that are identified by different CAG identifiers would have different index values, regardless of whether they are associated with the same PLMN). The discussion of FIG. 15 above provides a table as an example (Example 2), where CAG A1 and CAG A2 are identified by different CAG identifiers (CAG identifier 1 and CAG identifier 2, respectively) and therefore have different index values (index value 1 and index value 2, respectively), even though CAG A1 and CAG A2 are associated with the same PLMN (PLMN ID A). CAG B1 also has a different index value (index value 3) because CAG B1 is associated with a different PLMN (PLMN ID B). That is, CAG identifier 1 associated with PLMN ID B is understood to be a different CAG identifier than CAG identifier 1 associated with PLMN ID A because it is associated with a different PLMN.

In certain embodiments, when the NPN identifier associated with the selected network comprises a NID, determining the index value is based at least partially on a number of NIDs included in the list of NPN identifiers. For example, certain embodiments determine the index value based on each NPN that the system information identifies by a respective NID having its own index value. The discussion of FIG. 15 above provides a table as an example (Example 3), where NID A1 and NID A2 are identified by different NIDs (NID 1 and NID 2, respectively) and therefore have different index values (index value 1 and index value 2, respectively), even though NID A1 and NID A2 are associated with the same PLMN (PLMN ID A). NID B1 also has a different index value (index value 3) because NID B1 is associated with a different PLMN (PLMN ID B). That is, NID 1 associated with PLMN ID B is understood to be a different NID than NID 1 associated with PLMN ID A because it is associated with a different PLMN.

In certain embodiments, the wireless device supports different types of NPNs. The wireless device determines whether the NPN identifier associated with the selected network comprises a CAG identifier or a NID and then determines the index value accordingly. For example, the wireless device selects a network for which the associated NPN identifier comprises a CAG identifier during a first time period, and the wireless device selects a network for which the associated NPN identifier comprises a NID during a second time period. The second time period can occur before or after the first time period. During the first time period (when the NPN identifier associated with the selected network comprises a CAG identifier), the wireless device determines the index value based at least partially on PLMN identities included in combination with at least one CAG identifier in the list of NPN identifiers (see e.g., the Example 1 table or Example 2 table of FIG. 15), and during the second time period (when the NPN identifier associated with the selected network comprises a NID), the wireless device determines the index value based at least partially on a number of NIDs included in the list of NPN identifiers (see e.g., the Example 3 table of FIG. 15). Certain embodiments determine the index value for the first time period based on using a same index value for all NPNs that are identified by a respective CAG identifier and are associated with a same PLMN in the system information, and determine the index value for the second time period based on each NPN that the system information identifies by a respective NID having its own index value.

Certain embodiments may generate a network index based on system information (such as the network index in FIG. 16). The index value associated with the selected network (the index value determined in step 2306) may be determined based on the network index. As an example, the index value associated with a selected network (i) may be determined to correspond to an i:th index value in the network index In certain embodiments, a wireless device's lower layers may read the SIB and may report the available PLMNs, CAGs, and/or NIDs to the wireless device's higher layers. The wireless device's higher layers may then select one of the networks. For example, the wireless dev ice may select a PLMN-CAG ID or a PLMN-NID combination if the wireless device opts to use an NPN. Based on this selection, the wireless device's lower layers would calculate the corresponding index value of the selected network. In order to be able to accurately calculate the index value of the selected network, the wireless device would take into consideration the other available networks. In other words, the wireless device generates a network index at least in the sense that the wireless considers the other available networks when calculating the index value associated with the selected network. In this manner, the wireless device can increment the index value when appropriate (e.g., to avoid using the same index value for two networks that are meant to use different index values).

In an embodiment, generating the network index comprise determining whether the system information includes a list comprising one or more PLMN identities (meaning PLMN identities on their own, as opposed to PLMN-CAG ID or PLMN-NID combinations) and, when the system information includes the list comprising one or more PLMN identities, including one or more index values for the one or more PLMN identities in the network index; determining whether the list of NPN identifiers includes a list comprising one or more CAG identifiers (including PLMN-CAG ID combinations) and, when the list of NPN identifiers includes the list comprising one or more CAG identifiers, including one or more index values for the one or more CAG identifiers in the network index (as described above, in certain embodiments, CAG identifiers associated with the same PLMN may have the same index value); and determining whether the list of NPN identifiers includes a list comprising one or more NIDs (including PLMN-NID combinations) and, when the list of NPN identifiers includes the list comprising one or more NIDs, including one or more index values for the one or more NIDs in the network index. In certain embodiments, the wireless device detects a parameter indicating that a cell is an NPN-only cell and, in response, generates the network index assuming that there are no index values for PLMN identities to include in the network index. In certain embodiments, the network index can be generated prior to step 2306, and determining the index value in step 2306 can be based on using the network index to obtain an association between the selected network and its index value. For example, to determine the index value for selected network (i), the wireless device may obtain the i:th index value of the network index.

Figure 24:
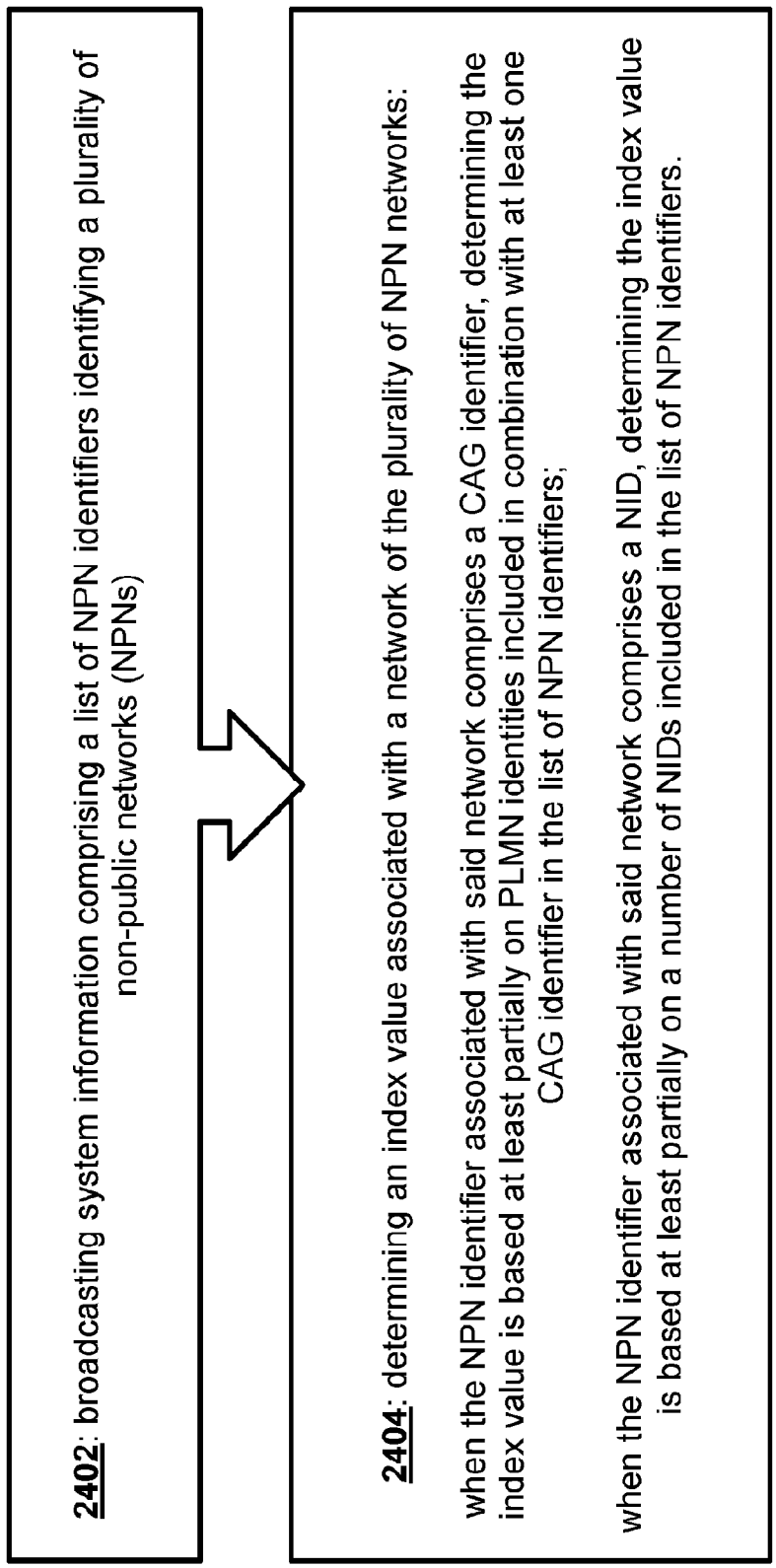
FIG. 24 illustrates an example of a method in accordance with some embodiments.

FIG. 24 illustrates an example of a method performed by a network node. In general, the steps of FIG. 24 may be analogous/reciprocal to the steps performed by the wireless device in FIG. 23 so that the index value that the network node uses for a given network corresponds to the index value that the wireless device uses for that network. The method begins at step 2402 with broadcasting system information comprising a list of NPN identifiers identifying a plurality of non-public networks (NPNs). The method proceeds to step 2404 with determining an index value associated with a network of the plurality of NPNs In certain embodiments, the method uses the index value to perform an operation of the network node. As an example, certain embodiments determine that a wireless device requests access to said network based on receiving the index value associated with said network from the wireless device during connection setup. The network node may then facilitate connection with said network. As another example, certain embodiments transmit UAC parameters with the index value associated with said network in order to indicate that the UAC parameters are associated with said network.

Certain embodiments determine the index value in step 2404 based on whether the NPN identifier associated with said network comprises a CAG identifier or a NID. When the NPN identifier associated with said network comprises a CAG identifier, determining the index value is based at least partially on PLMN identities included in combination with at least one CAG identifier in the list of NPN identifiers. As an example, determining the index value is based on using a same index value for all NPNs that are identified by a respective CAG identifier and are associated with a same PLMN in the system information. The discussion of FIG. 15 above provides a table as an example (Example 1) (as further explained with respect to FIG. 23). Alternatively, determining the index value can be based on using a different index value for each PLMN identity-CAG identifier pair (NPNs that are identified by different CAG identifiers would have different index values, regardless of whether they are associated with the same PLMN). The discussion of FIG. 15 above provides a table as an example (Example 2)(as further explained with respect to FIG. 23).

In certain embodiments, when the NPN identifier associated with said network comprises a NID, determining the index value is based at least partially on a number of NIDs included in the list of NPN identifiers. For example, certain embodiments determine the index value based on each NPN that the system information identifies by a respective NID having its own index value. The discussion of FIG. 15 above provides a table as an example (Example 3) (as further explained with respect to FIG. 23).

In certain embodiments, the network node supports different types of NPNs. For example, the network node determines whether the NPN identifier associated with a network selected by the wireless device comprises a CAG identifier or a NID and then determines the index value accordingly. For example, the NPN identifier associated with a network selected for a first time period may comprise a CAG identifier, and the NPN identifier associated with a network selected for a second time period may comprise a NID. The second time period can occur before or after the first time period. During the first time period (when the NPN identifier associated with the selected network comprises a CAG identifier), the network node determines the index value based at least partially on PLMN identities included in combination with at least one CAG identifier in the list of NPN identifiers (see e.g., the Example 1 table or Example 2 table of FIG. 15), and during the second time period (when the NPN identifier associated with the selected network comprises a NID), the network node determines the index value based at least partially on a number of NIDs included in the list of NPN identifiers (see e.g., the Example 3 table of FIG. 15). Certain embodiments determine the index value for the first time period based on using a same index value for all NPNs that are identified by a respective CAG identifier and are associated with a same PLMN in the system information, and determine the index value for the second time period based on each NPN that the system information identifies by a respective NID having its own index value.

Similar to the method performed by the wireless device in FIG. 23, certain embodiments of the method performed by the network node in FIG. 24 may generate a network index at least in the sense that all of the available networks may be taken into consideration when determining the index value associated with a particular network. FIG. 16 illustrates an example of a network index. If the cell is an NPN-only cell, the network index need not include index values associated with any PLMN identities (meaning PLMN identities on their own, as opposed to PLMN-CAG ID or PLMN-NID combinations). Certain embodiments transmit a parameter indicating that a cell is an NPN-only cell, thereby indicating to a wireless device that there are no index values for PLMN identities to include in a network index.

Certain embodiments may store the network index and may later use the network index when the network node needs to determine an association between an index value and a network. For example, when the network node receives an index value in a connection request from a wireless device, the network node can use the network index to determine the requested network (i.e., the network associated with the index value). As another example, when the network node is preparing to transmit UAC parameters for a particular network, the network node can use the network index to determine the index value associated with that network. The network node can then provide the index value when transmitting the UAC parameters in order to indicate that the UAC parameters are for the particular network.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document. "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A wireless device, the wireless device comprising:
power supply circuitry configured to supply power to the wireless device; and
processing circuitry, the processing circuitry configured to:
receive, from a radio network, system information, the system information comprising a list of Non-Public Network (NPN) identifiers identifying a plurality of NPNs;
select a network from the plurality of NPNs;
determine an index value associated with the selected network, wherein:
when the NPN identifier associated with the selected network comprises a Closed Access Group (CAG) identifier, determining the index value is based at least partially on Public Land Mobile Network (PLMN) identities included in combination with at least one CAG identifier in the list of NPN identifiers; or
when the NPN identifier associated with the selected network comprises a Network Identifier (NID), determining the index value is based at least partially on a number of NIDs included in the list of NPN identifiers; and
transmit, to the radio network, a message comprising an indication of the index value associated with the selected network.

2. The wireless device of claim 1, wherein the NPN identifier associated with the selected network comprises the CAG identifier, and wherein determining the index value is based on using a same index value for all NPNs that are identified by a respective CAG identifier and are associated with a same PLMN in the system information.

3. The wireless device of claim 1, wherein the NPN identifier associated with the selected network comprises the NID, and wherein determining the index value is based on each NPN that the system information identifies by a respective NID having an index value of the respective NPN.

4. The wireless device of claim 1, the processing circuitry further configured to:
use the index value during connection setup to indicate that the wireless device requests access to the selected network; or
use the index value to determine Unified Access Control (UAC) parameters associated with the selected network.

5. The wireless device of claim 1, the processing circuitry further configured to:
generate a network index based on the system information, wherein to generate the network index the processing circuitry is configured to:
determine whether the system information includes a list comprising one or more PLMN identities and, when the system information includes the list comprising one or more PLMN identities, including one or more index values for the one or more PLMN identities in the network index;
determine whether the list of NPN identifiers includes a list comprising one or more CAG identifiers and, when the list of NPN identifiers includes the list comprising one or more CAG identifiers, including one or more index values for the one or more CAG identifiers in the network index; and
determine whether the list of NPN identifiers includes a list comprising one or more NIDs and, when the list of NPN identifiers includes the list comprising one or more NIDs, including one or more index values for the one or more NIDs in the network index;

wherein the index value associated with the selected network is determined based on the network index.

6. The wireless device of claim 5, the processing circuitry further configured to:

detect a parameter indicating that a cell is an NPN-only cell and, in response, generate the network index assuming that there are no index values for PLMN identities to include in the network index.

7. A method in a wireless device, the method comprising:

receiving, from a radio network, system information the system information comprising a list of Non-Public Network (NPN) identifiers identifying a plurality of NPNs;

selecting a network from the plurality of NPNs;

determining an index value associated with the selected network, wherein:

when the NPN identifier associated with the selected network comprises a Closed Access Group (CAG) identifier, determining the index value is based at least partially on Public Land Mobile Network (PLMN) identities included in combination with at least one CAG identifier in the list of NPN identifiers; or when the NPN identifier associated with the selected network comprises a Network Identifier (NID), determining the index value is based at least partially on a number of NIDs included in the list of NPN identifiers; and transmitting, to a radio network, a message comprising an indication of the index value associated with the selected network.

8. The method of claim 7, wherein the NPN identifier associated with the selected network comprises the CAG identifier, and wherein determining the index value is based on using a same index value for all NPNs that are identified by a respective CAG identifier and are associated with a same PLMN in the system information.

9. The method of claim 7, wherein the NPN identifier associated with the selected network comprises the NID, and wherein determining the index value is based on each NPN that the system information identifies by a respective NID having an index value of the respective NPN.

10. The method of claim 7, further comprising:

using the index value during connection setup to indicate that the wireless device requests access to the selected network; or using the index value to determine Unified Access Control (UAC) parameters associated with the selected network.

11. A network node, the network node comprising:

power supply circuitry configured to supply power to the network node; and processing circuitry, the processing circuitry configured to:

transmit, to a wireless device, system information comprising a list of Non-Public Network (NPN) identifiers identifying a plurality of NPNs; and receiving, from the wireless device, a message comprising an indication of an index value associated with a network of the plurality of NPNs, wherein:

when the NPN identifier associated with said network comprises a Closed Access Group (CAG) identifier, the index value is based at least partially on Public Land Mobile Network (PLMN) identities included in combination with at least one CAG identifier in the list of NPN identifiers; or when the NPN identifier associated with said network comprises a Network Identifier (NID), the index value is based at least partially on a number of NIDs included in the list of NPN identifiers.

12. The network node of claim 11, wherein the NPN identifier associated with said network comprises the CAG identifier, and wherein the index value is based on using a same index value for all NPNs that are identified by a respective CAG identifier and are associated with a same PLMN in the system information.

13. The network node of claim 11, wherein the NPN identifier associated with said network comprises the NID, and wherein determining the index value is based on each NPN that the system information identifies by a respective NID having an index value of the respective NPN.

14. The network node of claim 11, the processing circuitry further configured to:

determine that a wireless device requests access to said network based on receiving the message comprising the indication of the index value associated with said network from the wireless device during connection setup; or transmit Unified Access Control (UAC) parameters with the index value associated with said network in order to indicate that the UAC parameters are associated with said network.

15. The network node of claim 11, the processing circuitry further configured to generate a network index based on the system information, wherein:

when the system information includes a list comprising one or more PLMN identities, the network index includes one or more index values for the one or more PLMN identities;

when the list of NPN identifiers includes a list comprising one or more CAG identifiers, the network index includes one or more index values for the one or more CAG identifiers; and when the list of NPN identifiers includes a list comprising one or more NIDs, the network index includes including one or more index values for the one or more NIDs;

wherein the index value associated with said network is based on the network index.

16. The network node of claim 11, the processing circuitry further configured to:

transmit a parameter indicating that a cell is an NPN-only cell, thereby indicating to a wireless device that there are no index values for PLMN identities to include in a network index.

17. A method in a network node, the method comprising:

transmitting, to a wireless device, system information comprising a list of Non-Public Network (NPN) identifiers identifying a plurality of NPNs; and receiving, from the wireless device, a message comprising an indication of an index value associated with a network of the plurality of NPNs, wherein:

when the NPN identifier associated with said network comprises a Closed Access Group (CAG) identifier, the index value is based at least partially on Public Land Mobile Network (PLMN) identities included in combination with at least one CAG identifier in the list of NPN identifiers; or when the NPN identifier associated with said network comprises a Network Identifier (NID), the index value is based at least partially on a number of NIDs included in the list of NPN identifiers.

18. The method of claim 17, wherein the NPN identifier associated with said network comprises the CAG identifier, and wherein the index value is based on using a same index value for all NPNs that are identified by a respective CAG identifier and are associated with a same PLMN in the system information.

19. The method of claim 17, wherein the NPN identifier associated with said network comprises the NID, and wherein determining the index value is based on each NPN that the system information identifies by a respective NID having an index value of the respective NPN.

20. The method of claim 17, further comprising:
- determining that a wireless device requests access to said network based on receiving the message comprising the indication of the index value associated with said network from the wireless device during connection setup; or
- transmitting Unified Access Control (UAC) parameters with the index value associated with said network in order to indicate that the UAC parameters are associated with said network.

* * * * *